United States Patent
Fujiwara et al.

(10) Patent No.: US 7,108,743 B2
(45) Date of Patent: *Sep. 19, 2006

(54) COLORING COMPOSITION FOR IMAGE FORMATION AND METHOD FOR IMPROVING OZONE RESISTANCE OF COLOR IMAGE

(75) Inventors: Toshiki Fujiwara, Kanagawa (JP); Naoyuki Hanaki, Kanagawa (JP); Shigeaki Tanaka, Kanagawa (JP); Tadashi Omatsu, Kanagawa (JP); Yoshiharu Yabuki, Kanagawa (JP)

(73) Assignee: Fuji Photo Film Co., Ltd., Minami-Ashigara (JP)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 67 days.

This patent is subject to a terminal disclaimer.

(21) Appl. No.: 10/471,650

(22) PCT Filed: Apr. 8, 2002

(86) PCT No.: PCT/JP02/03490

§ 371 (c)(1),
(2), (4) Date: Sep. 12, 2003

(87) PCT Pub. No.: WO02/083795

PCT Pub. Date: Oct. 24, 2002

(65) Prior Publication Data

US 2004/0089200 A1    May 13, 2004

(30) Foreign Application Priority Data

| Apr. 9, 2001 | (JP) | 2001-110333 |
| Apr. 9, 2001 | (JP) | 2001-110334 |
| Apr. 9, 2001 | (JP) | 2001-110335 |
| Apr. 9, 2001 | (JP) | 2001-110457 |
| Aug. 6, 2001 | (JP) | 2001-237903 |
| Aug. 24, 2001 | (JP) | 2001-254878 |
| Jan. 21, 2002 | (JP) | 2002-012015 |

(51) Int. Cl.
*C09D 11/00* (2006.01)
*C09D 11/02* (2006.01)

(52) U.S. Cl. .................. 106/31.48; 106/31.5

(58) Field of Classification Search ............ 106/31.48, 106/31.5; 534/770

See application file for complete search history.

(56) References Cited

U.S. PATENT DOCUMENTS

| 4,068,085 A | 1/1978 | Ramanathan et al. |
| 4,140,684 A | 2/1979 | Burkhard et al. |

(Continued)

FOREIGN PATENT DOCUMENTS

EP    0 346 729 A2    12/1989

(Continued)

*Primary Examiner*—Helene Klemanski
(74) *Attorney, Agent, or Firm*—Buchanan Ingersoll PC

(57) ABSTRACT

A coloring composition for image formation comprising an azo dye having an aromatic nitrogen-containing 6-membered heterocyclic ring as a coupling component, a coloring composition which comprises an azo compound having an oxidation potential nobler than 1.0 V vs. SCE and comprising at least two substituents having a pKa value of −10 to 5 in water, and a method for improving ozone resistance of a color image, the method comprising using a compound having an oxidation potential nobler than 1.0 V vs. SCE and showing a maximum absorption at a wavelength between 500 nm and 580 nm with a half-value width of 150 nm or narrower.

13 Claims, 1 Drawing Sheet

U.S. PATENT DOCUMENTS

| | | |
|---|---|---|
| 4,614,521 A | 9/1986 | Niwa et al. |
| 4,734,349 A | 3/1988 | Chapman et al. |
| 4,939,118 A | 7/1990 | Etzbach et al. |
| 5,216,437 A | 6/1993 | Yamamoto et al. |
| 6,827,771 B1 * | 12/2004 | Omatsu et al. .......... 106/31.47 |
| 6,835,240 B1 * | 12/2004 | Nishita et al. .......... 106/31.48 |
| 2001/0029869 A1 | 10/2001 | Fujiwara |
| 2002/0107301 A1 | 8/2002 | Yamanouchi et al. |
| 2004/0122219 A1 * | 6/2004 | Fujiwara et al. ............ 534/769 |

FOREIGN PATENT DOCUMENTS

| | | |
|---|---|---|
| EP | 0 340 722 A2 | 9/1994 |
| EP | 0 614 952 A2 | 9/1994 |

* cited by examiner

COLORING COMPOSITION FOR IMAGE FORMATION AND METHOD FOR IMPROVING OZONE RESISTANCE OF COLOR IMAGE

FIELD OF THE INVENTION

This invention relates to a coloring composition for image formation comprising an azo dye having specific physical properties and a specific structure and its applications, such as an ink-jet ink composition (ink composition for ink-jet recording), an ink jet recording method, a thermal transfer recording material, a color toner, a color filter and a method of improving ozone resistance.

BACKGROUND OF THE INVENTION

Color image forming materials have come to prevail over black-and-white image forming materials. They have found wide applications, such as ink jet recording materials, thermal transfer recording materials, electrophotographic recording materials, transfer type silver halide photographic materials, printing inks, recording pens, and color filters in solid-state image sensors, such as charge coupled devices (CCDs), and in displays, such as liquid crystal displays (LCDs) and plasma display panels (PDPs).

These color image recording materials and color filters use colorants (dyes and pigments) of additive or subtractive primaries to implement full color reproduction or recording. Nevertheless, colorants having absorption characteristics suitable for favorable color reproduction and fastness against various conditions of use or environmental conditions are not available for the time being.

Ink jet recording has been popularized rapidly and will see further development because of low material cost, high speed, low noise, and ease of color recording. Fundamentally, ink jet recording is divided into a continuous method in which ink droplets are continuously allowed to fly and a drop-on-demand method in which ink droplets are made to fly upon image information signals. The mechanism of drop formation includes a piezoelectric system in which pressure is applied to ink by a piezoelectric element to eject ink droplets, a thermal system in which an air bubble is generated by heat to eject ink droplets, an acoustic system, and an electrostatic system in which ink droplets are sucked or ejected by an electrostatic force. Ink-jet inks include aqueous ink, oily ink, and solid ink (melting type).

Colorants used in ink-jet inks are required to have (1) good solubility or dispersibility in ink solvents, (2) capability of forming a high-density image, (3) satisfactory hues, (4) color fastness against light, heat, active gases in the environment (e.g., $NO_x$, oxidizing gases such as ozone, $SO_x$, etc.), (5) resistance against water or chemicals, (6) good fixability on media with minimized feathering, (7) stability in ink formulations, (8) nontoxicity, (9) high purity, and (10) inexpensiveness. It is extremely difficult to obtain colorants meeting all these requirements. It has been particularly desired to develop colorants which have a favorable magenta hue and are fast to light, humidity, heat, and oxidizing gases in the environment, such as ozone. Oxidizing gas resistance is of special concern where an image is formed on a medium having an ink-receptive layer containing porous white inorganic pigment particles.

Color copiers and color laser printers making use of an electrophotographic system usually employ color toners having a dye or a pigment as a colorant dispersed in a resin binder. Color toners are required to have absorption characteristics suitable for favorable color reproduction, high light transmission (transparency) particularly for use in an overhead projector (OHP), and color fastness against various environmental conditions of use. Toners comprising a pigment dispersed in particles are disclosed in JP-A-62-157051 (the term "JP-A" as used herein means an "unexamined published Japanese patent application"), JP-A-62-255956, and JP-A-6-118715. While excellent in light-fastness, these toners, being insoluble, agglomerate easily, which can cause reduction in transparency or change in hue of transmitted light. Toners comprising a dye are disclosed in JP-A-3-276161, JP-A-7-209912, and JP-A-8-123085. Although they have high transparency and do not change in hue, there is a question as to light-fastness.

A thermal transfer recording system has advantages such as a small size which leads to cost reduction, ease of operation and maintenance, and a low running cost. Colorants used in thermal transfer recording are required to have absorption characteristics suitable for favorable color reproduction, balance between thermal transfer properties and post-transfer fixability, heat stability, and color fastness to various factors. None of known colorants satisfies all these requirements. For example, JP-A-60-2398 proposes a thermal transfer recording material and an image formation method in which a thermally diffusing colorant is chelated with a transition metal ion having been added to an image-receiving medium. However, the absorption characteristics of the formed chelated compound are unsatisfactory. Further, use of a transition metal is environmentally problematical.

Color filters, which are required to have high transparency, have been produced by dyeing with dyes. For example, a dyeable photoresist is imagewise exposed to light and developed to form a pattern for each color and successively dyed with the respective dyes to produce a color filter. Color filters are also produced by using a positive resist as taught in U.S. Pat. No. 4,808,510 and JP-A-6-35182. Color filters produced by using dyes exhibit excellent optical characteristics with high light transmission but have limited resistance to light and heat. Dyes having various resistance properties as well as high transparency have therefore been demanded. On the other hand, methods of producing color filters by using organic pigments resistant to light and heat instead of dyes are widely known but have difficulty in achieving such optical characteristics as with dyes.

The properties required, in common, of colorants used in the above applications are (1) absorption characteristics suitable for color reproduction, (2) color fastness against various environmental conditions of use, such as fastness to light, heat, humidity, oxidizing gases such as ozone, and chemicals such as sulfurous acid gas, and (3) a large molar absorptivity.

Coupling components that have been widely used for azo dyes include phenols, naphthols, and anilines. JP-A-11-209673 and Japanese Patent 3020660 disclose azo dyes obtained by using these coupling components, which have satisfactory hues but poor light fastness. Lately, Japanese Patent Application No. 2000-220649 proposed dyes with satisfactory hues and improved light fastness. However, all the colorants known by the literature are extremely unsatisfactory in fastness to oxidizing gases such as ozone.

In seeking for colorants with satisfactory resistance to oxidizing gases such as ozone, the present inventors have arrived at the idea of using a nitrogen-containing heterocyclic compound as a coupling component, dropping the idea of using the conventional coupling components such as phenols, naphthols, and anilines. Patent applications relevant to azo dyes comprising a pyridine coupling component or a pyrazine coupling component include JP-A-49-74718, EP23309, and DE 2513949, DE 2832020, and DE 2525505. At the time of filing these applications it was unknown that these dyes are applicable to image formation by ink jet recording and the like; moreover the azo dyes disclosed in these publications have insufficient fastness to light, heat, humidity, and active gases in the environment and also insufficient hues as magenta dyes.

SUMMARY OF THE INVENTION

An object of the present invention is to provide a coloring composition for image formation which provides a color image or a coloring material excellent in hue and fastness and is suitable to prepare printing inks, such as ink-jet ink, ink sheets of thermal transfer recording materials, color toners for electrophotography, color filters for displays, e.g., LCDs and PDPs, and solid-state image sensors, e.g., CCDs, and dye baths for textile.

Another object of the invention is to provide an ink-jet ink composition and an ink jet recording method which are capable of forming a color image with a satisfactory hue and high fastness against light and active gases in the environment especially ozone gas.

Still another object of the invention is to provide a thermal transfer recording material which provides a color image with high light-fastness and a clear hue.

Yet another object of the invention is to provide a color toner which provides a color image with excellent light-fastness, high-quality color reproduction, and high transparency for OHPs.

An additional object of the invention is to provide a color filter excellent in color reproducibility and light-fastness.

A further additional object of the present invention is to provide a novel method of improving ozone resistance of a color image by using a compound having excellent absorption characteristics for favorable color reproduction as one of three primary colors and sufficient fastness to light, heat, humidity, and active gases in the environment.

A still further additional object of the invention is to provide a method of improving ozone resistance of a color image which uses a coloring composition providing a color image or a coloring material excellent in hue and fastness, such as a printing ink composition particularly for inkjet recording.

The above-cited objects can be achieved by the materials and process described in the following items (1) to (20).

A symbol "$R^X$" as used herein is not as same as a symbol "$R_X$" wherein X represents an integer.

A symbol "$Z'''$" as used herein is not as same as a symbol "$Z_n$" wherein n represents an integer.

(1) A coloring composition for image formation comprising an azo dye having an aromatic nitrogen-containing 6-membered heterocyclic ring as a coupling component.

(2) A coloring composition which comprises an azo compound having an oxidation potential nobler than 1.0 V vs. SCE and comprising at least two substituents having a pKa value of –10 to 5 in water.

(3) A method for improving ozone resistance of a color image, the method comprising using a compound having an oxidation potential nobler than 1.0 V vs. SCE and showing a maximum absorption at a wavelength between 500 nm and 580 nm with a half-value width of 150 nm or narrower.

(4) The coloring composition for image formation as described in item (1) above, wherein the azo dye is represented by formula (1):

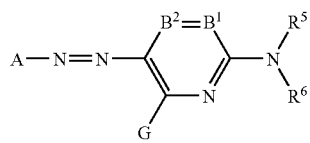

(1)

wherein A represents a residue of a 5-membered heterocyclic diazo component A—NH$_2$; B$^1$ and B$^2$ represent —CR$^1$= and —CR$^2$=, respectively, or either one of B$^1$ and B$^2$ represents a nitrogen atom with the other representing —CR$^1$= or —CR$^2$=; R$^5$ and R$^6$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, provided that R$^5$ and R$^6$ do not represent a hydrogen atom simultaneously, wherein each group may have a substituent; and G, R$^1$ and R$^2$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group or a heterocyclic group, an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, an alkylsulfonyl group, an arylsulfonyl group, an alkylsulfinyl group, an arylsulfinyl group, a sulfamoyl group, a sulfo group or a heterocyclic thio group, wherein each group may have a substituent; or R$^5$ may be connected to R$^1$ or R$^6$ to form a 5- or 6-membered ring.

(5) The coloring composition for image formation as described in item (1) or (2) above, wherein the azo dye is represented by formula (2):

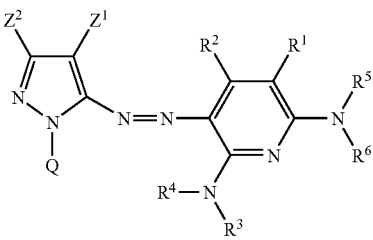

(2)

wherein Z$^1$ represents an electron-attracting group having a Hammett's substituent constant σp value of 0.20 or greater; Z$^2$ represents a hydrogen atom, an aliphatic group, an aromatic group or a heterocyclic group; R$^1$, R$^2$, R$^5$, and R$^6$ are as defined in claim 1; R$^3$ and R$^4$ each independently represent a hydrogen atom, an aliphatic group, an aromatic group, a heterocyclic group, an acyl group, an alkoxycarbonyl group, an aryloxycarbonyl group, a carbamoyl group, a sulfonyl group or a sulfamoyl group; and Q represents a hydrogen atom, an aliphatic group, an aromatic group or a heterocyclic group; wherein each group as represented by Z$^1$, Z$^2$, R$^1$, R$^2$, R$^3$, R$^4$, R$^5$, R$^6$, and Q may have a substituent.

(6) A coloring composition for image formation comprising an azo dye represented by formula (AZ-1):

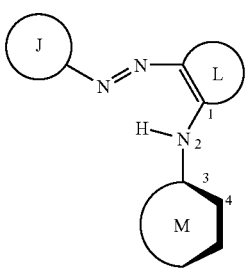

(AZ-1)

wherein ring J, ring L, and ring M each independently represent a 5- or 6-membered aromatic ring; 1, 2, 3, and 4 are numbers specifying four atoms; and the interfacial angle 1-2-3-4 defined by the numbered four atoms ranges between 45° and 135° in the energetically most stable steric structure determined by quantum chemistry calculation by the DFT/B3LYP method with the basis set 6-31G* or a higher basis set.

(7) The coloring composition for image formation as described in item (6) above, wherein the azo dye is represented by formula (AZ-2):

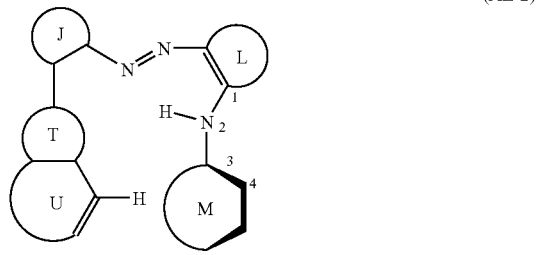

(AZ-2)

wherein ring J, ring L, ring M, ring T, and ring U each independently represent a 5- or 6-membered aromatic ring; 1, 2, 3, and 4 are numbers specifying four atoms; and the interfacial angle 1-2-3-4 defined by the numbered four atoms ranges between 45° and 135° in the energetically most stable steric structure determined by quantum chemistry calculation by the DFT/B3LYP method with the basis set 6-31G* or a higher basis set.

(8) The coloring composition for image formation as described in item (7) above, wherein ring U is a substituted or unsubstituted benzene ring; ring T is a thiazole ring, an imidazole ring or an oxazole ring; ring U and ring T are condensed with each other; ring J is a substituted or unsubstituted pyrazole ring, a substituted or unsubstituted imidazole ring, a substituted or unsubstituted triazole ring, a substituted or unsubstituted benzene ring or a substituted or unsubstituted pyrimidone ring; ring L is a substituted or unsubstituted benzene ring, a substituted or unsubstituted pyridine ring or a substituted or unsubstituted pyrazole ring; and ring M is a substituted or unsubstituted aromatic ring or a substituted or unsubstituted nitrogen-containing 6-membered heterocyclic ring.

(9) The coloring composition for image formation as described in item (6) or (7) above, wherein the interfacial angle 1-2-3-4 ranges between 60° and 120°.

(10) An ink-jet ink composition, a thermal transfer recording material, a color toner or a color filter comprising a coloring composition as described in any one of items (4) to (9) above.

(11) An ink jet recording method comprising forming an image with an ink-jet ink composition as described in item (10) above on an image-receiving medium having a substrate and an ink-receptive layer containing inorganic white pigment particles formed on the substrate.

(12) The coloring composition for image formation as described in item (1) above, wherein the azo dye is represented by formula (3):

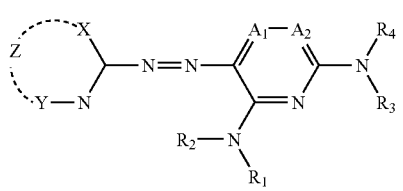

(3)

wherein Z represents an atomic group necessary to form a hetero ring together with the carbon atom, the nitrogen atom, X, and Y; X represents a nitrogen atom, an oxygen atom or a carbon atom; Y represents a nitrogen atom, an oxygen atom, a sulfur atom or a carbon atom provided that Y is not a nitrogen atom when X is a carbon atom; $A_1$ and $A_2$ each independently represent a substituted or unsubstituted carbon atom or a nitrogen atom provided that $A_1$ and $A_2$ do not simultaneously represent a nitrogen atom and that $A_2$ does not have a nitro group as a substituent; and $R_1$, $R_2$, $R_3$, and $R_4$ each independently represent a hydrogen atom, an alkyl group, a cycloalkyl group, an aralkyl group, an alkenyl group, an aryl group, a heterocyclic group, a sulfonyl group, an acyl group, a carboxyl group or a carbamoyl group, wherein each group may have a substituent, provided that $R_1$ and $R_2$ do not represent a hydrogen atom simultaneously and that $R_3$ and $R_4$ do not represent a hydrogen atom simultaneously.

(13) The coloring composition for image formation as described in item (1) above, wherein the azo dye is represented by formula (4):

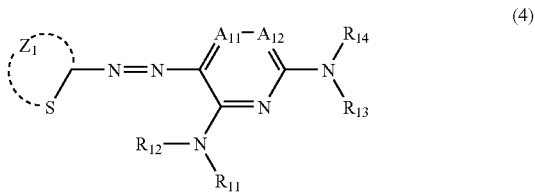

(4)

wherein $Z_1$ represents an atomic group necessary to form a hetero ring together with the carbon atom and the sulfur atom; $A_{11}$ and $A_{12}$ each independently represent a substituted or unsubstituted carbon atom or a nitrogen atom provided that $A_{11}$ and $A_{12}$ do not represent a nitrogen atom simultaneously; and $R_{11}$, $R_{12}$, $R_{13}$, and $R_{14}$ each independently represent a hydrogen atom, an alkyl group, a cycloalkyl group, an aralkyl group, an alkenyl group, an aryl group, a heterocyclic group, a sulfonyl group, an acyl group, a carboxyl group or a carbamoyl group, wherein each group may have a substituent, provided that at least one of $R_{11}$ and $R_{12}$ represents a substituted or unsubstituted aryl group or a substituted or unsubstituted heterocyclic group and that $R_{13}$ and $R_{14}$ do not represent a hydrogen atom simultaneously.

(14) The coloring composition for image formation as described in item (1) above, wherein the azo dye is represented by formula (5):

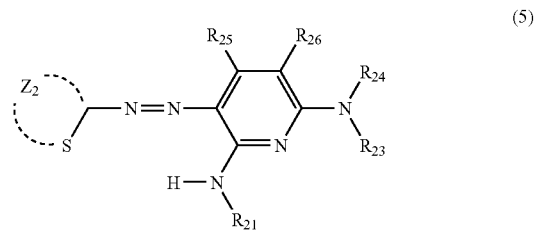

(5)

wherein $Z_2$ represents an atomic group necessary to form a hetero ring together with the carbon atom and the sulfur atom; $R_{21}$ represents a substituted or unsubstituted aryl group or a substituted or unsubstituted heterocyclic group; $R_{23}$ and $R_{24}$ each independently represent a hydrogen atom, an alkyl group, a cycloalkyl group, an aralkyl group, an alkenyl group, an aryl group, a heterocyclic group, a sulfonyl group, an acyl group, a carboxyl group or a carbamoyl group, wherein each group may have a substituent; and $R_{25}$ and $R_{26}$ each independently represent a hydrogen atom or a monovalent substituent.

(15) The coloring composition for image formation as described in item (1) above, wherein the azo dye is represented by formula (6):

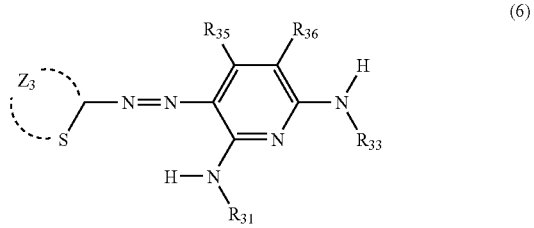

(6)

wherein $Z_3$ represents an atomic group necessary to form a hetero ring together with the carbon atom and the sulfur atom; $R_{31}$ represents a substituted or unsubstituted aryl group or a substituted or unsubstituted heterocyclic group; $R_{33}$ represents an alkyl group, a cycloalkyl group, an aralkyl group, an alkenyl group, an aryl group, a heterocyclic group, a sulfonyl group, an acyl group, a carboxyl group or a carbamoyl group; and $R_{35}$ and $R_{36}$ each independently represent a hydrogen atom or a monovalent substituent.

(16) The coloring composition as described in item (2) above, wherein the azo compound is represented by formula (5-I):

$$\text{Het}(A^5)\text{—N}=\text{N-Het}(B^5) \quad (5\text{-I})$$

wherein $\text{Het}(A^5)$ represents a substituted 5- or 6-membered heterocyclic ring; and $\text{Het}(B^5)$ represents a heterocyclic ring represented by formula (5-II):

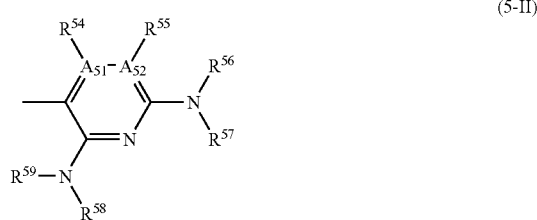

(5-II)

wherein $A_{51}$ and $A_{52}$ each independently represent a carbon atom or a nitrogen atom provided that they do not represent a nitrogen atom simultaneously; $R^{54}$ and $R^{55}$ each independently represent a hydrogen atom, a halogen atom, a substituted or unsubstituted alkyl group, a substituted or unsubstituted aryl group, a halogen atom, a carboxyl group, a carbamoyl group, a cyano group, an alkoxycarbonyl group or a hydroxyl group; $R^{56}$, $R^{57}$, $R^{58}$, and $R^{59}$ each independently represent a hydrogen atom, a substituted or unsubstituted alkyl group, a substituted or unsubstituted aryl group or a substituted or unsubstituted heterocyclic group;

provided that formula (5-I) has at least two substituents having a pKa value of −10 to 5 in water.

(17) An ink-jet ink composition comprising the coloring composition as described in any one of items (1), (2) and from (4) to (16).

(18) An ink jet recording method comprising ejecting the ink-jet ink composition as described in item (17) above on an image-receiving medium comprising a substrate and an ink-receptive layer comprising inorganic white pigment particles to form an image.

(19) The method for improving ozone resistance of a color image as described in item (3) above, wherein the compound is an azo compound.

(20) The method for improving ozone resistance of a color image as described in item (19) above, wherein the azo compound is represented by formula (7):

$$A^6\text{—N}=\text{N—}B^6 \quad (7)$$

wherein $A^6$ and $B^6$ each independently represent a substituted or unsubstituted aryl group or a substituted or unsubstituted 5- or 6-membered heteryl group.

A first preferred embodiment of the present invention includes above-described items (1) and (4) to (15).

A second preferred embodiment of the present invention includes above-described item (16).

A third preferred embodiment of the present invention includes above-described items (19) and (20)

DETAILED DESCRIPTION OF THE INVENTION

First Preferred Embodiment

Figure 1:
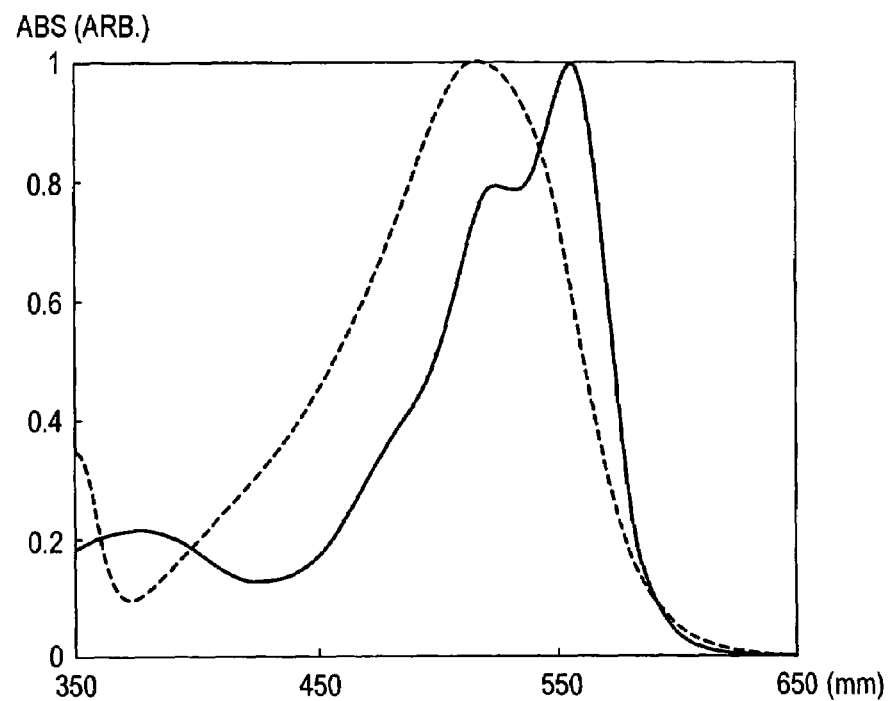
FIG. 1 shows absorption spectra of compound D10 (solid line) and REF1 (dotted line).

In formula (1) representing the azo compound which preferably has at least one phosphono group and can be used in the first preferred embodiment of the present invention, A represents a residue of a 5-membered heterocyclic diazo component A—NH$_2$. The hetero atom of the 5-membered hetero ring includes N, O, and S. The hetero ring as A is preferably a nitrogen-containing 5-membered heterocyclic ring. The hetero ring may have an aliphatic ring, an aromatic ring or a heterocyclic ring condensed therewith.

The hetero ring as A preferably includes a pyrazole ring, an imidazole ring, a thiazole ring, an isothiazole ring, a thiadiazole ring, a benzothiazole ring, a benzoxazole ring, and a benzisothiazole ring, each of which may have a substituent (s). Preferred are a pyrazole ring, an imidazole ring, an isothiazole ring, a thiadiazole ring, and a benzothiazole ring represented by formulae (a) to (f), respectively.

(a)

(b)

-continued

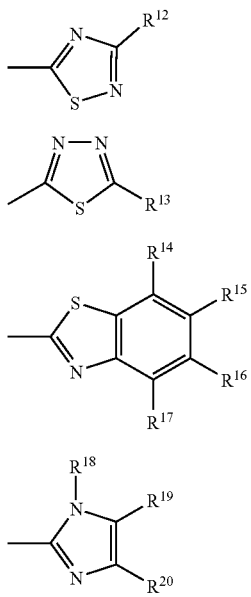

wherein $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ each represent a hydrogen atom or a substituent selected from the substituents hereinafter described as G, $R^1$, and $R^2$.

Of the heterocyclic rings (a) to (f), the pyrazole ring of formula (a) or the isothiazole ring of formula (b) is preferred. The pyrazole ring of formula (a) is particularly preferred.

$B^1$ and $B^2$ represent —$CR^1$= and —$CR^2$=, respectively, or either one of $B^1$ and $B^2$ represents a nitrogen atom with the other representing —$CR^1$= or —$CR^2$=. $B^1$ and $B^2$ preferably represent —$CR^1$= and —$CR^2$=, respectively.

$R^5$ and $R^6$ each represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, wherein each group may have a substituent. $R^5$ and $R^6$ each preferably represent a hydrogen atom, an aliphatic group, an aromatic group, a heterocyclic group, an acyl group, an alkylsulfonyl group or an arylsulfonyl group, still preferably represent a hydrogen atom, an aromatic group, a heterocyclic group, an acyl group, an alkylsulfonyl group or an arylsulfonyl group, particularly preferably represent a hydrogen atom, an aryl group or a heterocyclic group. Each of the groups recited may have a substituent(s). $R^5$ and $R^6$ do not represent a hydrogen atom simultaneously.

G, $R^1$ and $R^2$ each represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group or a heterocyclic group, an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, a heterocyclic thio group, an alkylsulfonyl group, an arylsulfonyl group, an alkylsulfinyl group, an arylsulfinyl group, a sulfamoyl group or a sulfo group, wherein each group may have a substituent.

G preferably represents a hydrogen atom, a halogen atom, an aliphatic group, an aromatic group, a hydroxyl group, an alkoxy group, an aryloxy group, an acyloxy group, a heterocyclic oxy group, an amino substituted with an alkyl group, an aryl group or a heterocyclic group, an acylamino group, a ureido group, a sulfamoylamino group, an alkoxycarbonylamino group, an aryloxycarbonylamino group, an alkylthio group, an arylthio group or a heterocyclic thio group. G still preferably represents a hydrogen atom, a halogen atom, an alkyl group, a hydroxyl group, an alkoxy group, an aryloxy group, an acyloxy group, an amino group substituted with an alkyl group, an aryl group or a heterocyclic group, or an acylamino group. Particularly preferably G represents a hydrogen atom, an arylamino group or an acylamino group. Each group as G may have a substituent(s).

$R^1$ and $R^2$ each preferably represent a hydrogen atom, an alkyl group, an alkoxycarbonyl group, a carboxyl group, a carbamoyl group or a cyano group. Each of these groups may have a substituent(s).

$R^5$ may be connected to $R^1$ or $R^6$ to form a 5- or 6-membered ring.

The substituents which may be possessed by A, $R^1$, $R^2$, $R^5$, $R^6$, and G include the atoms (except a hydrogen atom) and the groups recited above as G, $R^1$, and $R^2$.

Where an azo compound represented by formula (1) is a water-soluble dye, it is preferred for the compound to have an ionic hydrophilic group on any of A, $R^1$, $R^2$, $R^5$, $R^6$, and G. Suitable ionic hydrophilic groups include a sulfo group, a carboxyl group, and a quaternary ammonium group. A carboxyl group and a sulfo group are preferred. A sulfo group is particularly preferred. The carboxyl group and the sulfo group may be in a salt form. Suitable counter ions forming the salt include alkali metal ions (e.g., a sodium ion, and a potassium ion) and organic cations (e.g., a tetramethylguanidium ion).

The substituents represented by G, $R^1$, and $R^2$ will be described in more detail.

The halogen atom includes fluorine, chlorine, and bromine.

The term "aliphatic group" includes a substituted or unsubstituted alkyl group, a substituted or unsubstituted alkenyl group, a substituted or unsubstituted alkynyl group, and a substituted or unsubstituted aralkyl group. The aliphatic group may have a branched structure or a cyclic structure. The aliphatic group preferably contains 1 to 20, particularly 1 to 16, carbon atoms. The aryl moiety of the aralkyl group is preferably a phenyl group or a naphthyl group, with a phenyl group being still preferred. Suitable examples of the aliphatic group are methyl, ethyl, butyl, isopropyl, t-butyl, hydroxyethyl, methoxyethyl, cyanoethyl, trifluoromethyl, 3-sulfopropyl, 4-sulfobutyl, cyclohexyl, benzyl, 2-phenethyl, vinyl, and allyl.

The term "aromatic group" is used to include a substituted or unsubstituted aryl group. The aryl group is preferably a phenyl group or a naphthyl group. A phenyl group is still preferred. The aromatic group preferably contains 6 to 20, particularly 6 to 16, carbon atoms. Suitable examples of the aromatic group are phenyl, p-tolyl, p-methoxyphenyl, o-chlorophenyl, m-(3-sulfopropylamino)phenyl.

The term "heterocyclic group" as used herein includes a substituted one and an unsubstituted one, which may have an aliphatic ring, an aromatic ring or a heterocyclic ring condensed therewith. The heterocyclic group is preferably 5- or 6-membered. Suitable substituents on the heterocyclic group include an aliphatic group, a halogen atom, an alkylsulfonyl group, an arylsulfonyl group, an acyl group, an acylamino group, a sulfamoyl group, a carbamoyl group, and an ionic hydrophilic group. Suitable examples of the heterocyclic group are 2-pyridyl, 2-thienyl, 2-thiazolyl, 2-benzothiazolyl, 2-benzoxazolyl, and 2-furyl.

The term "carbamoyl group" includes a substituted one and an unsubstituted one. Suitable substituents on a carbamoyl group include an alkyl group. Suitable examples of the carbamoyl group are methylcarbamoyl and dimethylcarbamoyl.

The term "alkoxycarbonyl group" means a substituted or unsubstituted alkoxycarbonyl group. The alkoxycarbonyl group preferably contains 2 to 12 carbon atoms. An ionic hydrophilic group is a suitable substituent. Examples of the alkoxycarbonyl group are methoxycarbonyl and ethoxycarbonyl.

The term "aryloxycarbonyl group" means a substituted or unsubstituted aryloxycarbonyl group. An aryloxycarbonyl group having 7 to 12 carbon atoms is preferred. Suitable substituents on the aryloxycarbonyl group include an ionic hydrophilic group. A phenoxycarbonyl group is an example of the aryloxycarbonyl group.

The term "acyl group" includes a substituted acyl group and an unsubstituted acyl group. An acyl group having 1 to 12 carbon atoms is suitable. An ionic hydrophilic group is a suitable substituent. Suitable examples of the acyl group include acetyl and benzoyl.

The term "alkoxy group" includes a substituted alkoxy group and an unsubstituted alkoxy group. An alkoxy group containing 1 to 12 carbon atoms is suitable. Suitable substituents on an alkoxy group include an alkoxy group, a hydroxyl group, and an ionic hydrophilic group. Examples of the alkoxy group are methoxy, ethoxy, isopropoxy, methoxyethoxy, hydroxyethoxy, and 3-carboxypropoxy.

The term "aryloxy group" means a substituted or unsubstituted aryloxy group. An aryloxy group containing 6 to 12 carbon atoms is preferred. Suitable substituents on the aryloxy group include an alkoxy group and an ionic hydrophilic group. Examples of the alkoxy group are phenoxy, p-methoxyphenoxy, and o-methoxyphenoxy.

The term "acyloxy group" means a substituted or unsubstituted acyloxy group. An acyloxy group having 1 to 12 carbon atoms is preferred. Suitable substituents for the acyloxy group include an ionic hydrophilic group. Examples of the acyloxy group are acetoxy and benzoyloxy.

The term "carbamoyloxy group" means a substituted or unsubstituted carbamoyloxy group. Substituents on the carbamoyloxy group include an alkyl group. Examples of the carbamoyloxy groups include an N-methylcarbamoyloxy group.

The alkyl group, the aryl group or the heterocyclic group of the substituted amino group may further have a substituent. The alkylamino group preferably contains 1 to 6 carbon atoms. Substituents on the alkylamino group include ionic hydrophilic groups. Examples of the alkylamino group are methylamino and diethylamino. The arylamino group preferably contains 6 to 12 carbon atoms. Suitable substituents on the arylamino group include a halogen atom and an ionic hydrophilic group. Examples of the arylamino group are anilino and 2-chloroanilino.

The term "acylamino group" includes a substituted one and an unsubstituted one. An acylamino group containing 2 to 12 carbon atoms is preferred. An ionic hydrophilic group is an example of the substituents on the acylamino group.

Examples of the acylamino group include acetylamino, propionylamino, benzoylamino, N-phenylacetylamino, and 3,5-disulfobenzoylamino.

The term "ureido group" means a substituted or unsubstituted ureido group. A ureido group containing 1 to 12 carbon atoms is preferred. Substituents for the ureido group include an alkyl group and an aryl group. Examples of the ureido group are 3-methylureido, 3,3-dimethylureido, and 3-phenylureido.

The term "sulfamoylamino group" denotes a substituted or unsubstituted sulfamoylamino group. Substituents for the sulfamoylamino group include an alkyl group. The sulfamoylamino group includes an N,N-dipropylsulfamoyl group.

The term "alkoxycarbonylamino group" means a substituted or unsubstituted alkoxycarbonylamino group. An alkoxycarbonylamino group having 2 to 12 carbon atoms is preferred. An ionic hydrophilic group is a suitable substituent. The alkoxycarbonylamino group includes an ethoxycarbonylamino group.

The term "aryloxycarbonylamino group" includes a substituted or unsubstituted aryloxycarbonylamino group. An aryloxycarbonylamino group having 7 to 12 carbon atoms is preferred. An ionic hydrophilic group is a suitable substituent. Examples of the aryloxycarbonylamino group include a phenoxycarbonylamino group.

The term "alkylsulfonylamino group" and the term "arylsulfonylamino group" mean a substituted or unsubstituted alkylsulfonylamino group and a substituted or unsubstituted arylsulfonylamino group, respectively. Those containing 1 to 12 carbon atoms are preferred. Suitable substituents for the alkyl- or arylsulfonylamino group include ionic hydrophilic groups. Examples of the alkyl- or arylsulfonylamino groups include methanesulfonylamino, N-phenylmethylsulfonylamino, benzenesulfonylamino, and 3-carboxyphenylsulfonylamino.

The terms "alkylthio group", "arylthio group", and "heterocyclic thio group" denote a substituted or unsubstituted alkylthio group, a substituted or unsubstituted arylthio group, and a substituted or unsubstituted heterocyclic thio group, respectively. Alkyl-, aryl- or heterocyclic thio groups containing 1 to 12 carbon atoms are preferred. Suitable substituents on these groups include ionic hydrophilic groups. Examples of the thio groups include methylthio, phenylthio, and 2-pyridylthio.

The terms "alkylsulfonyl group" and "arylsulfonyl group" mean a substituted or unsubstituted alkylsulfonyl group and a substituted or unsubstituted arylsulfonyl group, respectively. Examples of these groups are a methanesulfonyl group and a phenylsulfonyl group.

The terms "alkylsulfinyl group" and "arylsulfinyl group" denote a substituted or unsubstituted alkylsulfinyl group, such as methanesulfinyl, and a substituted or unsubstituted arylsulfinyl group, such as phenylsulfinyl, respectively.

The term "sulfamoyl group" means a substituted or unsubstituted sulfamoyl group. An alkyl group is a suitable substituent. The sulfamoyl group includes dimethylsulfamoyl and di-(2-hydroxyethyl)sulfamoyl.

Of the azo compounds represented by formula (1) preferred are those represented by formula (2). The azo compound represented by formula (2) preferably has at least one phosphono group.

In formula (2), $Z^1$ represents an electron-attracting group having a Hammett's substituent constant σp value of 0.20 or greater. The electron-attracting group as represented by $Z^1$ has a Hammett's substituent constant σp value of preferably from 0.30 to 1.0, more preferably from 0.45 to 1.0, still more preferably from 0.60 to 1.0. While suitable electron-attracting groups as $Z^1$ will be enumerated later, $Z^1$ is preferably an acyl group having 2 to 12 carbon atoms, an alkoxycarbonyl group having 2 to 12 carbon atoms, a nitro group, a cyano group, an alkylsulfonyl group having 1 to 12 carbon atoms, an arylsulfonyl group having 6 to 18 carbon atoms, a carbamoyl group having 1 to 12 carbon atoms or a halogenated alkyl group having 1 to 12 carbon atoms. Particularly preferred of them are a cyano group, an alkylsulfonyl group having 1 to 12 carbon atoms or an arylsulfonyl group having 6 to 18 carbon atoms. A cyano group is the most preferred.

$R^1$, $R^2$, $R^5$, and $R^6$ are the same as defined above.

$R^3$ and $R^4$ each represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. $R^3$ and $R^4$ each preferably represent a hydrogen atom, an aromatic group, a heterocyclic group, an acyl group, an alkylsulfonyl group or an arylsulfonyl group, still preferably represent a hydrogen atom, an aromatic group or a heterocyclic group.

$Z^2$ represents a hydrogen atom, an aliphatic group, an aromatic group or a heterocyclic group.

Q represents a hydrogen atom, an aliphatic group, an aromatic group or a heterocyclic group. Q preferably represents a non-metallic atomic group necessary to form a 5- to 8-membered ring, which may be substituted or unsubstituted and saturated or unsaturated, preferably an aromatic ring or a heterocyclic ring. Preferred non-metallic atoms making up the ring include nitrogen, oxygen, sulfur and carbon. Examples of the 5- to 8-membered ring include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring, and a thiane ring.

Each group as represented by $Z^1$, $Z^2$, $R^1$, $R^2$, $R^3$, $R^4$, $R^5$, $R^6$, and Q may have a substituent (s). The substituents includes those recited as G, $R^1$, and $R^2$, and ionic hydrophilic groups.

The Hammett's substituent constant σp value as referred to with respect to the substituent $Z^1$ is explained here briefly. Hammett's rule is a rule of thumb proposed by L. P. Hammett in 1935 in an attempt to discuss quantitatively the influences of substituents on reaction and equilibrium of benzene derivatives and is today generally admitted to be valid. Substituent constants used in Hammett's rule include a σp value and a σm value. These values are found in many general books, such as J. A. Dean (ed.), *Lange's Handbook of Chemistry*, 12th Ed., McGraw-Hill (1979) and *Kagaku-no-ryoiki*, Extra No. 122, pp. 96–103, Nankodo (1979). In the present invention substituents will be limited or described in terms of Hammett's substituent constant σp. This does not mean that intended substituents are limited to those substituents the σp value of which is known from literature, and intended substituents include any substituent of which the σp value is not found in literature but seems to fall within a recited range when measured based on Hammett's rule. While formulae (1) and (2) of the present invention embrace compounds that are not benzene derivatives, the present invention makes use of the σp value as a measure of electron effects of a substituent irrespective of the position of substitution.

Electron-attracting groups having a Hammett's substituent constant σp value of 0.60 or greater include a cyano group, a nitro group, an alkylsulfonyl group (e.g., methanesulfonyl), and an arylsulfonyl group (e.g., benzenesulfonyl). Those having a σp value of 0.45 or greater additionally include an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl and N,N-dimethylsulfamoyl), and a halogenated alkyl group (e.g., trifluoromethyl).

Those having a σp value of 0.30 or greater additionally include an acyloxy group (e.g., acetoxy), a carbamoyl group (e.g., N-ethylcarbamoyl and N,N-dibutylcarbamoyl), a halogenated alkoxy group (e.g., trifluoromethoxy), a halogenated aryloxy group (e.g., pentafluorophenoxy), a sulfonyloxy group (e.g., methylsulfonyloxy), a halogenated alkylthio group (e.g., difluoromethylthio), an aryl group substituted with two or more electron-attracting group having a σp value of 0.15 or more (e.g., 2,4-dinitrophenyl and pentachlorophenyl), and a heterocyclic group (e.g., 2-benzoxazolyl, 2-benzothiazolyl, and 1-phenyl-2-benzimidazolyl). Those having a σp value of 0.20 or greater additionally include a halogen atom.

The azo dyes represented by formula (1) preferably have the following combinations of substituents.

(a) $R^5$ and $R^6$ are each preferably a hydrogen atom, an alkyl group, an aryl group, a heterocyclic group, a sulfonyl group or an acyl group, still preferably a hydrogen atom, an aryl group, a heterocyclic group or a sulfonyl group, particularly preferably a hydrogen atom, an aryl group or a heterocyclic group, provided that $R^5$ and $R^6$ do not represent a hydrogen atom simultaneously.

(b) G is preferably a hydrogen atom, a halogen atom, an alkyl group, a hydroxyl group, an amino group or an acylamino group, still preferably a hydrogen atom, a halogen atom, an amino group or an acylamino group, particularly preferably a hydrogen atom, an amino group or an acylamino group.

(c) A is preferably a pyrazole ring, an imidazole ring, an isothiazole ring, a thiadiazole ring or a benzothiazole ring, still preferably a pyrazole ring or an isothiazole ring, particularly preferably a pyrazole ring.

(d) $B^1$ and $B^2$ are preferably —$CR^1$= and —$CR^2$=, respectively, wherein $R^1$ and $R^2$ are each preferably a hydrogen atom, a halogen atom, a cyano group, a carbamoyl group, a carboxyl group, an alkyl group, a hydroxyl group or an alkoxy group, still preferably a hydrogen atom, a cyano group, a carbamoyl group or an alkyl group.

Of the compounds represented by formula (1), those in which at least one of the substituents is selected from the above-recited preferred ranges are preferred; those in which more substituents are selected from the respective preferred ranges are still preferred; and those in which all the substituents are selected from the respective preferred ranges are particularly preferred.

Specific examples of the azo dyes represented by formula (1) are shown below for illustrative purposes only but not for limitation.

TABLE 1

| Dye | R₁ | R₂ | R₃ |
|---|---|---|---|
| a-1 | 2-benzothiazolyl | 4-C₈H₁₇-phenyl | 4-C₈H₁₇-phenyl |
| a-2 | 5-chloro-2-benzothiazolyl | 4-C₈H₁₇-phenyl | 2,4,6-trimethylphenyl |
| a-3 | 6-chloro-2-benzothiazolyl | 2,4,6-trimethylphenyl | 4-C₈H₁₇-phenyl |
| a-4 | 2-benzothiazolyl | 2-methyl-4-OC₈H₁₇-phenyl | 4-C₈H₁₇-phenyl |
| a-5 | 5-nitro-2-benzothiazolyl | 2,4-dimethylphenyl | 2,4-dimethylphenyl |
| a-6 | 6-[SO₂NH—(CH₂)₃—O—(2,4-di-tert-amylphenyl)]-2-benzothiazolyl | 4-methylphenyl | 4-methylphenyl |
| a-7 | 6-[SO₂NH—(CH₂)₃—OCH₂CH(C₈H₁₇)(C₈H₁₃)]-2-benzothiazolyl | 2,4,6-trimethylphenyl | 4-methylphenyl |

TABLE 1-continued

[Structure: pyrazole-azo-pyridine dye with substituents R₁, R₂, R₃]

| Dye | R₁ | R₂ | R₃ |
|---|---|---|---|
| a-8 | 2-methylbenzothiazol-6-yl-NHCOCH(Et)-O-(2,4-di-tert-amylphenyl) | -C₆H₄-C₈H₁₇ | -C₆H₄-C₈H₁₇ |
| a-9 | 2-methylbenzothiazol-6-yl-NHSO₂-(2-(n)C₈H₁₇O-5-C₈H₁₇(t)phenyl) | 2,3,5-trimethylphenyl | C₈H₁₇(t) |
| a-10 | 5-chloro-2-methylbenzothiazol-6-yl | 2-(OC₁₂H₂₅)phenyl | 2-(OC₁₂H₂₅)phenyl |

TABLE 2

[Structure: pyrazole-azo-pyridine dye with substituents R₁, R₂, R₃, R₄]

| Dye | R₁ | R₂ | R₃ | R₄ |
|---|---|---|---|---|
| a-11 | -C(CH₃)₃ | 2-methyl-6-SO₃Na-benzothiazolyl | -C₆H₄-CH₃ | -C₆H₄-SO₃Na |
| a-12 | -C(CH₃)₃ | 2-methyl-6-SO₃K-benzothiazolyl | 2-SO₃K-phenyl | 2-SO₃K-phenyl |

TABLE 2-continued
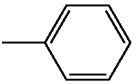
| Dye | R₁ | R₂ | R₃ | R₄ |
|---|---|---|---|---|
| a-13 | 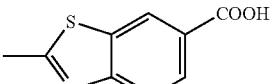 | 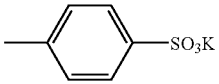 | 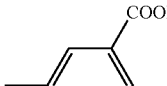 | 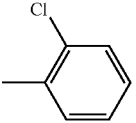 |
| a-14 | 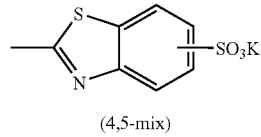 | 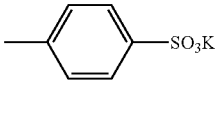 (4,5-mix) | 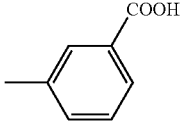 | 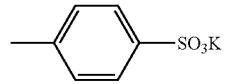 |
| a-15 | 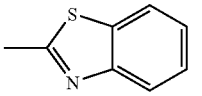 | 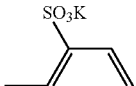 | 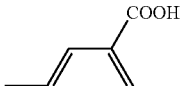 | 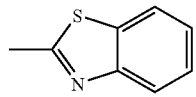 |
TABLE 3
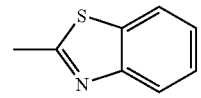
| Dye | R₁ | R₂ |
|---|---|---|
| a-16 | 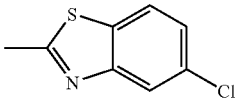 | 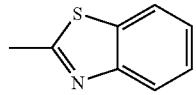 |
| a-17 | 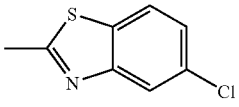 | —SO₂CH₃ |
| a-18 | 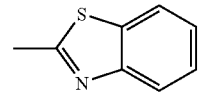 | —COCH₃ |
| a-19 | | |

TABLE 3-continued
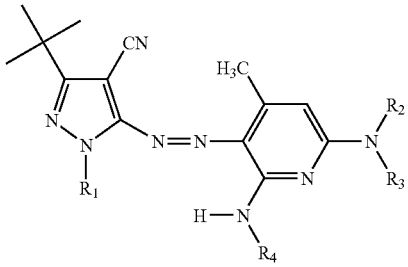
| | | |
|---|---|---|
| a-20 | 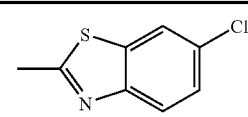 | —SO₂CH₃ |
| a-21 | 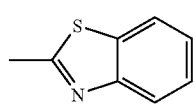 | 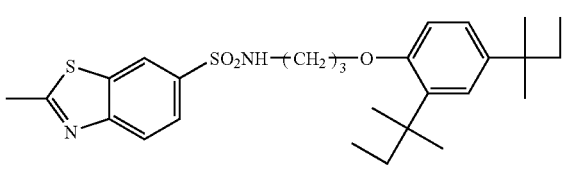 |
| a-22 | 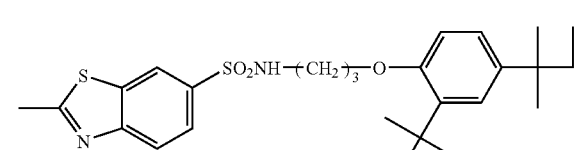 | 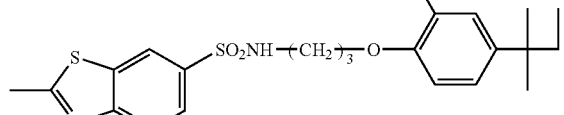 |
| a-23 | 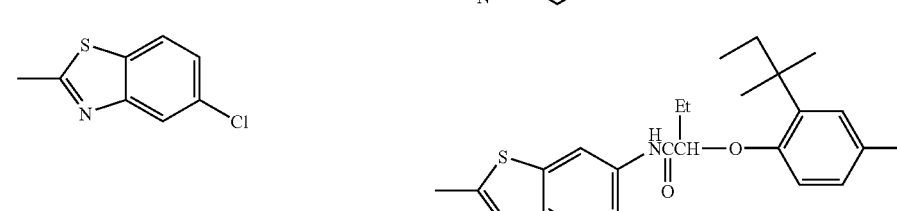 | 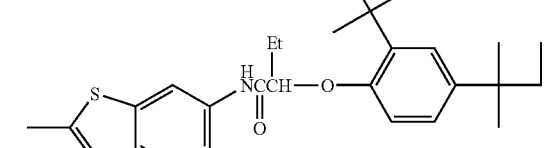 |
| a-24 | 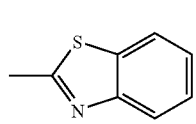 | 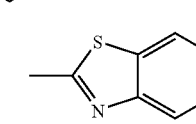 |
| a-25 | 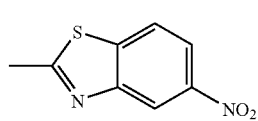 | 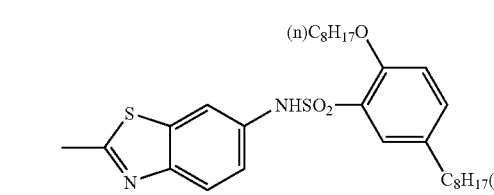 |
| a-26 | 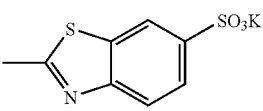 | 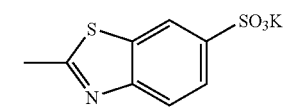 |
| a-27 | 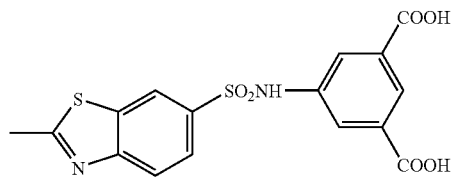 | 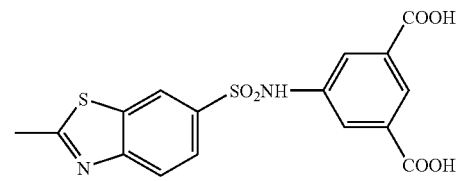 |

TABLE 3-continued
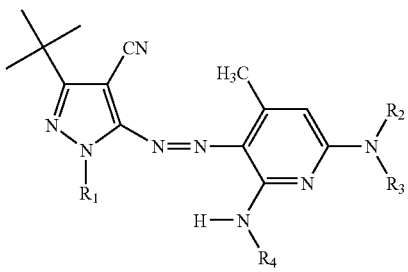
| | | Dye | R₃ | R₄ |
|---|---|---|---|---|
| a-28 | 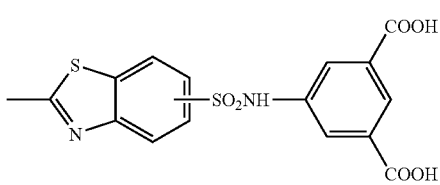 (5,6-mix) | | 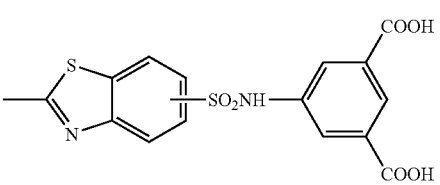 (5,6-mix) | |
| a-29 | 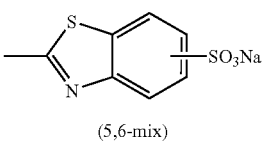 (5,6-mix) | | 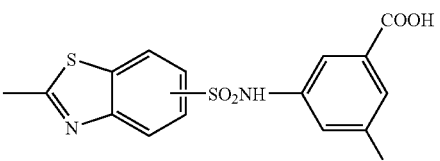 (5,6-mix) | |
| | | a-16 | 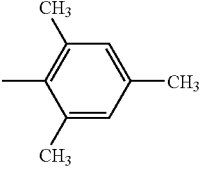 | 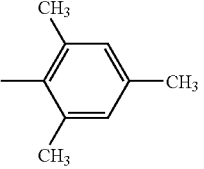 |
| | | a-17 | 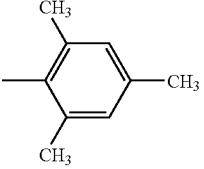 | 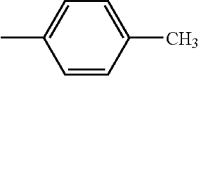 |
| | | a-18 | $C_8H_{17}(t)$ | $C_8H_{17}(t)$ |
| | | a-19 | 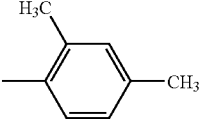 | 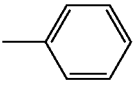 |
| | | a-20 | 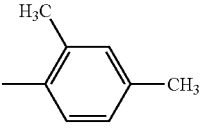 | $C_8H_{17}(t)$ |

TABLE 3-continued
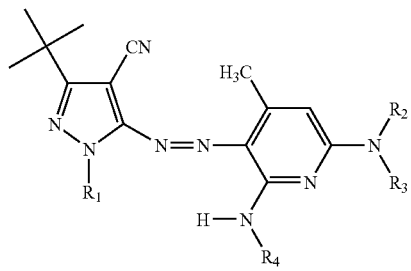
| | | | |
|---|---|---|---|
| a-21 | | 2,4,5-tri-CH₃-C₆H₂ | 2,4,6-tri-CH₃-C₆H₂ |
| a-22 | | 2,4,5-tri-CH₃-C₆H₂ | 2,4,5-tri-CH₃-C₆H₂ |
| a-23 | | 2,4-di-CH₃-C₆H₃ | 2,4-di-CH₃-C₆H₃ |
| a-24 | | 2-OC₁₂H₂₅-6-CH₃-C₆H₃ | 2-OC₁₂H₂₅-6-CH₃-C₆H₃ |
| a-25 | | 4-C₈H₁₇-C₆H₄ | C₈H₁₇(t) |
| a-26 | | 2,4,6-tri-CH₃-C₆H₂ | 2,4,6-tri-CH₃-C₆H₂ |
| a-27 | | 2,4,5-tri-CH₃-C₆H₂ | 2,4,5-tri-CH₃-C₆H₂ |
| a-28 | | 2,4,6-tri-CH₃-C₆H₂ | 2,4,6-tri-CH₃-C₆H₂ |

TABLE 3-continued
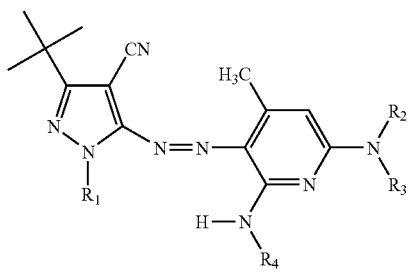
| | a-29 | 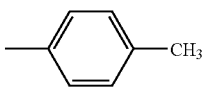 | 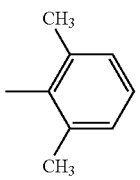 |
TABLE 4
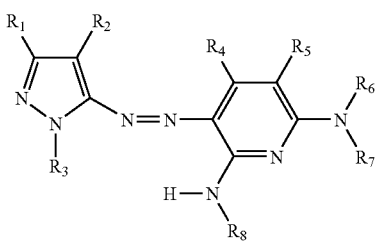
| Dye | R₁ | R₂ | R₃ | R₄ | R₅ |
|---|---|---|---|---|---|
| a-30 | ![o-tolyl] CH₃-phenyl | CN | 2-pyridyl | H | CONH₂ |
| a-31 | t-Bu | Br | 2-pyrimidyl | COOEt | H |
| a-32 | 2-pyridyl | SO₂CH₃ | 4-methyl-2,6-bis(NHCH₃)-1,3,5-triazinyl | CONH₂ | H |
| a-33 | t-Bu | CN | 2,4,5-tricyanophenyl | H | H |

TABLE 4-continued

| Dye | R1 R2 R3 | R2 | (pyridine substituent) | R4 | R5 |
|---|---|---|---|---|---|
| a-34 | t-Bu,t-Bu | Br | 3,5-dichloro-4-methyl-nitrophenyl | H | CONH₂ |
| a-35 | t-Bu,t-Bu | CN | 2-benzothiazolyl | CH₃ | H |
| a-36 | t-Bu,t-Bu | CN | 2-benzothiazolyl | CH₃ | CN |

| Dye | R6 | R7 | R8 |
|---|---|---|---|
| a-30 | SO₂CH₃ | 2-(OC₈H₁₇)phenyl | o-tolyl |
| a-31 | 2-benzothiazolyl | C₈H₁₇(t) | COCH₃ |
| a-32 | 6-Cl-2-benzothiazolyl | p-tolyl | CO-t-Bu |
| a-33 | 5-Cl-2-benzothiazolyl | o-tolyl | SO₂CH₃ |
| a-34 | COCH₃ | 2,4,6-trimethylphenyl | 4-C₈H₁₇-phenyl |
| a-35 | 2-benzothiazolyl | 3,5-diethyl-4-methylphenyl | 3,5-diethyl-4-methylphenyl |

TABLE 4-continued
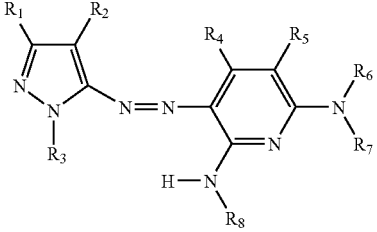
| | | | | |
|---|---|---|---|---|
| a-36 | H | C₂H₅ ... CH₃ structure | | C₂H₅ ... CH₃ structure |
TABLE 5
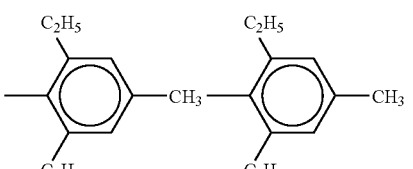
| Dye | $R_1$ | $R_2$ | $R_3$ | $R_4$ | $R_5$ | $R_6$ |
|---|---|---|---|---|---|---|
| b-1 | $CH_3$ | $CH_3$ | CN | H | —C₆H₄—C₈H₁₇ | —C₆H₄—C₈H₁₇ |
| b-2 | $CH_3$ | $CH_3$ | CN | H | 2,4,5-trimethylphenyl | 2,4,5-trimethylphenyl |
| b-3 | $CH_3$ | $CH_3$ | $CONH_2$ | H | —C₆H₄—C₈H₁₇ | 2,4,5-trimethylphenyl |
| b-4 | $CH_3$ | $CH_3$ | H | H | 2,4,5-trimethylphenyl | 2,4,5-trimethylphenyl |
| b-5 | $CH_3$ | H | CN | H | —C₆H₄—SO₃Na | —C₆H₄—SO₃Na |

TABLE 5-continued
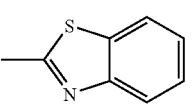
| Dye | R₁ | R₂ | R₃ | R₄ | R₅ | R₆ |
|---|---|---|---|---|---|---|
| b-6 | CH₃ | CH₃ | H | 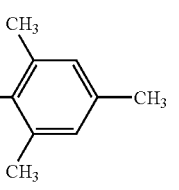 | 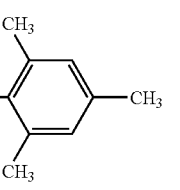 | 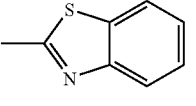 |
| b-7 | CH₃ | CH₃ | H | 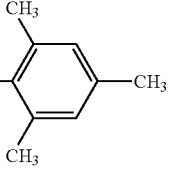 | 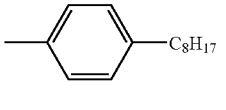 | 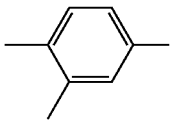 |
| b-8 | CH₃ | H | H | SO₂CH₃ | 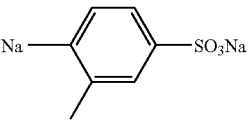 | 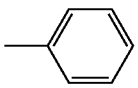 |
TABLE 6
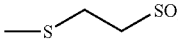
| Dye | R₁ | R₂ | R₃ | R₄ |
|---|---|---|---|---|
| c-1 | —SCH₃ | CH₃ | CN | H |
| c-2 | 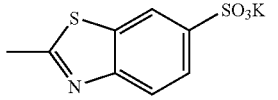 | H | CONH₂ | H |
| c-3 | —S⁓SO₃K | CH₃ | H | (benzothiazole-SO₃K) |

TABLE 6-continued

[Structure: R1-substituted 1,2,4-thiadiazole connected via N=N azo linkage to a pyridine ring bearing R2, R3, NR4R5, and NH-R6 substituents]

| Dye | R1 | R2 | R3 | R4 |
|---|---|---|---|---|
| c-4 | —CH₃ | CH₃ | H | [2-methylbenzothiazol-6-yl-SO₂NH-(CH₂)₃-O- linked to 2,4-di-tert-amylphenyl] |
| c-5 | —C₆H₅ (phenyl) | H | H | [2-methylbenzothiazol-6-yl-NHSO₂- linked to 2-(n-OC₈H₁₇), 5-(t-C₈H₁₇)-phenyl] |

| Dye | R5 | R6 |
|---|---|---|
| c-1 | C₈H₁₇(t) | —C₆H₄—C₈H₁₇ (4-octylphenyl) |
| c-2 | —C₆H₄—SO₃K (4-sulfonatophenyl K salt) | —C₆H₄—SO₃K |
| c-3 | —C₆H₄—SO₃K | —C₆H₄—SO₃K |
| c-4 | 2,4,6-trimethylphenyl (mesityl) | —C₆H₄—C₈H₁₇ |
| c-5 | 2,4,6-trimethylphenyl (mesityl) | C₈H₁₇(t) |

TABLE 7

[Structure: 1,3,4-thiadiazole with $R_1$ at 5-position, azo-linked (N=N) to pyridine bearing $R_2$, $R_3$, with $-NR^4R^5$ and $-NHR^6$ groups]

| Dye | $R_1$ | $R_2$ | $R_3$ | $R_4$ | $R_5$ | $R_6$ |
|---|---|---|---|---|---|---|
| d-1 | Me | CH$_3$ | CN | H | 4-(SO$_3$K)-phenyl | 4-(SO$_3$K)-phenyl |
| d-2 | Me | CH$_3$ | CN | H | 2,5-diethyl-4-methylphenyl | 2,5-diethyl-4-methylphenyl |
| d-3 | Me | H | H | 2-benzothiazolyl | 2,4,6-trimethyl-3,5-dimethylphenyl (mesityl-like, tetramethylphenyl) | 2,4,6-trimethyl-3,5-dimethylphenyl |
| d-4 | Ph | CH$_3$ | CONH$_2$ | H | 4-(C$_8$H$_{17}$)-phenyl | 4-(C$_8$H$_{17}$)-phenyl |
| d-5 | Ph | CH$_3$ | H | 2-methylbenzothiazol-6-yl-SO$_2$NH-(CH$_2$)$_3$-O-[2,4-di-tert-amylphenyl] | 4-(OC$_4$H$_9$(n))-phenyl | 2,5-diethyl-4-methyl-3-ethylphenyl |

TABLE 8

[Structure: benzothiazole with $R_1$ substituent (positions 4–7), azo-linked (N=N) to pyridine bearing $R_2$, $R_3$, with $-NR^4R^5$ and $-NHR^6$ groups]

| Dye | $R_1$ | $R_2$ | $R_3$ | $R_4$ | $R_5$ | $R_6$ |
|---|---|---|---|---|---|---|
| e-1 | 5-Cl | CH$_3$ | CONH$_2$ | H | C$_8$H$_{17}$(t) | C$_8$H$_{17}$(t) |
| e-2 | 5,6-diCl | H | H | 2-methylbenzothiazolyl-phenyl-C$_8$H$_{17}$ | 4-(C$_8$H$_{17}$)-phenyl | 4-(C$_8$H$_{17}$)-phenyl |

TABLE 8-continued

| Dye | $R_1$ | $R_2$ | $R_3$ | $R_4$ | $R_5$ | $R_6$ |
|---|---|---|---|---|---|---|
| e-3 | 5,6-diCl | $CH_3$ | H | 2-methylbenzothiazol-5-yl | 6-chlorobenzothiazol-2-yl | $COCH_3$ |
| e-4 | 5-$CH_3$ | H | CN | H | 4-($SO_3K$)phenyl | 4-($SO_3K$)phenyl |
| e-5 | 5-$NO_2$ | $CH_3$ | H | $SO_2CH_3$ | 2-methylphenyl | 2,4,6-trimethylphenyl |

TABLE 9

| Dye | $R_1$ | $R_2$ | $R_3$ | $R_4$ |
|---|---|---|---|---|
| f-1 | 2-methylbenzothiazol-6-yl-$SO_3K$ | 2,3,4-trimethyl-6-$SO_3K$-phenyl | 2-methylbenzothiazol-6-yl-$SO_3K$ | 2,3,4-trimethyl-6-$SO_3K$-phenyl |
| f-2 | 2-methylbenzothiazol-6-yl-$SO_3Na$ | 3-methyl-4-$SO_3Na$-phenyl | 2-methylbenzothiazol-6-yl-$SO_3Na$ | 3-methyl-4-$SO_3Na$-phenyl |
| f-3 | 2-methylbenzothiazolyl | 3,5-dimethyl-4-$SO_3K$-phenyl | 2-methylbenzothiazolyl | 3,5-dimethyl-4-$SO_3K$-phenyl |

TABLE 9-continued

| Dye | R₁ | R₂ | R₃ | R₄ |
|---|---|---|---|---|
| f-4 | 2-benzothiazolyl | 3,4,6-trimethyl-2,5-disulfo(K)phenyl | 2-benzothiazolyl | 3,4,6-trimethyl-2,5-disulfo(K)phenyl |
| f-5 | 5-nitro-2-benzothiazolyl | 3,4-dimethyl-phenyl-SO₃K | 2-benzothiazolyl-6-SO₃K | 2-methoxy-4-methyl-phenyl-SO₃K |

TABLE 2-1

| Dye | R¹ | R² | R³ | R⁴ |
|---|---|---|---|---|
| 2-a-1 | t-Bu | 2-methylbenzothiazol-6-yl-PO(OH)₂ | 4-methylphenyl | 4-SO₃Na-phenyl |
| 2-a-2 | t-Bu | 2-methylbenzothiazol-6-yl-PO(OH)₂ | 2-SO₃K-phenyl | 2-SO₃K-phenyl |
| 2-a-3 | phenyl | 2-methylbenzothiazol-6-yl-COO⁻⁺NH₄ | 4-PO(OH)₂-phenyl | 3-COO⁻⁺NH₄-phenyl |
| 2-a-4 | 2-Cl-phenyl | 2-methylbenzothiazol-SO₃K (4,5-mix) | 4-PO(OH)₂-phenyl | 3-COOH-phenyl |

TABLE 2-1-continued
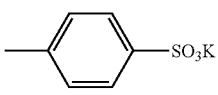
| Dye | R¹ | R² | R³ | R⁴ |
|---|---|---|---|---|
| 2-a-5 | 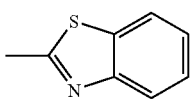 | 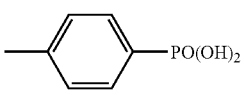 | 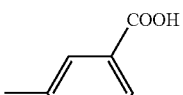 | 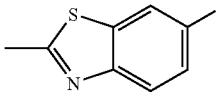 |
TABLE 2-2
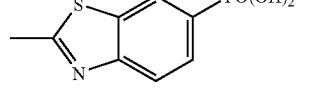
| Dye | R¹ | R² | R³ | R⁴ |
|---|---|---|---|---|
| 2-a-6 | 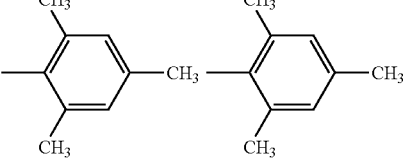 | 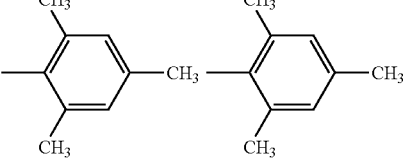 | 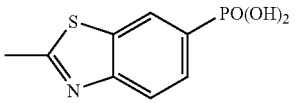 | 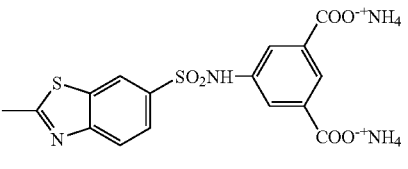 |
| 2-a-7 | 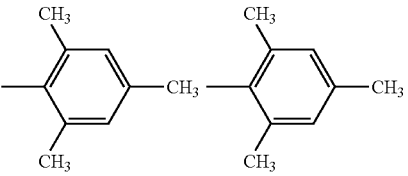 | 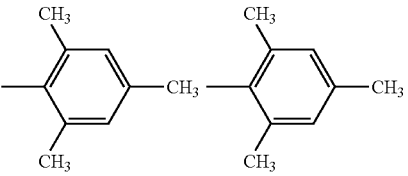 | 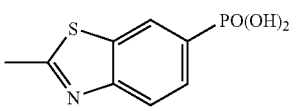 | 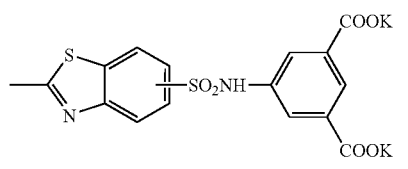 |
| 2-a-8 | 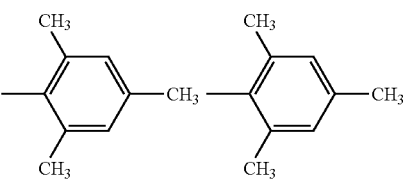 | 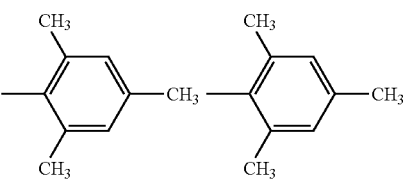 (5,6-mix) | 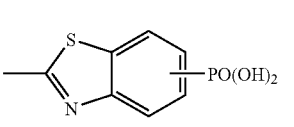 | 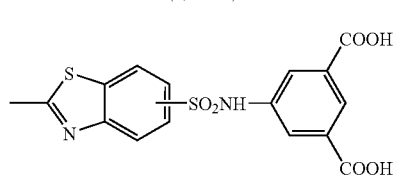 |
| 2-a-9 | 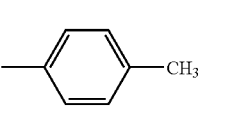 (5,6-mix) | 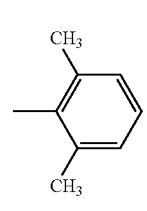 (5,6-mix) | | |

TABLE 2-3

Structure: isothiazole ring with $R^1$ at 3-position, CN at 4-position, and 5-position connected via N=N azo linkage to a pyridine ring bearing $R^2$, $R^3$, $NR^4R^5$, and $NHR^6$ substituents.

| Dye | $R^1$ | $R^2$ | $R^3$ | $R^4$ | $R^5$ | $R^6$ |
|---|---|---|---|---|---|---|
| 2-b-1 | $CH_3$ | $CH_3$ | CN | H | –C$_6$H$_4$–PO(OH)$_2$ | –C$_6$H$_4$–PO(OH)$_2$ |
| 2-b-2 | $CH_3$ | $CH_3$ | CN | H | –(3,4,5-tri-CH$_3$-C$_6$H$_2$)–PO(OH)$_2$ | –(2,3,5,6-tetra-CH$_3$-C$_6$)–PO(OH)$_2$ |
| 2-b-3 | $CH_3$ | $CH_3$ | $CONH_2$ | H | –C$_6$H$_4$–PO(OH)$_2$ | –(2,3,5,6-tetra-CH$_3$-C$_6$)–PO(OH)$_2$ |
| 2-b-4 | $CH_3$ | $CH_3$ | H | 2-methylbenzothiazol-6-yl-SO$_3$Na | –(3,4,5-tri-CH$_3$-C$_6$H$_2$)–PO(OH)$_2$ | –(2,3,5,6-tetra-CH$_3$-C$_6$)–PO(OH)$_2$ |

TABLE 2-4

Structure: 1,3,4-thiadiazole ring with $R^1$ at 3-position, connected at 5-position via N=N azo linkage to a pyridine ring bearing $R^2$, $R^3$, $NR^4R^5$, and $NHR^6$ substituents.

| Dye | $R^1$ | $R^2$ | $R^3$ | $R^4$ | $R^5$ | $R^6$ |
|---|---|---|---|---|---|---|
| 2-c-1 | $-SCH_3$ | $CH_3$ | CN | H | $C_3H_6PO(OH)_2$ | –C$_6$H$_4$–PO(OH)$_2$ |
| 2-c-2 | –C$_6$H$_5$ | H | $CONH_2$ | H | –C$_6$H$_4$–SO$_3$K | –C$_6$H$_4$–PO(OH)$_2$ |
| 2-c-3 | $-CH_2SCH_2CH_2SO_3K$ | $CH_3$ | H | 2-methylbenzothiazol-6-yl-PO(OH)$_2$ | –C$_6$H$_4$–SO$_3$K | –C$_6$H$_4$–SO$_3$K |

TABLE 2-5
| Dye | R¹ | R² | R³ | R⁴ | R⁵ | R⁶ |
|---|---|---|---|---|---|---|
| 2-d-1 | 5-Cl | CH₃ | CONH₂ | H | C₃H₆PO(OH)₂ | C₃H₆PO(OH)₂ |
| 2-d-2 | 5,6-diCl | H | H | 2-methylbenzothiazol-6-yl-PO(OH)₂ | -C₆H₄-SO₃Na | -C₆H₄-SO₃Na |
| 2-d-3 | 5,6-diCl | CH₃ | H | 2-methylbenzothiazol-6-yl-PO(OH)₂ | 3,5-dimethyl-4-PO(OH)₂-phenyl (with CH₃ groups) | COCH₃ |
| 2-d-4 | 5-CH₃ | H | CN | H | -C₆H₄-PO(OH)₂ | -C₆H₄-SO₃K |
Synthesis Examples for the azo dyes represented by formula (1) are shown below.
SYNTHESIS EXAMPLE 1
Synthesis of Compound a-1
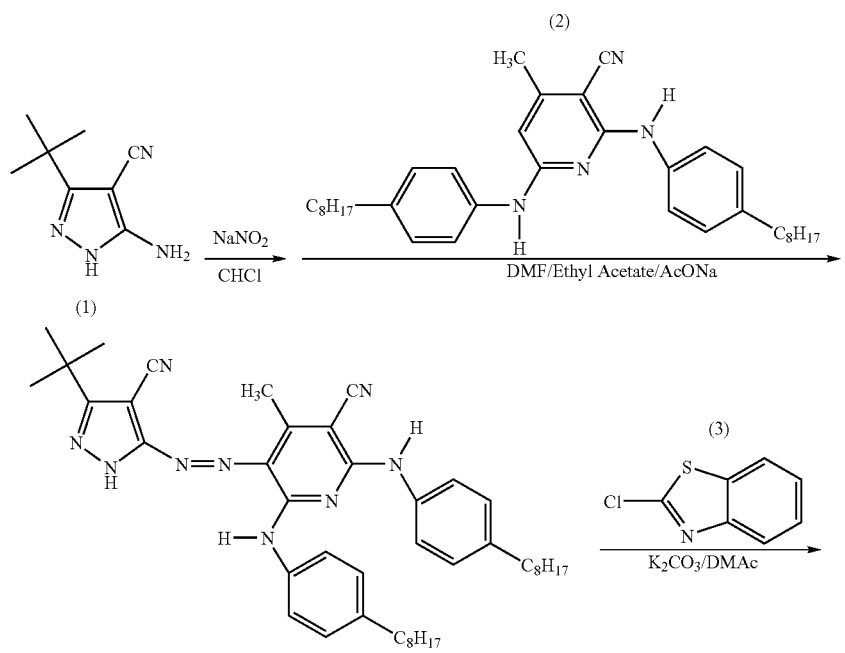

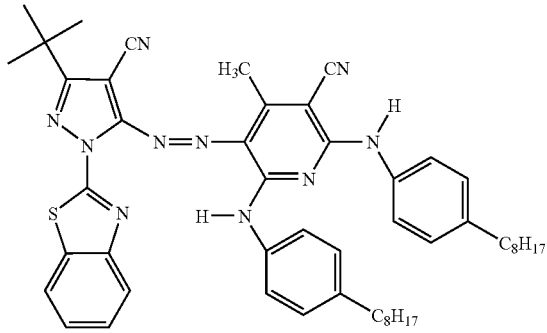

(a-1)

1) Synthesis of Intermediate a-1a

5-Amino-3-t-butyl-4-cyanopyrazole (1) (8 g, 48.7 mmol), 15 ml of concentrated hydrochloric acid, and 50 ml of water were stirred at an inner temperature of 5° C. To the mixture was added 3.36 g (48.7 mmol) of sodium nitrite in divided portions over 10 minutes, followed by stirring at the same temperature for 10 minutes to form a diazonium salt. Separately, 21.3 g (40.6 mmol) of coupling component (2) was put into a three-necked flask, and 50 g of sodium acetate, 50 ml of dimethylformamide (DMF), and 50 ml of ethyl acetate were added and stirred. The diazonium salt solution was added dropwise to the mixture at an inner temperature of 5° C. over 10 minutes. After completion of the addition, the reaction mixture was stirred at that temperature for 30 minutes. A saturated aqueous sodium chloride solution (300 ml) was poured into the reaction mixture. The precipitate thus formed was collected by filtration to give 24.2 g (85%) of compound a-1a.

2) Synthesis of Compound a-1

To 14.0 g (20 mmol) of compound a-1a were added 4.4 g (26 mmol) of heterylating agent (3), 2.8 g of potassium carbonate, and 50 ml of dimethylacetamide (DMAc), and the mixture was heated at 100° C. for 1 hour while stirring. After completion of the reaction, the reaction mixture was cooled to room temperature, and 200 ml of a saturated sodium chloride aqueous solution was added thereto. The precipitate thus formed was collected by filtration and recrystallized from acetonitrile to yield 16.7 g (80%) of azo compound a-1.

$\lambda_{max}$=545 nm (DMF solution) m/z (positive ion mode) =834

SYNTHESIS EXAMPLE 2

Synthesis of Dye b-1

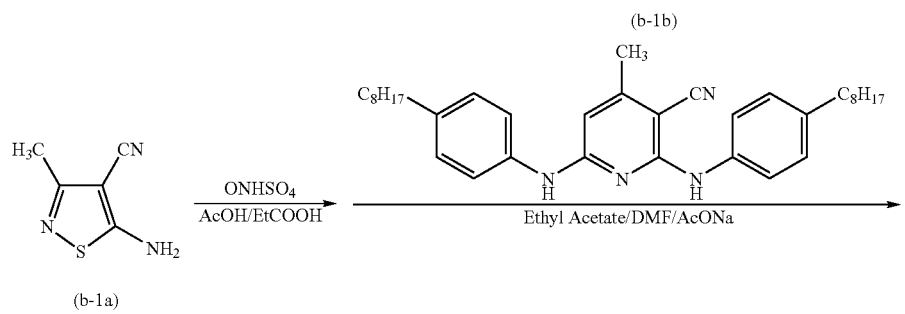

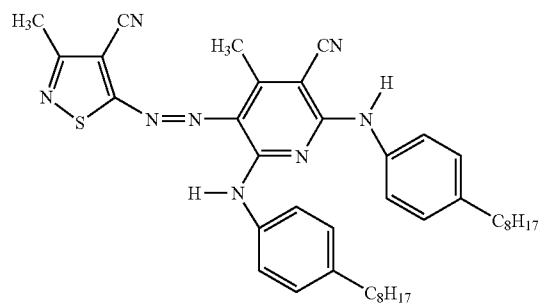

Dye (b-1)

One gram of compound b-1a was dispersed in 3.8 ml of a 2/3 (by volume) mixture of acetic acid and propionic acid, and the dispersion was cooled to 0° C. To the dispersion was slowly added 2.21 g of 41% nitrosylsulfuric acid, followed by stirring for 1 hour. Separately, 1.05 g of compound b-1b was dissolved in a mixture of 14 ml of DMF and 6 ml of ethyl acetate, and 2.5 g of sodium acetate was added thereto, followed by cooling to 0° C. The b-1a dispersion prepared above was added dropwise to the b-1b suspension. After the dropwise addition, the reaction mixture was further allowed to react for an additional 2 hours period. After completion of the reaction, water was added to the reaction mixture. The precipitated crystals were collected by filtration and purified by silica gel column chromatography to yield 750 mg (57.7%) of dye compound b-1.

$\lambda_{max}$=545 nm slowly added 2.21 g of 41% nitrosylsulfuric acid, followed by stirring for 1 hour. Separately, 1.0 g of compound b-6b was dissolved in a mixture of 15 ml of DMF and 5 ml of ethyl acetate, and 2.5 g of sodium acetate was added thereto., followed by cooling to 0° C. The b-6a dispersion prepared above was added dropwise to the b-6b suspension. After the dropwise addition, the reaction mixture was further allowed to react for an additional 2 hour period. After completion of the reaction, water was added to the reaction mixture. The precipitated crystals were collected by filtration and dissolved in 10 ml of DMF. To the solution were added 560 mg of potassium carbonate and 1.3 g of 2-chlorobenzothiazole (b-6c), and the system was allowed to react at 110° C. for 1 hour. After completion of the reaction, water was added. The precipitated crystals were collected by filtration and purified Synthesis of dye b-6

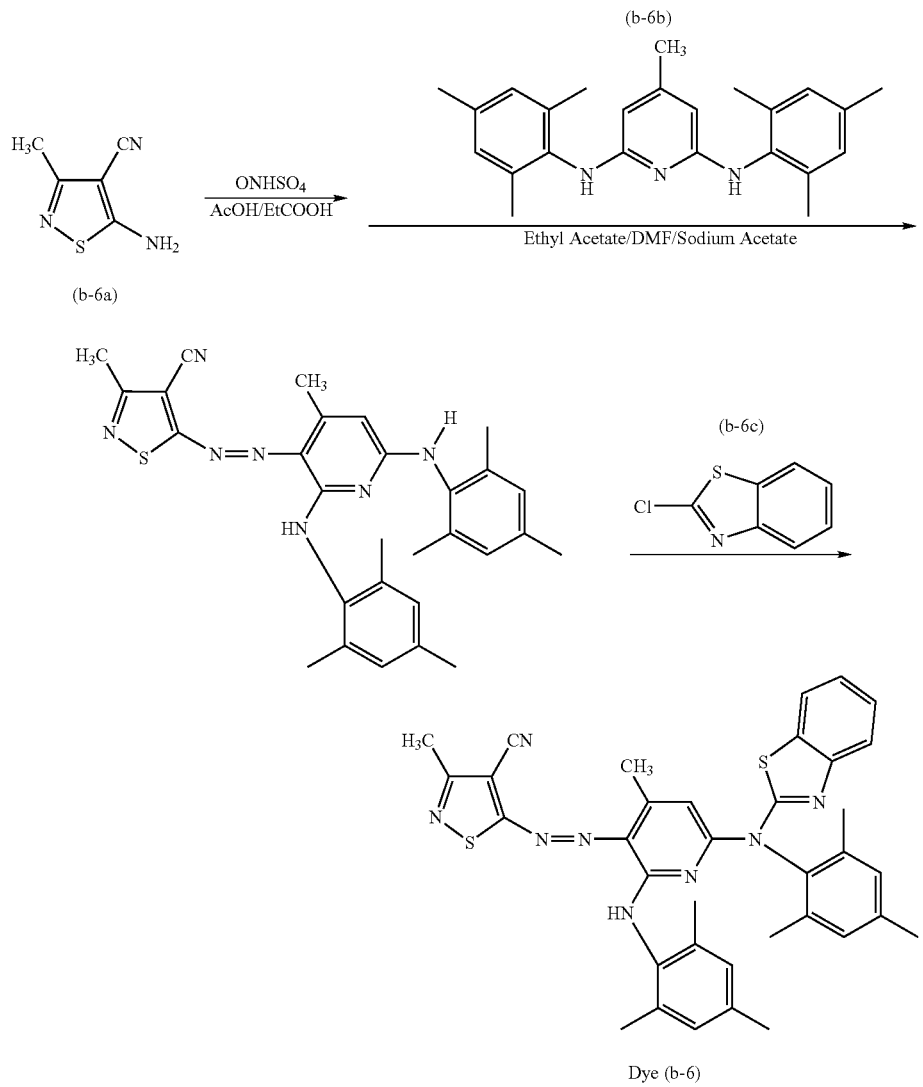

Dye (b-6)

One gram of compound b-6a was dispersed in 3.8 ml of a 2/3 (by volume) mixture of acetic acid and propionic acid, and the dispersion was cooled to 0° C. To the dispersion was by silica gel column chromatography to give 700 mg (58.6%) of dye compound b-6.

$\lambda_{max}$=550 nm

SYNTHESIS EXAMPLE 4

Synthesis of Compound 2-(a-6)

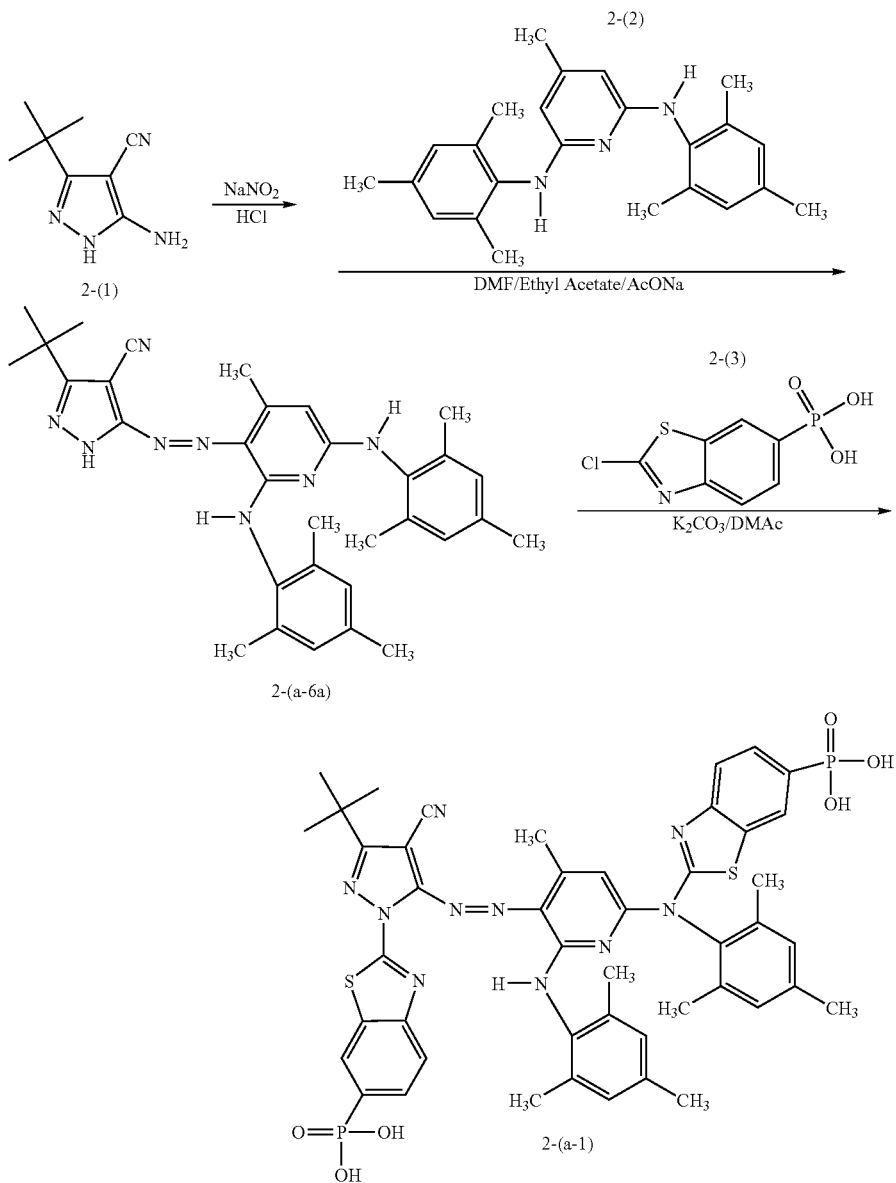

1) Synthesis of Intermediate 2-(a-6a)

5-Amino-3-t-butyl-4-cyanopyrazole 2-(1) (8 g, 48.7 mmol), 15 ml of concentrated hydrochloric acid, and 50 ml of water were stirred at an inner temperature of 5° C. To the mixture was added 3.36 g (48.7 mmol) of sodium nitrite in divided portions over 10 minutes, followed by stirring at the same temperature for 10 minutes to form a diazonium salt. Separately, 14.6 g (40.6 mmol) of coupling component 2-(2) was put into a three-necked flask, and 50 g of sodium acetate and 50 ml of pyridine were added and stirred. The diazonium salt solution was added dropwise to the mixture at an inner temperature of 5° C. over 10 minutes. After completion of the dropwise addition, the reaction mixture was stirred at that temperature for 30 minutes. A saturated aqueous sodium chloride solution (300 ml) was poured into the reaction mixture. The precipitate thus formed was collected by filtration to give 24.2 g (93%) of compound 2-(a-6a).

2) Synthesis of Compound 2-(a-6)

To 10.7 g (20 mmol) of compound 2-(a-6a) were added 15 g (60 mmol) of heterylating agent 2-(3), 8.8 g of potassium carbonate, and 50 ml of dimethylacetamide, and the mixture was heated at 100° C. for 3 hours while stirring. After completion of the reaction, the reaction mixture was cooled to room temperature, and 200 ml of 1N HCl aqueous solution was added thereto. The precipitate thus formed was collected by filtration and recrystallized from acetonitrile to yield 15.4 g (80%) of azo compound 2-(a-6).

λ$_{max}$=558 nm (dimethylformamide solution) m/z (positive ion mode)=960

In formula (3) representing the azo compound according to the invention, Z represents an atomic group necessary to form a hetero ring together with the carbon atom, the nitrogen atom, X, and Y; X represents a nitrogen atom, an oxygen atom or a carbon atom; and Y represents a nitrogen atom, an oxygen atom, a sulfur atom or a carbon atom provided that Y is not a nitrogen atom when X is a carbon atom.

X preferably represents a nitrogen atom or a carbon atoms. Y preferably represents a nitrogen atom, a carbon atom or a sulfur atom. It is preferred that X representing a nitrogen atom be combined with Y representing a carbon atom or a nitrogen atom.

The hetero ring completed by X, Y, and Z includes a pyrrole ring, an indole ring, an imidazole ring, a benzimidazole ring, a triazole ring, an oxazole ring, and a benzoxazole ring, with an imidazole ring and a triazole ring being preferred. The hetero ring can have a substituent at an arbitrary position. Substituents on the hetero ring may be connected to each other to form a cyclic structure. The nitrogen atom of the hetero ring may be quaternarized.

Suitable substituents on the hetero ring include a halogen atom, an alkyl group (including a cycloalkyl group and a bicycloalkyl group), an alkenyl group (including a cycloalkenyl group and a bicycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group, and a silyl group.

The substituents on the hetero ring will be described in more detail. The halogen atom includes chlorine, bromine, and iodine. The term "alkyl group" is intended to include substituted or unsubstituted, straight-chain, branched or cyclic alkyl groups, such as alkyl groups, cycloalkyl groups, bicycloalkyl groups, tricycloalkyl group, and the like. The alkyl group, in its narrow sense of term, preferably contains 1 to 30 carbon atoms, including methyl, ethyl, n-propyl, isopropyl, t-butyl, n-octyl, eicosyl, 2-chloroethyl, 2-cyanoethyl, and 2-ethylhexyl. The cycloalkyl group preferably contains 3 to 30 carbon atoms, including cyclohexyl, cyclopentyl, and 4-n-dodecylcyclohexyl. The bicycloalkyl group preferably contains 5 to 30 carbon atoms (i.e., a monovalent group derived by removing one hydrogen atom from a bicycloalkane having 5 to 30 carbon atoms), including bicyclo[1,2,2]heptan-2-yl and bicyclo[2,2,2]octan-3-yl. The term "alkyl" appearing in substituents hereinafter described, such as "alkyl" in an alkylthio group, has the same meaning as mentioned above.

The term "alkenyl group" means a substituted or unsubstituted, straight-chain, branched or cyclic alkenyl group, including alkenyl groups (preferably containing 2 to 30 carbon atoms, such as vinyl, allyl, pulenyl, geranyl and oleyl), cycloalkenyl groups (preferably containing 3 to 30 carbon atoms, i.e., monovalent groups derived by removing one hydrogen atom from cycloalkenes having 3 to 30 carbon atoms, such as 2-cyclopenten-1-yl and 2-cyclohexen-1-yl), and bicycloalkenyl groups (preferably having 5 to 30 carbon atoms, i.e., monovalent groups derived by removing one hydrogen atoms from bicycloalkenes having one double bond, such as bicyclo[2,2,1]hep-2-en-1-yl and bicyclo[2,2,2]oct-2-en-4-yl).

The alkynyl group is preferably a substituted or unsubstituted alkynyl group having 2 to 30 carbon atoms, e.g., ethynyl, propargyl, and trimethylsilylethynyl. The aryl group is preferably a substituted or unsubstituted aryl group having 6 to 30 carbon atoms, such as phenyl, p-tolyl, naphthyl, m-chlorophenyl, and o-hexadecanoylaminophenyl. The heterocyclic group is preferably a monovalent group derived by removing one hydrogen atom from a substituted or unsubstituted, aromatic or non-aromatic 5-or 6-membered heterocyclic compound, still preferably a 5- or 6-membered aromatic heterocyclic group having 3 to 50 carbon atoms, such as 2-furyl, 2-thienyl, 2-pyrimidinyl, and 2-benzothiazolyl.

The alkoxy group is preferably a substituted or unsubstituted alkoxy group having 1 to 30 carbon atoms, such as methoxy, ethoxy, isopropoxy, t-butoxy, n-octyloxy, and 2-methoxyethoxy. The aryloxy group is preferably a substituted or unsubstituted aryloxy group having 6 to 30 carbon atoms, such as phenoxy, 2-methylphenoxy, 4-t-butylphenoxy, 3-nitrophenoxy, and 2-tetradecanoylaminophenoxy. The silyloxy group preferably contains 3 to 20 carbon atoms, including trimethylsilyloxy and t-butyldimethylsilyloxy. The heterocyclic oxy group is preferably a substituted or unsubstituted heterocyclic oxy group containing 2 to 30 carbon atoms, such as 1-phenyltetrazol-5-oxy and 2-tetrahydropyranyloxy. The acyloxy group preferably includes a formyloxy group, a substituted or unsubstituted alkylcarbonyloxy group having 2 to 30 carbon atoms, e.g., acetyloxy, pivaroyloxy and stearoyloxy, and a substituted or unsubstituted arylcarbonyloxy group having 6 to 30 carbon atoms, e.g., benzoyloxy and p-methoxyphenylcarbonyloxy.

The carbamoyloxy group is preferably a substituted or unsubstituted carbamoyloxy group having 1 to 30 carbon atoms, such as N,N-dimethylcarbamoyloxy, N,N-diethylcarbamoyloxy, morpholinocarbonyloxy, N,N-di-n-octylaminocarbonyloxy, and N-n-octylcarbamoyloxy. The alkoxycarbonyloxy group is preferably a substituted or unsubstituted alkoxycarbonyloxy group having 2 to 30 carbon atoms, such as methoxycarbonyloxy, ethoxycarbonyloxy, t-butoxycarbonyloxy, and n-octylcarbonyloxy. The aryloxycarbonyloxy group is preferably a substituted or unsubstituted aryloxycarbonyloxy group having 7 to 30 carbon atoms, such as phenoxycarbonyloxy, p-methoxyphenoxycarbonyloxy, and p-n-hexadecyloxyphenoxycarbonyloxy.

The amino group preferably includes an unsubstituted amino group, a substituted or unsubstituted alkylamino group having 1 to 30 carbon atoms (e.g., methylamino, dimethylamino), an anilino group, and a substituted anilino group having 6 to 30 carbon atoms (e.g., N-methylanilino and diphenylamino). The acylamino group preferably includes a substituted or unsubstituted alkylcarbonylamino group having 1 to 30 carbon atoms (e.g., formylamino, acetylamino, pivaroylamino, and lauroylamino) and a substituted or unsubstituted arylcarbonylamino group having 6 to 30 carbon atoms (e.g., benzoylamino, 3,4,5-tri-n-octyloxyphenylcarbonylamino). The aminocarbonylamino group preferably includes a substituted or unsubstituted aminocarbonylamino group having 1 to 30 carbon atoms, such as carbamoylamino, N,N-dimethylaminocarbonylamino, N,N-diethylaminocarbonylamino, and morpholinocarbonylamino. The alkoyxycarbonylamino group preferably includes a substituted or unsubstituted alkoxycarbonylamino group having 2 to 30 carbon atoms, such as methoxycarbonylamino, ethoxycarbonylamino, t-butoxycarbonylamino, n-octadecyloxycarbonylamino, and N-methyl-methoxycarbonylamino. The aryloxycarbonylamino group preferably includes a substituted or unsubstituted aryloxycarbonylamino group having 7 to 30 carbon atoms, such as phenoxycarbonylamino, p-chlorophenoxycarbonylamino, and m-(n-octyloxy)phenoxycarbonylamino. The sulfamoylamino group preferably includes a substituted or unsubstituted sulfamoylamino group having up to 30 carbon atoms, such as sulfamoylamino, N,N-dimethylaminosulfonylamino, and N-n-octylaminosulfonylamino. The alkylsulfonylamino group preferably includes a substituted or unsubstituted alkylsulfonylamino group having 1 to 30 carbon atoms, such as methylsulfonylamino and butylsulfonylamino. The arylsulfonylamino group preferably includes a substituted or unsubstituted arylsulfonylamino group having 6 to 30 carbon atoms, such as phenylsulfonylamino, 2,3,5-trichlorophenylsulfonylamino, and p-methylphenylsulfonylamino.

The alkylthio group is preferably a substituted or unsubstituted one having 1 to 30 carbon atoms, such as methylthio, ethylthio, and n-hexadecylthio. The arylthio group is preferably a substituted or unsubstituted one having 6 to 30 carbon atoms, such as phenylthio, p-chlorophenylthio, and m-methoxyphenylthio. The heterocyclic thio group is preferably a substituted or unsubstituted one having 2 to 30 carbon atoms, such as 2-benzothiazolylthio and 1-phenyltetrazol-5-ylthio. The sulfamoyl group is preferably a substituted or unsubstituted one having up to 30 carbon atoms, such as N-ethylsulfamoyl, N-(3-dodecyloxypropyl)sulfamoyl, N,N-dimethylsulfamoyl, N-acetylsulfamoyl, N-benzoylsulfamoyl, and N-(N'-phenylcarbamoyl)sulfamoyl.

The alkylsulfinyl group preferably includes a substituted or unsubstituted alkylsulfinyl group having 1 to 30 carbon atoms, such as methylsulfinyl and ethylsulfinyl. The arylsulfinyl group preferably includes a substituted or unsubstituted arylsulfinyl group having 6 to 30 carbon atoms, such as phenylsulfinyl and p-methylphenylsulfinyl. The alkylsulfonyl group preferably includes a substituted or unsubstituted alkylsulfonyl group having 1 to 30 carbon atoms, such as methylsulfonyl and ethylsulfonyl. The arylsulfonyl group preferably includes a substituted or unsubstituted one having 6 to 30 carbon atoms, such as phenylsulfonyl and p-methylphenylsulfonyl.

The acyl group preferably includes a formyl group, a substituted or unsubstituted alkylcarbonyl group having 2 to 30 carbon atoms (e.g., acetyl, pivaroyl, 2-chloroacetyl, and stearoyl), a substituted or unsubstituted arylcarbonyl group having 7 to 30 carbon atoms (e.g., benzoyl and p-n-octyloxyphenylcarbonyl), and a substituted or unsubstituted heterocyclic carbonyl group (with a carbonyl group bonded to the carbon atom of a hetero ring) (e.g., 2-pyridylcarbonyl and 2-furylcarbonyl). The aryloxycarbonyl group is preferably a substituted or unsubstituted one having 7 to 30 carbon atoms, such as phenoxycarbonyl, p-chlorophenoxycarbonyl, m-nitrophenoxycarbonyl, and p-t-butylphenoxycarbonyl. The alkoxycarbonyl group is preferably a substituted or unsubstituted one having 2 to 30 carbon atoms, such as methoxycarbonyl, ethoxycarbonyl, t-butoxycarbonyl, and n-octadecyloxycarbonyl.

The carbamoyl group is preferably a substituted or unsubstituted one having 1 to 30 carbon atoms, such as carbamoyl, N-methylcarbamoyl, N,N-dimethylcarbamoyl, N,N-di-n-octylcarbamoyl, and N-(methylsulfonyl)carbamoyl. The aryl- or heterocyclic azo group preferably includes a substituted or unsubstituted arylazo group having 6 to 30 carbon atoms, such as phenylazo and p-clorophenylazo, and a substituted or unsubstituted heterocyclic azo group having 3 to 30 carbon atoms, such as 5-ethylthio-1,3,4-thiadiazol-2-ylazo. The imido group preferably includes an N-succinimido group and an N-phthalimido group.

The phosphino group preferably includes a substituted or unsubstituted phosphino group having 2 to 30 carbon atoms, such as dimethylphosphino, diphenylphosphino, and methylphenoxyphosphino. The phosphinyl group is preferably a substituted or unsubstituted phosphinyl group having 2 to 30 carbon atoms, such as phosphinyl, dioctyloxyphosphinyl, and diethoxyphosphinyl. The phosphinyloxy group is preferably a substituted or unsubstituted one having 2 to 30 carbon atoms, such as diphenoxyphosphinyloxy and dioctyloxyphosphinyloxy. The phosphinylamino group is preferably a substituted or unsubstituted one having 2 to 30 carbon atoms, such as dimethoxyphosphinylamino and dimethylaminophosphinylamino. The silyl group is preferably a substituted or unsubstituted silyl group having 3 to 30 carbon atoms, such as trimethylsilyl, t-butyldimethylsilyl, and phenyldimethylsilyl.

As stated previously, the substituents on the hetero ring additionally include a cyano group, a hydroxyl group, a nitro group, a carboxyl group, a mercapto group, and a sulfo group.

Of the above-recited functional groups those having a hydrogen atom may have the hydrogen atom substituted with the above-recited substituents. Such substituted functional groups include an alkylcarbonylaminosulfonyl group, an arylcarbonylaminosulfonyl group, an alkylsulfonylaminocarbonyl group, and an arylsulfonylaminocarbonyl group. Specific examples are methylsulfonylaminocarbonyl, p-methylphenylsulfonylaminocarbonyl, acetylaminosulfonyl, and benzoylaminosulfonyl.

Preferred substituents on the hetero ring completed by X, Y, and Z are a halogen atom, an alkyl group, an aryl group, a heterocyclic group, a cyano group, a nitro group, a carboxyl group, a sulfo group, an alkylsulfonyl group, an arylsulfonyl group, and an alkoxycarbonyl group. Where substituents on the hetero ring are connected together to form a cyclic structure, the cyclic structure is preferably a benzene or pyridine ring condensed with the hetero ring.

In formula (3), $A_1$ and $A_2$ both represent a substituted or unsubstituted carbon atom, or one of them represents a substituted or unsubstituted carbon atom with the other representing a nitrogen atom, provided that $A_2$ does not have a nitro group as a substituent. It is preferred that $A_1$ and $A_2$ both represent a substituted or unsubstituted carbon atom for better performance.

The substituents of the substituted carbon atom as $A_1$ or $A_2$ preferably include a halogen atom, an alkyl group having 1 to 3 carbon atoms, a substituted or unsubstituted aryl group, a carboxyl group, a carboxylic acid alkyl ester group having 1 to 3 carbon atoms, an alkoxycarbonyl group, a carbamoyl group, and a cyano group. Still preferred substituents are a methyl group, an ethyl group, a cyano group, a carbamoyl group, and a carboxyl group.

$A_1$ is preferably a carbon atom or a carbon atom having a methyl group as a substituent. $A_2$ is preferably a carbon atom or a carbon atom having a cyano group, a carbamoyl group or a carboxyl group as a substituent.

In formula (3), $R_1$, $R_2$, $R_3$, and $R_4$ each represent a hydrogen atom, an alkyl group, a cycloalkyl group, an aralkyl group, an alkenyl group, an aryl group, a heterocyclic group, a sulfonyl group, an acyl group, a carboxyl group or a carbamoyl group, wherein each group may have a substituent. The groups as $R_1$, $R_2$, $R_3$, and $R_4$ will further be described below.

The alkyl group includes a substituted alkyl group and an unsubstituted alkyl group. The alkyl group preferably contains 1 to 12 carbon atom, particularly 1 to 6 carbon atoms. Substituents for the alkyl group include a hydroxyl group, an alkoxy group, a cyano group, a halogen atom, and an ionic hydrophilic group. Specific examples of the alkyl group are methyl, ethyl, butyl, isopropyl, t-butyl, hydroxyethyl, methoxyethyl, cyanoethyl, trifluoromethyl, 3-sulfopropyl, and 4-sulfobutyl.

The cycloalkyl group includes a substituted or unsubstituted cycloalkyl group which preferably contains 5 to 12 carbon atoms, such as cyclohexyl. Substituents for the cycloalkyl group include ionic hydrophilic groups.

The aralkyl group includes a substituted or unsubstituted one which preferably contains 7 to 12 carbon atoms, such as benzyl and 2-phenethyl. Substituents for the aralkyl group include ionic hydrophilic groups.

The alkenyl group includes a substituted alkenyl group and an unsubstituted which preferably has 5 to 12 carbon atoms. Substituents for the alkenyl group include ionic hydrophilic groups. Examples of the alkenyl group are a vinyl group and an allyl group.

The aryl group includes a substituted or unsubstituted aryl group which preferably has 7 to 12 carbon atoms. Substituents for the aryl group include an alkyl group, an alkoxy group, a halogen atom, an alkylamino group, and an ionic hydrophilic group. Examples of the aryl group are phenyl, p-tolyl, p-methoxyphenyl, o-chlorophenyl, and m-(3-sulfopropylamino)phenyl.

The heterocyclic group includes a substituted or unsubstituted heterocyclic group. A 5- or 6-membered heterocyclic group is preferred. Substituents for the heterocyclic group include ionic hydrophilic groups. Examples of the heterocyclic group are 2-pyridyl, 2-thienyl, 2-thiazolyl, 2-benzothiazolyl, and 2-furyl. The sulfonyl group includes a methanesulfonyl group and a phenylsulfonyl group. The acyl group includes a substituted or unsubstituted acyl group which preferably has 1 to 12 carbon atoms, such as acetyl and benzoyl. Substituents for the acyl group include ionic hydrophilic groups.

$R_1$, $R_2$, $R_3$, and $R_4$ each preferably represent a hydrogen atom, an alkyl group having 1 to 8 carbon atoms, an aryl group, a sulfonyl group, an acyl group or a heterocyclic group, still preferably a sulfonyl group, an acyl group, an aryl group or a heterocyclic group. Note that $R_1$ and $R_2$ do not simultaneously represent a hydrogen atom and that $R_3$ and $R_3$ do not simultaneously represent a hydrogen atom, either.

It is particularly preferred that $R_1$ and $R_3$ each represent an aryl group or a heterocyclic group and that $R_2$ is a hydrogen atom. The aryl group as $R_1$ and $R_3$ is preferably an aryl group substituted with an alkyl group, an alkoxy group, an aryloxy group, an alkoxycarbonyl group, an aryloxycarbonyl group, a sulfo group, a halogen atom, a sulfamoyl group, a carbamoyl group, a carbamoyloxy group, an alkoxycarbonyloxy group, an aryloxycarbonyloxy group, an acylamino group, an aminocarbonylamino group, an alkoxycarbonylamino group, an aryloxycarbonylamino group, a sulfamoylamino group, an alkylsulfonylamino group, an arylsulfonylamino group, an acyl group, etc.

While the azo group in azo compounds can be an azo type —N=N— or a hydrazo type =N—NH— according to the structure, both are described as an azo type in the present invention.

The azo compound of formula (3) is prepared by a process comprising the steps of:

(a) diazotizing a heterocyclic primary amine with a diazotizing agent to form a diazonium salt and (b) allowing the diazonium salt to react with a coupling component.

Diazotization of a heterocyclic primary amine can be carried out with reference, e.g., to *Chemical Reviews,* vol. 75, p. 241 (1975). The diazotizing agent which can be used includes a diluted hydrochloric acid aqueous solution of sodium nitrite, isopentyl nitrite, and nitrosylsulfuric acid.

The pyridine coupling component which can be used in step (b) is synthesized by processes described, e.g., JP-A-51-83631, JP-A-49-74718, and JP-B-52-46230 (the term "JP-B" as used herein means an "examined Japanese patent publication").

Specific examples of the azo compounds represented by formula (3) are listed below for illustrative purposes only but not for limitation.

TABLE 3-1

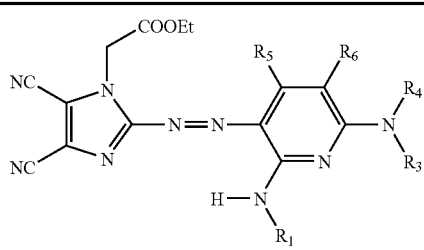

| Dye | $R_1$ | $R_3$ | $R_4$ | $R_5$ | $R_6$ |
|-----|-------|-------|-------|-------|-------|
| 3-1 | Ph | Ph | H | $CH_3$ | CN |
| 3-2 | Ph | Ph | H | $CH_3$ | $CONH_2$ |
| 3-3 | Ph | Ph | H | $CH_3$ | COOH |
| 3-4 | Ph | Ph | H | $CH_3$ | H |
| 3-5 | Ph | Ph | H | H | |

TABLE 3-1-continued

[Structure: imidazole with NC, NC substituents, N-CH2-COOEt group, connected via N=N azo linkage to a pyridine ring bearing R5, R6, NR3R4 substituents and NHR1 group]

| Dye | $R_1$ | $R_3$ | $R_4$ | $R_5$ | $R_6$ |
|---|---|---|---|---|---|
| 3-6 | Ph | Ph | H | H | $CONH_2$ |
| 3-7 | Ph | Ph | H | H | COOH |
| 3-8 | Ph | Ph | H | H | H |
| 3-9 | Ph | Ph | $SO_2CH_3$ | $CH_3$ | H |
| 3-10 | Ph | Ph | 2-benzothiazolyl | $CH_3$ | H |
| 3-11 | Ph | Ph | 2-benzothiazolyl | H | H |
| 3-12 | 4-$^nC_8H_{17}$-phenyl | 4-$^nC_8H_{17}$-phenyl | H | $CH_3$ | CN |
| 3-13 | 4-$^nC_8H_{17}$-phenyl | 4-$^nC_8H_{17}$-phenyl | H | H | CN |
| 3-14 | 4-$^nC_8H_{17}$-phenyl | 4-$^nC_8H_{17}$-phenyl | H | $CH_3$ | $CONH_2$ |
| 3-15 | 4-$^nC_8H_{17}$-phenyl | 4-$^nC_8H_{17}$-phenyl | H | $CH_3$ | H |
| 3-16 | 4-$^nC_8H_{17}$-phenyl | 4-$^nC_8H_{17}$-phenyl | H | H | H |
| 3-17 | 2,4,5-trimethylphenyl | 2,4,5-trimethylphenyl | H | $CH_3$ | CN |
| 3-18 | 2,4,5-trimethylphenyl | 2,4,5-trimethylphenyl | $SO_2CH_3$ | $CH_3$ | H |

TABLE 3-1-continued

[Structure: imidazole with COOEt-CH2-N, NC, NC substituents, connected via N=N azo to pyridine ring with R5, R6, NR3R4, and NH-R1 substituents]

| Dye | R₁ | R₃ | R₄ | R₅ | R₆ |
|---|---|---|---|---|---|
| 3-19 | 2,3,5-trimethylphenyl | 2,3,5-trimethylphenyl | 2-benzothiazolyl | H | H |
| 3-20 | 2,3,5-trimethylphenyl | 2,3,5-trimethylphenyl | H | CH₃ | CN |
| 3-21 | 4-SO₃K-phenyl | 4-SO₃K-phenyl | H | CH₃ | CN |
| 3-22 | 2-OC₁₂H₂₅-phenyl | 2-OC₁₂H₂₅-phenyl | H | CH₃ | CN |
| 3-23 | 3,5-di(COOH)phenyl | 3,5-di(COOH)phenyl | H | CH₃ | CN |

TABLE 3-2

[Structure: triazole with COO'Bu-CH2-N and Ph substituent, connected via N=N azo to pyridine ring with R5, R6, NR3R4, and NH-R1 substituents]

| Dye | R₁ | R₃ | R₄ | R₅ | R₆ |
|---|---|---|---|---|---|
| 3-24 | Ph | Ph | H | CH₃ | CN |
| 3-25 | Ph | Ph | H | CH₃ | CONH₂ |
| 3-26 | Ph | Ph | H | CH₃ | COOH |
| 3-27 | Ph | Ph | H | CH₃ | H |
| 3-28 | Ph | Ph | H | H | CN |
| 3-29 | Ph | Ph | H | H | CONH₂ |
| 3-30 | Ph | Ph | H | H | COOH |

TABLE 3-2-continued
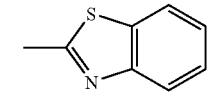
| Dye | R₁ | R₃ | R₄ | R₅ | R₆ |
|---|---|---|---|---|---|
| 3-31 | Ph | Ph | H | H | H |
| 3-32 | Ph | Ph | SO₂CH₃ | CH₃ | H |
| 3-33 | Ph | Ph | 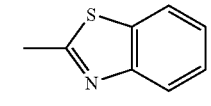 | CH₃ | H |
| 3-34 | Ph | Ph | 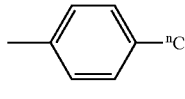 | H | H |
| 3-35 | 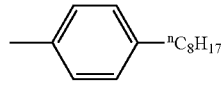 | 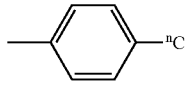 | H | CH₃ | CN |
| 3-36 | 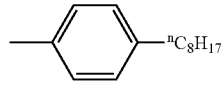 | 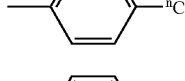 | H | H | CN |
| 3-37 | 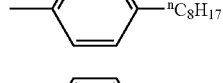 | 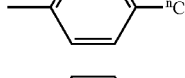 | H | CH₃ | CONH₂ |
| 3-38 | 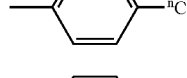 | 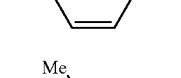 | H | CH₃ | H |
| 3-39 | 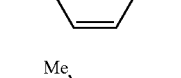 | 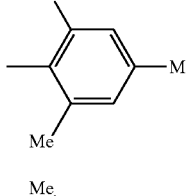 | H | H | H |
| 3-40 | 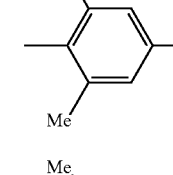 | 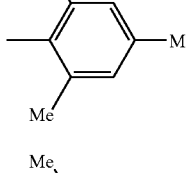 | H | CH₃ | CN |
| 3-41 | 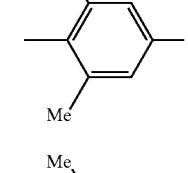 | 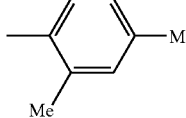 | SO₂CH₃ | CH₃ | H |
| 3-42 | 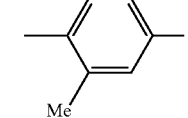 | 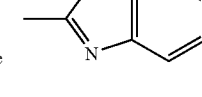 | (2-benzothiazolyl) | H | H |

TABLE 3-2-continued
| Dye | R₁ | R₃ | R₄ | R₅ | R₆ |
|---|---|---|---|---|---|
| 3-43 | 2,4,5-trimethylphenyl | 2,4,5-trimethylphenyl | H | CH₃ | CN |
| 3-44 | 4-(SO₃K)phenyl | 4-(SO₃K)phenyl | H | CH₃ | CN |
| 3-45 | 2-OC₁₂H₂₅-phenyl | 2-OC₁₂H₂₅-phenyl | H | CH₃ | CN |
| 3-46 | 3,5-di(COOH)phenyl | 3,5-di(COOH)phenyl | H | CH₃ | CN |
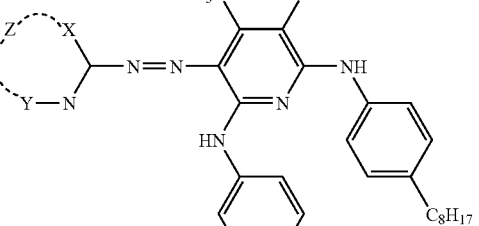
TABLE 3-3
| Dye | Substituent |
|---|---|
| 3-47 | 1-methyl-4,5-dicyanoimidazol-2-yl / 2-methyl-4,5-dicyano |
| 3-48 | 1-ethyl-4,5-dichloro-2-methylimidazole |

TABLE 3-3-continued

| Dye | structure |
|---|---|
| 3-49 | 1,2-dimethyl-4-nitroimidazole |
| 3-50 | 1-(methoxycarbonylmethyl)-3-(methylsulfonyl)-5-methyl-1,2,4-triazole |
| 3-51 | 1-(carboxymethyl)-5-methyl-3-(3-sulfokalium-phenyl)-1,2,4-triazole |
| 3-52 | 1-(3-sulfonatopropyl)-3-cyano-5-methyl-1,2,4-triazole |
| 3-53 | 5,6-dichloro-1,2-dimethylbenzimidazole |
| 3-54 | 5,6-bis(trifluoromethyl)-1-(2,2,2-trifluoroethyl)-2-methylbenzimidazole |
| 3-55 | 2-methylbenzoxazole |

TABLE 3-3-continued

| Dye | structure |
|---|---|
| 3-56 | 1,2-dimethylindole |
| 3-57 | 1-ethyl-2-methyl-5-carboxyindole |
| 3-58 | 1,2-dimethyl-7-azaindole |

TABLE 3-4

| Dye | structure |
|---|---|
| 3-59 | 1,2-dimethyl-4,5-dicyanoimidazole |

TABLE 3-4-continued

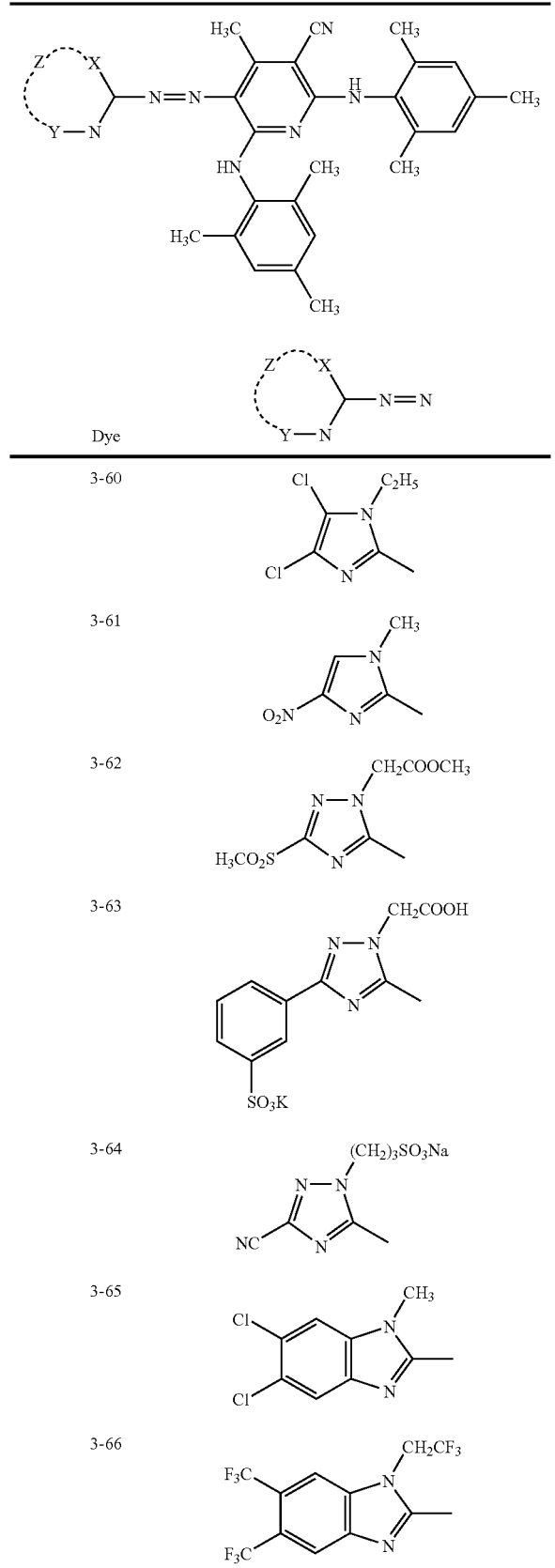

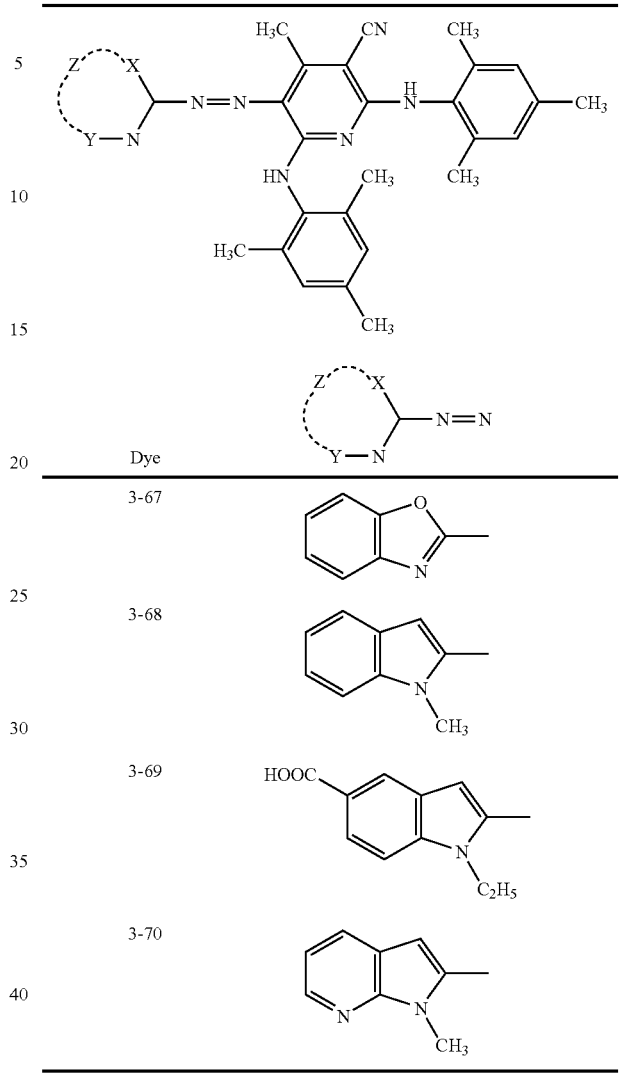

In formula (4) representing the azo compound according to the present invention, $Z_1$ represents an atomic group necessary to form a hetero ring together with the carbon atom and the sulfur atom. The hetero ring formed by $Z_1$ preferably includes a thiophene ring, a thiazole ring, a benzothiazole ring, an isothiazole ring, a benzisothiazole ring, a 1,3,4-thiadiazole ring, and a 1,2,4-thiadiazole ring, with a thiazole ring, a benzothiazole ring, an isothiazole ring, a benzisothiazole ring, a 1,3,4-thiadiazole ring, and a 1,2,4-thiadiazole ring being still preferred. An isothiazole ring, a 1,3,4-isothiazole ring, and a 1,2,4-isothiazole ring are particularly preferred. An isothiazole ring is the most preferred. The hetero ring can have a substituent at an arbitrary position. Where the hetero ring is a nitrogen-containing ring, the nitrogen atom may be quaternarized.

$A_{11}$ and $A_{12}$ each represent a substituted or unsubstituted carbon atom or a nitrogen atom provided that $A_{11}$ and $A_{12}$ do not simultaneously represent a nitrogen atom. $A_{11}$ and $A_{12}$ each preferably represent a substituted or unsubstituted carbon atom.

The monovalent substituent of the substituted carbon atom as $A_{11}$ or $A_{12}$ includes the groups recited below as $R_{11}$, $R_{12}$, $R_{13}$, and $R_{14}$ and a cyano group. Preferred of these substituents are an alkyl group having 1 to 3 carbon atoms, a carboxyl group, a carboxyl group substituted with an alkyl group having 1 to 3 carbon atoms, a carbamoyl group, and a cyano group.

$R_{11}$, $R_{12}$, $R_{13}$, and $R_{14}$ each represent a hydrogen atom, an alkyl group, a cycloalkyl group, an aralkyl group, an alkenyl group, an aryl group, a heterocyclic group, a sulfonyl group, an acyl group, a carboxyl group or a carbamoyl group, wherein each group may have a substituent, provided that at least one of $R_{11}$ and $R_{12}$ represents a substituted or unsubstituted aryl group or a substituted or unsubstituted heterocyclic group and that $R_{13}$ and $R_{14}$ do not represent a hydrogen atom simultaneously. These groups will further be described below.

The alkyl group includes a substituted one and an unsubstituted one. The alkyl group preferably contains 1 to 12 carbon atoms, particularly 1 to 6 carbon atoms. The substituents of the substituted alkyl group include a hydroxyl group, an alkoxy group, a cyano group, a halogen atom, and an ionic hydrophilic group. Examples of the alkyl group are methyl, ethyl, butyl, isopropyl, t-butyl, hydroxyethyl, methoxyethyl, cyanoethyl, trifluoromethyl, 3-sulfopropyl, and 4-sulfobutyl.

The cycloalkyl group includes a substituted one and an unsubstituted one. The cycloalkyl group preferably contains 5 to 12 carbon atoms. The substituents of the substituted cycloalkyl group include ionic hydrophilic groups. Examples of the cycloalkyl group include a cyclohexyl group.

The aralkyl group includes a substituted one and an unsubstituted one. The aralkyl group preferably has 7 to 12 carbon atoms. The substituents include ionic hydrophilic groups. Examples of the aralkyl group include benzyl and 2-phenethyl.

The alkenyl group includes a substituted one and an unsubstituted one. The alkenyl group preferably has 5 to 12 carbon atoms. The substituent includes ionic hydrophilic groups. Examples of the alkenyl group are vinyl and allyl.

The aryl group includes a substituted one and an unsubstituted one. The aryl group preferably contains 7 to 12 carbon atoms. The substituents on the substituted aryl group include an alkyl group, an alkoxy group, a halogen atom, an alkylamino group, and an ionic hydrophilic group. Examples of the aryl group are phenyl, p-tolyl, p-methoxyphenyl, o-chlorophenyl, and m-(3-sulfopropylamino)phenyl.

The heterocyclic group includes a substituted one and an unsubstituted one. A 5- or 6-membered heterocyclic group is preferred. Substituents for the heterocyclic group include ionic hydrophilic groups. Examples of the heterocyclic group are 2-pyridyl, 2-thienyl, 2-thiazolyl, 2-benzothiazolyl, and 2-furyl.

The sulfonyl group includes a methanesulfonyl group and a phenylsulfonyl group. The acyl group includes a substituted one and an unsubstituted one. The acyl group preferably has 1 to 12 carbon atoms. Substituents for the acyl group include ionic hydrophilic groups. Examples of the acyl group are acetyl and benzoyl.

$R_{11}$, $R_{12}$, $R_{13}$, and $R_{14}$ each preferably represent a hydrogen atom, an alkyl group having 1 to 8 carbon atoms, an aryl group, a sulfonyl group, an acyl group or a heterocyclic group and still preferably represent a sulfonyl group, an acyl group, an aryl group or a heterocyclic group. As previously defined, at least one of $R_{11}$ and $R_{12}$ is an aryl group or a heterocyclic group, and $R_{13}$ and $R_{14}$ do not represent a hydrogen atom simultaneously.

It is particularly preferred that $R_{11}$ and $R_{13}$ each represent an aryl group or a heterocyclic group and that $R_{12}$ represents a hydrogen atom. The aryl group as $R_{11}$ or $R_{13}$ is preferably a substituted aryl group. Substituents for this aryl group include an alkyl group, an alkoxy group, an aryloxy group, an alkoxycarbonyl group, an aryloxycarbonyl group, a sulfo group, a halogen atom, a sulfamoyl group, a carbamoyl group, a carbamoyloxy group, an alkoxycarbonyloxy group, an aryloxycarbonyloxy group, an acylamino group, an aminocarbonylamino group, an alkoxycarbonylamino group, an aryloxycarbonylamino group, a sulfamoylamino group, an alkylsulfonylamino group, an arylsulfonylamino group, and an acyl group.

Of the compounds represented by formula (4) preferred are those represented by formula (5):

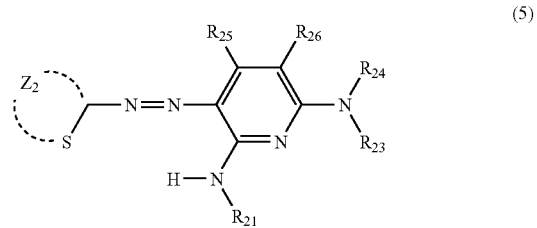

(5)

wherein $Z_2$ has the same meaning as $Z_1$; $R_{21}$ represents a substituted or unsubstituted aryl group or a substituted or unsubstituted heterocyclic group; $R_{23}$ and $R_{24}$ each represent a hydrogen atom, an alkyl group, a cycloalkyl group, an aralkyl group, an alkenyl group, an aryl group, a heterocyclic group, a sulfonyl group, an acyl group, a carboxyl group or a carbamoyl group, wherein each group may have a substituent; and $R_{25}$ and $R_{26}$ each represent a hydrogen atom or a monovalent substituent.

A preferred range for $Z_2$ is the same as for $Z_1$ in formula (4). The substituents that $R_{21}$, $R_{23}$ or $R_{24}$ can have preferably include a straight-chain or branched alkyl group having 1 to 20 carbon atoms (e.g., methyl, ethyl, propyl, butyl, hexyl and octyl), a straight-chain or branched alkoxy group having 1 to 20 carbon atoms (e.g., methoxy, ethoxy, propoxy or butoxy), and an ionic hydrophilic group (e.g., carboxyl or a salt thereof, or sulfo or a salt thereof).

The monovalent substituent as $R_{25}$ and $R_{26}$ preferably includes the groups recited above as $R_{11}$, $R_{12}$, $R_{13}$, and $R_{14}$ and a cyano group. $R_{25}$ and $R_{26}$ each preferably represent a hydrogen atom, an alkyl group having 1 to 3 carbon atoms, a carboxyl group, a carboxyl group substituted with an alkyl group having 1 to 3 carbon atoms, a carbamoyl group, and a cyano group. In particular, $R_{25}$ is preferably a hydrogen atom, an alkyl group having 1 to 3 carbon atoms or a carboxyl group which may be substituted with an alkyl group having 1 to 3 carbon atoms; and $R_{26}$ is preferably a hydrogen atom, a carbamoyl group or a cyano group.

Of the preferred compounds represented by formula (5) those represented by formula (6) are still preferred:

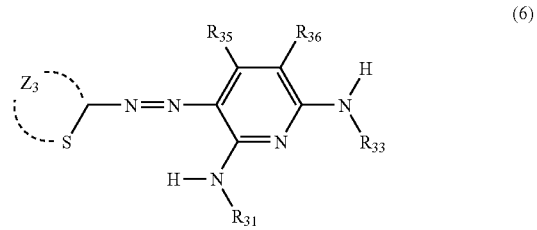

(6)

wherein $Z_3$ has the same meaning as $Z_1$; $R_{31}$ represents a substituted or unsubstituted aryl group or a substituted or unsubstituted heterocyclic group; $R_{33}$ represents an alkyl group, a cycloalkyl group, an aralkyl group, an alkenyl group, an aryl group, a heterocyclic group, a sulfonyl group, an acyl group, a carboxyl group or a carbamoyl group, each of which may have a substituent; and $R_{35}$ and $R_{36}$ each represent a hydrogen atom or a monovalent substituent.

A preferred range for $Z_3$ is the same as for $Z_1$ in formula (4). The substituents that $R_{31}$ or $R_{33}$ can have preferably include a straight-chain or branched alkyl group having 1 to 20 carbon atoms (e.g., methyl, ethyl, propyl, butyl, hexyl and octyl), a straight-chain or branched alkoxy group having 1 to 20 carbon atoms (e.g., methoxy, ethoxy, propoxy or butoxy), and an ionic hydrophilic group (e.g., carboxyl or a salt thereof, or sulfo or a salt thereof).

The monovalent substituent as $R_{35}$ and $R_{36}$ preferably includes the groups recited above as $R_{11}$, $R_{12}$, $R_{13}$, and $R_{14}$ and a cyano group. Similarly to $R_{25}$, $R_{35}$ is preferably a hydrogen atom, an alkyl group having 1 to 3 carbon atoms or a carboxyl group which may be substituted with an alkyl group having 1 to 3 carbon atoms. Similarly to $R_{26}$, $R_{36}$ is preferably a hydrogen atom, a carbamoyl group or a cyano group.

Of the compounds represented by formula (6), those in which $R_{31}$ and $R_{33}$ each represent a phenyl group substituted with a monovalent substituent are preferred. Particularly preferred are those in which $R_{31}$ is a phenyl group substituted with an alkyl group, an alkoxy group or an ionic hydrophilic group, and $R_{33}$ is an alkyl group or a phenyl group substituted with an alkyl group, an alkoxy group or an ionic hydrophilic group. The substituent of the substituted phenyl group as $R_{31}$ or $R_{33}$ preferably includes a straight-chain or branched alkyl group having 1 to 20 carbon atoms (e.g., methyl, ethyl, propyl, butyl, hexyl and octyl), a straight-chain or branched alkoxy group having 1 to 20 carbon atoms (e.g., methoxy, ethoxy, propoxy or butoxy), and an ionic hydrophilic group (e.g., carboxyl or a salt thereof, or sulfo or a salt thereof).

The azo compound of formula (4) is prepared by a process comprising the steps of:
(a) diazotizing a heterocyclic primary amine with a diazotizing agent to form a diazonium salt and
(b) allowing the diazonium salt to react with a coupling component.

Diazotization of a heterocyclic primary amine can be carried out with reference, e.g., to *Chemical Reviews*, vol. 75, p. 241 (1975). The diazotizing agent which can be used includes a diluted hydrochloric acid aqueous solution of sodium nitrite, isopentyl nitrite, and nitrosylsulfuric acid.

The pyridine coupling component which is used in step (b) is synthesized by processes described, e.g., JP-A-51-83631, JP-A-49-74718, and JP-B-52-46230.

Specific examples of the azo compounds represented by formula (4) are shown below for illustrative purposes only but not for limitation.

TABLE 4-1

TABLE 4-1-continued

| Dye | Z-S ring | R₁ | R₃ |
|---|---|---|---|
| 4-5 | 5-(EtS)-2-methyl-1,3,4-thiadiazole | –C₆H₄-nC₈H₁₇ | –C₆H₄-nC₈H₁₇ |
| 4-6 | 5-(O₂N)-2-methyl-thiazole | 2-(OC₁₂H₂₅)-C₆H₄– | 2-(OC₁₂H₂₅)-C₆H₄– |

TABLE 4-2

| Dye | Z-S ring | R₁ | R₃ |
|---|---|---|---|
| 4-7 | 3-methyl-4-cyano-5-methyl-2-(EtOOC)-thiophene | –C₆H₄-nC₈H₁₇ | –C₆H₄-nC₈H₁₇ |
| 4-8 | 3-methyl-4-cyano-5-methyl-isothiazole | –C₆H₄-nC₈H₁₇ | –C₆H₄-nC₈H₁₇ |
| 4-9 | 4-methyl-5-cyano-2-methyl-thiazole | –C₆H₄-nC₈H₁₇ | –C₆H₄-nC₈H₁₇ |
| 4-10 | 3-(nBuSO₂)-5-methyl-1,2,4-thiadiazole | 2-(SO₃K)-C₆H₄– | 4-(COOH)-C₆H₄– |

TABLE 4-2-continued
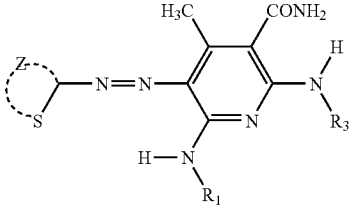
| Dye | 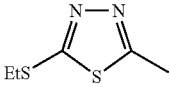 | R₁ | R₃ |
| --- | --- | --- | --- |
| 4-11 | 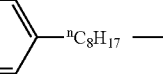 | 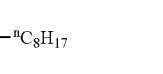 | 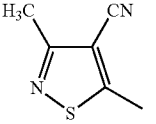 |
| 4-12 | 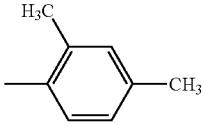 | 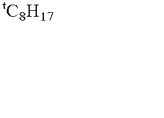 | $^tC_8H_{17}$ |
TABLE 4-3
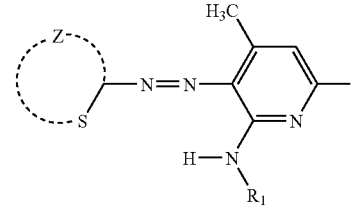
| Dye | 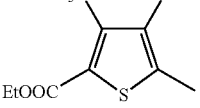 | R₁ | R₃ |
| --- | --- | --- | --- |
| 4-13 | 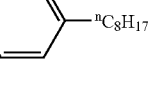 | 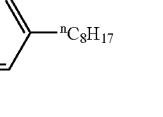 | 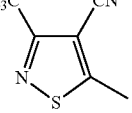 |
| 4-14 | 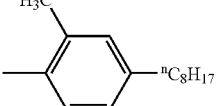 | 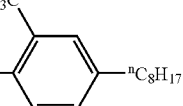 | 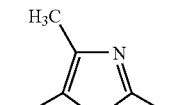 |
| 4-15 | 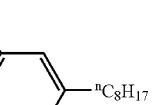 | 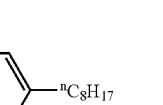 | |

TABLE 4-3-continued

[Structure: pyridine ring with H3C, NHR3, NHR1 substituents, N=N azo linkage to heterocycle containing Z and S]

[Structure: Z-containing ring with S, attached via CH]

| Dye | (Z/S ring) | R₁ | R₃ |
|---|---|---|---|
| 4-16 | nBuSO₂-substituted 5-methyl-1,2,4-thiadiazole | —C₆H₄—nC₈H₁₇ | —C₆H₄—nC₈H₁₇ |
| 4-17 | EtS-substituted 5-methyl-1,3,4-thiadiazole | —C₆H₄—nC₈H₁₇ | —C₆H₄—nC₈H₁₇ |
| 4-18 | 3-methyl-4-cyano-5-methyl-isothiazole | —C₆H₄—SO₃K | —C₆H₄—SO₃K |

TABLE 4-4

[Structure: 3-methyl-4-cyano-isothiazole linked via N=N to pyridine bearing R₅, R₆, NR₃R₄, NHR₁]

| Dye | R₁ | R₃ | R₄ | R₅ | R₆ |
|---|---|---|---|---|---|
| 4-19 | —C₆H₄—nC₈H₁₇ | —C₆H₄—nC₈H₁₇ | SO₂CH₃ | CH₃ | H |
| 4-20 | —C₆H₄—nC₈H₁₇ | —C₆H₄—nC₈H₁₇ | COCH₃ | CH₃ | H |
| 4-21 | —C₆H₄—nC₈H₁₇ | —C₆H₄—nC₈H₁₇ | H | COOEt | CN |
| 4-22 | —C₆H₄—SO₃K | —C₆H₄—SO₃K | H | COOH | H |

TABLE 4-4-continued
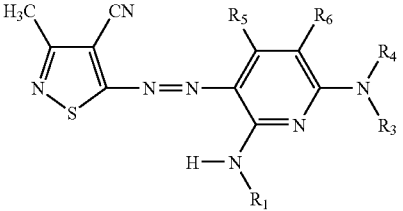
| Dye | R₁ | R₃ | R₄ | R₅ | R₆ |
|---|---|---|---|---|---|
| 4-23 | 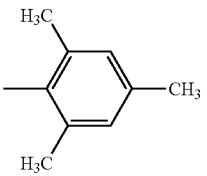 | 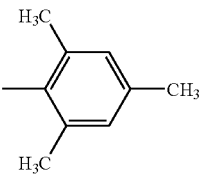 | 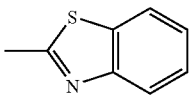 | CH₃ | H |
| 4-24 | 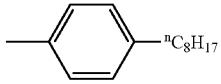 | $^tC_8H_{17}$ | SO₂CH₃ | H | H |
| 4-25 | 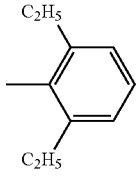 | 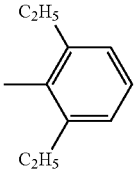 | H | H | CN |
| 4-26 | 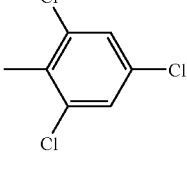 | 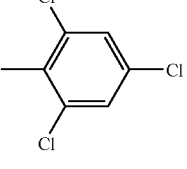 | H | H | COOH |
| 4-27 | 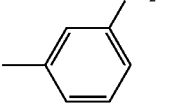 | 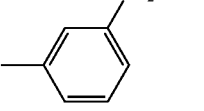 | H | CH₃ | CN |
| 4-28 | 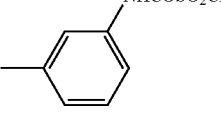 | 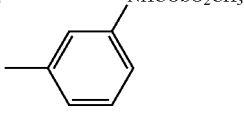 | H | F | CN |
| 4-29 | 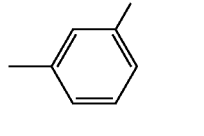 | 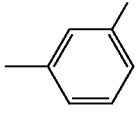 | $^tC_4H_9$ | Ph | H |
| 4-30 | 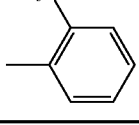 | 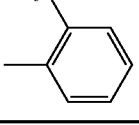 | 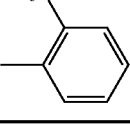 | H | H |

TABLE 4-5

(Structure shown with Z-S group, pyridine ring with H₃C, CN, N=N, NH-phenyl-C₈H₁₇ (two such groups))

Z-S-CH(CH₃)- group shown

| Dye | Z-S-group substituent |
|---|---|
| 4-31 | 3-methyl-4-cyano-5-carboxy-thiophene (HOOC, H₃C, CN on thiophene) |
| 4-32 | 3-methyl-4-cyano-5-cyano-thiophene (NC, H₃C, CN on thiophene) |
| 4-33 | thiophene with CN, CH₃, and CH=C(CN)₂ substituents |
| 4-34 | thiazole with H₃COOC and CH₃ |
| 4-35 | thiazole with Cl, CH₃, OHC |
| 4-36 | thiazole with F₃C, CH₃, (H₃C)₂NO₂S |
| 4-37 | thiazole with Cl, CH₃, CH=C(CN)₂ |
| 4-38 | thiazole with H₃C, CH₃, C₂H₅OOC |

TABLE 4-5-continued (Structure shown with Z-S group, pyridazine ring with H₃C, CN, N=N, NH-phenyl-C₈H₁₇ (two such groups))

Z-S-CH(CH₃)- group shown

| Dye | Z-S-group substituent |
|---|---|
| 4-39 | thiazole with O₂N and CH₃ |
| 4-40 | benzothiazole with Br and CH₃ |
| 4-41 | benzothiazole with KO₃S and CH₃ |
| 4-42 | benzothiazole with NCS and CH₃ |
| 4-43 | isothiazole with Cl, CN, CH₃ |
| 4-44 | isothiazole with C₄H₉O₂S, CN, CH₃ |
| 4-45 | benzisothiazole with CH₃ |
| 4-46 | benzisothiazole with Cl and CH₃ |

TABLE 4-5-continued

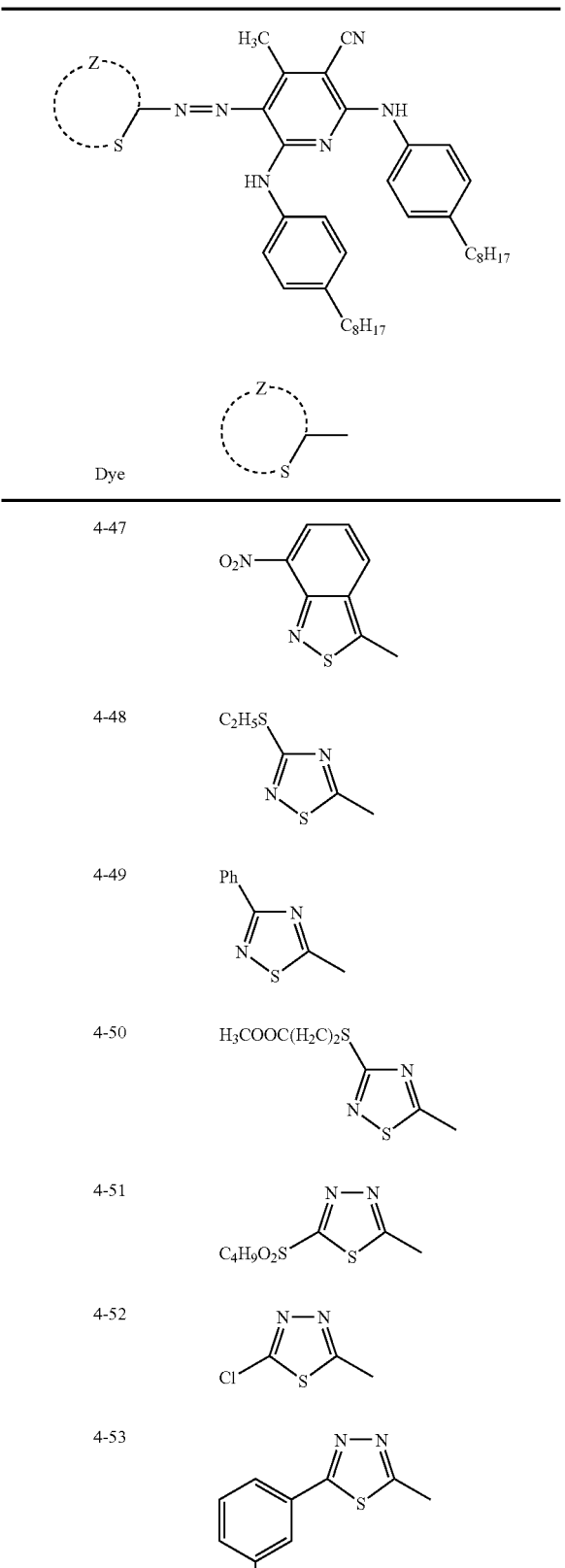

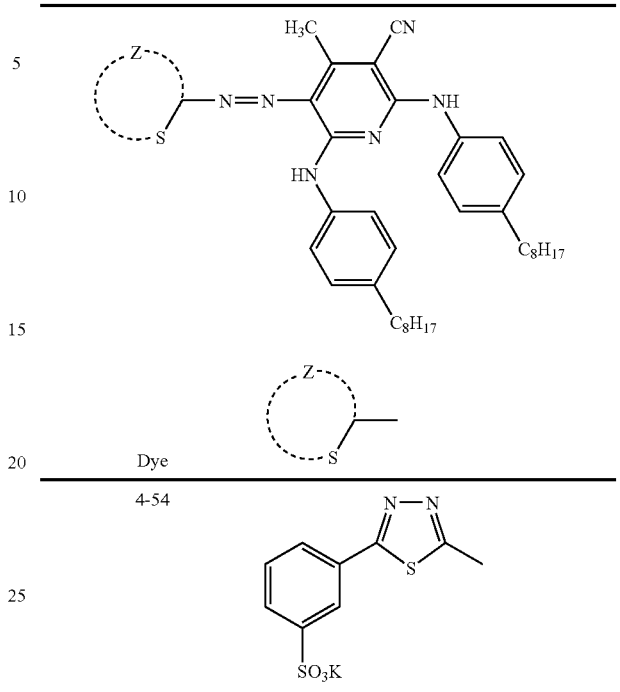

The azo dyes represented by formulae (1), (2), (3), (4), (5), (6), (AZ-1) and (AZ-2) of the present invention are useful as a colorant of image (especially color image) recording materials including ink jet recording materials, thermal transfer recording material, pressure-sensitive recording materials, electrophotographic recording materials, transfer type silver halide photographic materials, printing inks, recording pens, and soon. The azo dyes of the present invention are particularly fit for use in ink jet recording materials, thermal transfer recording materials, and electrophotographic recording materials. Application to ink jet recording materials is the most effective. The azo dyes of the invention also find applications to color filters used in solid-state image sensors, e.g., CCDs, and displays, e.g., LCDs and PDPs, and dye baths for textile.

The azo dyes of the invention can have selected substituents so as to exhibit physical properties desired for intended applications, such as solubility, dispersibility, and thermal mobility. The azo compounds are used in a selected form fit for intended applications, such as a solution or a dispersion (e.g., an emulsion or a suspension).

In formulae (AZ-1) and (AZ-2), substituents the aromatic or heterocyclic ring can have include those described as for G, $R^1$, and $R^2$ of formula (1).

Quantum chemical calculation, also designated molecular orbital calculation, for obtaining the interfacial angle as specified in the present invention is performed by the B3LYP method, which is a generally used ab initio molecular orbital method, with the basis set 6-31G* or a higher class basis set. The B3LYP method is called a DFT-HF hybrid method, an admixture of a density functional theory (DFT) and a Hartree-Fock (HF) theory. The B3LYP calculation can be carried out by using Gaussian 98 program, a software package available from Gaussian Inc.

The quantum chemical calculation is, in short, a method of calculating the electron kinetic energy, the interaction between electrons, the interaction between electrons and an atomic nucleus, and the interaction between atomic nuclei as for the whole molecule to determine a steric structure with lowest energy. The "steric structure with lowest energy" implies the structure in which the molecule exists. For the theoretical details a number of books can be referred to, such as Teijiro Yonezawa, *Ryoshikagaku Nyumon*, Kagaku Dojin (1983), Kiyoshi Mutai, *Ryoshikagaku Bunshikidoho Nyumon*, Shokodo (1991), Minoru Hirota, *Bunshikidoho*, Shokabo (1999), and Tim Clark, *Keisankagaku Guidebook Sandai Bunshikeisan Program no Kaisetsu* (Japanese Trans. translated by Eiji Ohsawa, et al.), Maruzen (1988).

Examples of calculations on compounds, which are out of the scope of the present invention, by the B3LYP method using the basis set 6-31G* are reported in *Journal of Physical Chemistry Part A*, p. 1214 (2001).

Accuracy of quantum chemical calculation depends on the method (e.g., density functional method or Hartree-Fock method) and the basis set (e.g., 6-31G*, 3-21G, etc.). In the present invention, calculation for obtaining the energically most stable structure is performed by the DFT/B3LYP method with the basis set 6-31G* or a higher basis set, e.g., 6-31+G*, 6-31G** or 6-311 G*. The present inventors have found that the azomethine dye represented by formula (AZ-1) exhibits excellent performance when the interfacial angle 1-2-3-4 of the calculated structure is 45 to 135°, preferably 60 to 120°. In other words, it has been found that the dye with the absolute interfacial angle 1-2-3-4 closer to 90° exhibits a narrower absorption band in its absorption spectrum, which is more favorable for reproduction of a hue. To have a narrow absorption band is one of the important basic characters as a dye. It is additionally expected that the chromophore gains in rigidity according as the interfacial angle becomes closer to a right angle, which will be beneficial for color fastness.

Quantum chemical calculation has now come to be performed on a workstation or a computer and be a common tool in the field of chemical calculations. However, since calculation on a large molecule takes much time, a modeling technique may be adopted to the moieties other than the important one. For instance a long-chain alkyl group could be displaced with a methyl group, and a long-chain alkoxy group with a methoxy group. Similar displacement can be made when necessary.

The following list is examples of the compounds represented by formula (AZ-1), designated D1 to D14. The interfacial angle (unit: °) specified in formula (AZ-1) are indicated in the parentheses. REF1 and REF2 shown below are comparative examples of calculations. All the calculations were performed according to the B3LYP method by using a program package available from Gaussian Inc. with the basis set 6-31G*. The list is for illustrative purposes only but not for limiting the present invention.

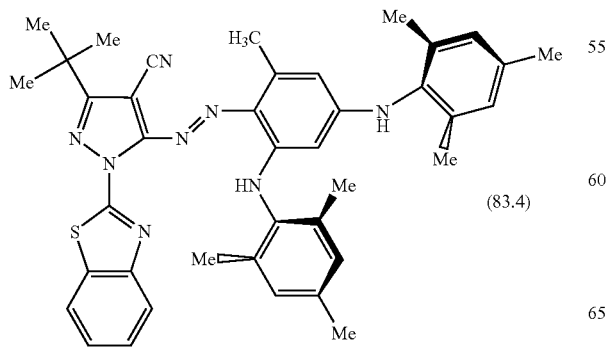
D1 (83.4)

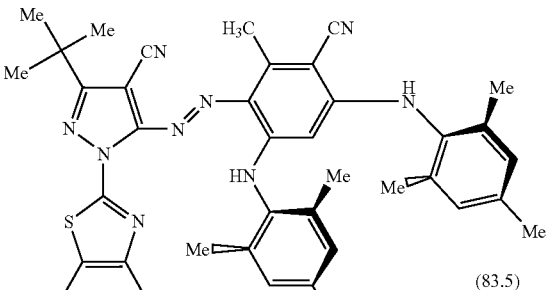
D2 (83.5)

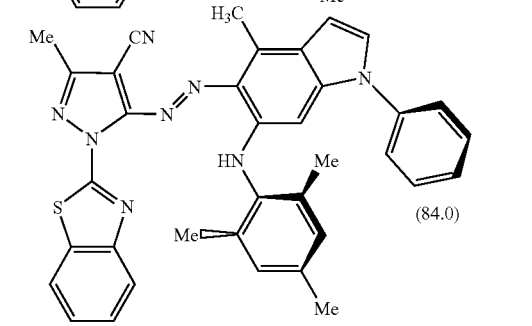
D3 (84.0)

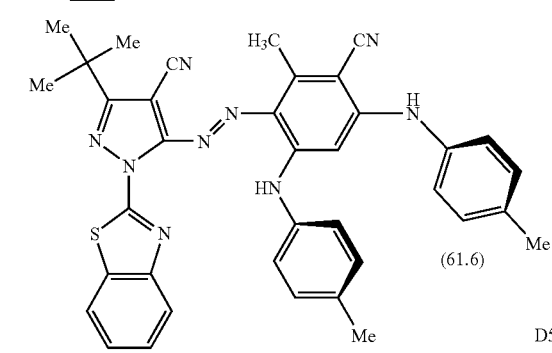
D4 (61.6)

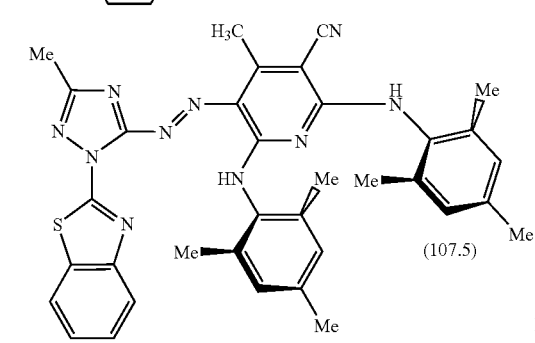
D5 (107.5)

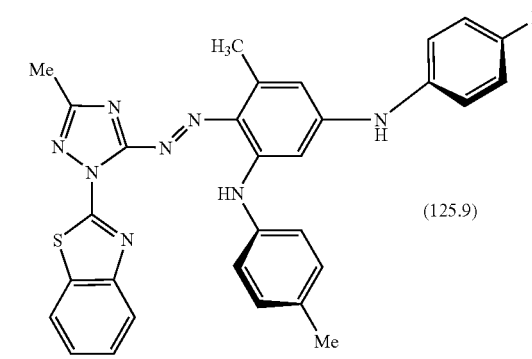
D6 (125.9)

-continued
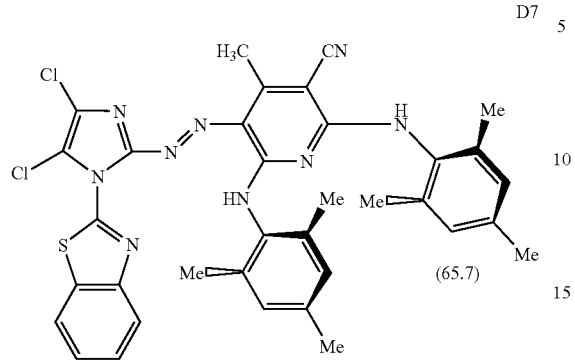
D7
(65.7)
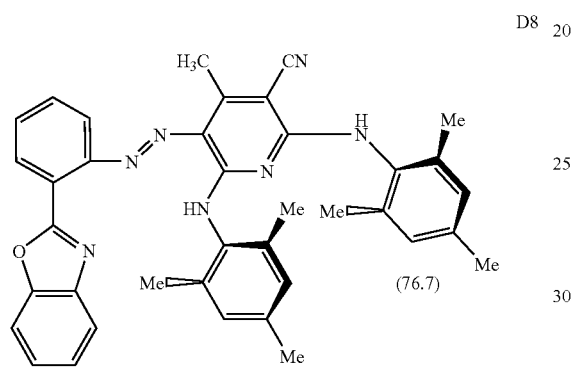
D8
(76.7)
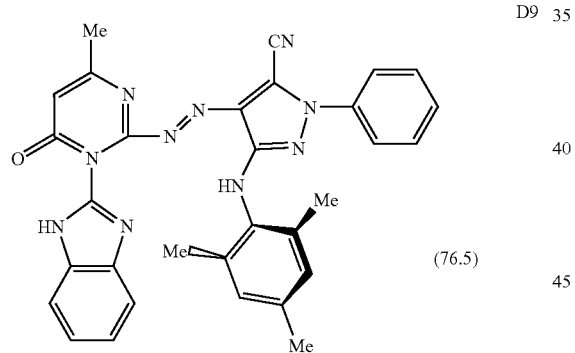
D9
(76.5)
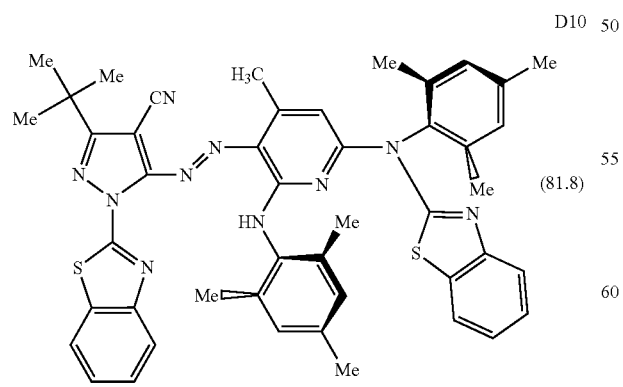
D10
(81.8)
-continued
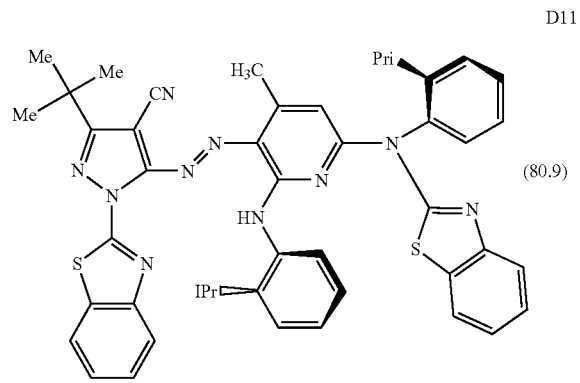
D11
(80.9)
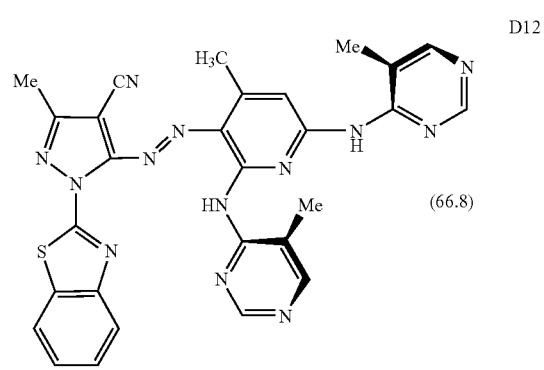
D12
(66.8)
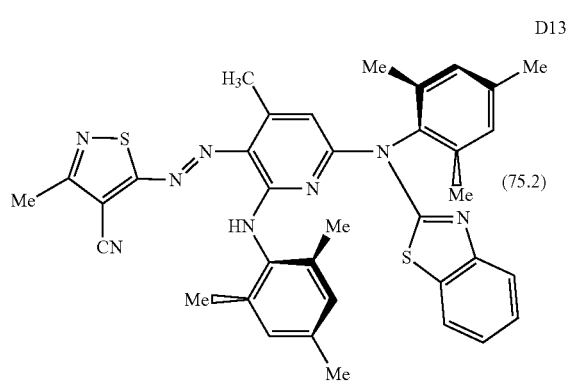
D13
(75.2)
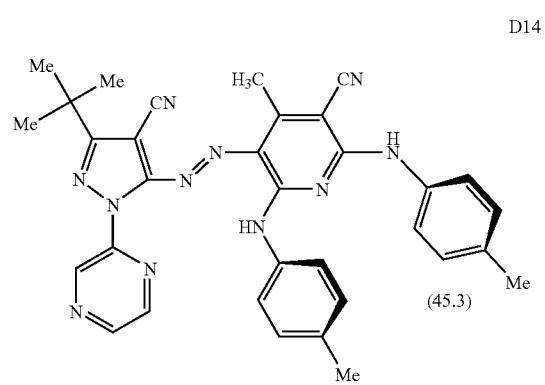
D14
(45.3)

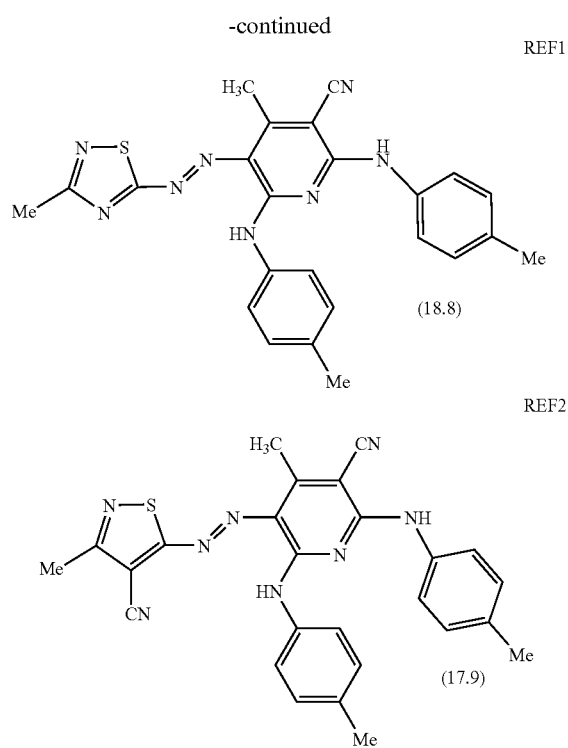

The azo dyes represented by formulae (AZ-1) and (AZ-2) can be synthesized in the same manner as for the compounds of formulae (1) and (2)

The absorption characteristics of the azo dyes used in the present invention are preferably such that the absorption spectrum measured in an N,N-dimethylformamide (DMF) solution has a ratio of the maximum absorbance a in a wavelength range between 380 nm and 450 nm to the maximum absorbance b in a wavelength range between 500 nm and 580 nm, a/b, of less than 0.4. The absorbances a and b as used in the present invention are measured with a spectrophotometer specified in JIS Z8120-86 under the following conditions. The measuring temperature was selected from 15 to 30° C. The cell having an optical path length of 10 mm was used. A given amount (converted to the molecular weight) of a sample compound was diluted with DMF to such a concentration as to show an absorbance, whichever of a (between 380 nm and 450 nm) and b (between 500 nm and 580 nm) was higher, in a range of from 0.8 to 1.0. The absorbance ratio a/b was obtained from the absorption spectrum of the compound solution in this adjusted concentration.

Figure 2:
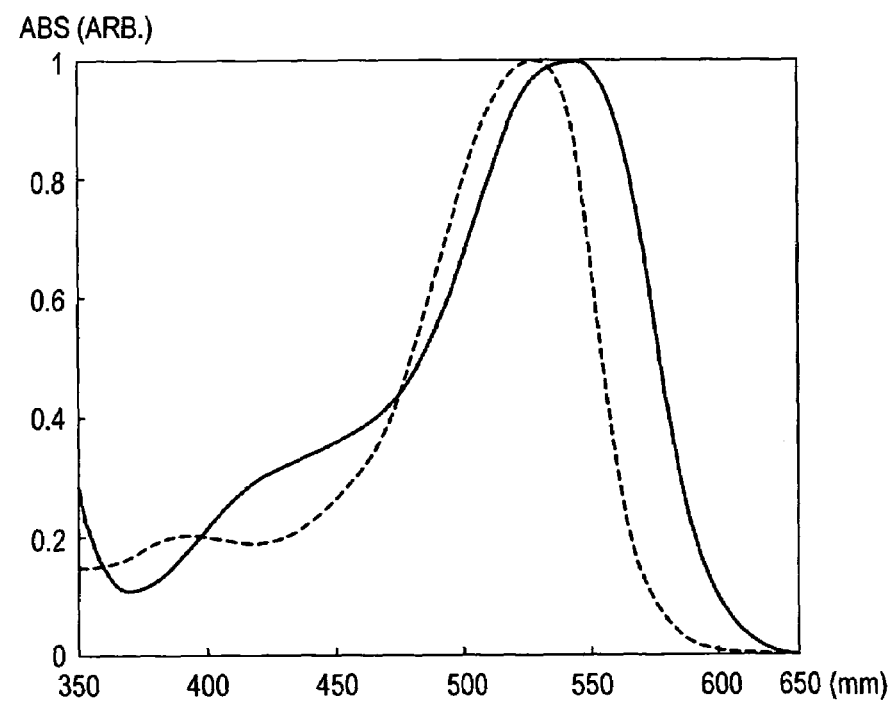
FIG. 2 shows absorption spectra of compound D13 (solid line) and REF2 (dotted line).

FIGS. 1 and 2 are examples of the absorption spectra in DMF, in which absorbances (Abs) are plotted as ordinate and wavelengths (nm) as abscissa. FIG. 1 shows the spectra of compound D10 (solid line) and REF1 (dotted line), and FIG. 2 compound D13 (solid line) and REF2 (dotted line). The molar absorptivity of D10, D13, REF1, and REF2 were 52000, 48000, 34000, and 40000, respectively. In these particular examples, the compounds under analysis had been diluted with DMF so that the absorption peak in the wavelength region of 500 to 580 nm (peak b) might be 1.0 (could range from 0.8 to 1.0). Therefore, the absorbance ratio a/b is easily obtained simply by reading the absorption peak in the wavelength region of 380 to 450 nm (peak a).

For the azo dyes of the present invention, having the absorbance ratio a/b of less than 0.4 means securing color reproducibility (hue) as a colorant. The absorbance ratio a/b is still preferably less than 0.35, particularly preferably 0.3 or less.

Second Preferred Embodiment

The azo compound which can be used in the coloring composition according to the present invention has an oxidation potential nobler than 1.0 V vs. SCE. The higher the oxidation potential, the better. A compound having an oxidation potential nobler than 1.1 V (vs. SCE) is preferred. A compound having an oxidation potential nobler than 1.2 V (vs. SCE) is still preferred.

In the study on ozone resistance of a color image, the present inventors have found that there is a correlation between the oxidation potential of a coloring compound used for forming a color image and ozone resistance. They have ascertained that ozone resistance can be improved by using an azo compound whose oxidation potential is nobler than 1.0 V with respect to a saturated calomel electrode (SCE). They have also ascertained that an azo compound containing at least two substituents having a pKa value of −10 to 5 as well as having the above-specified oxidation potential shows unexpectedly high resistance to ozone gas.

The improvement of ozone resistance of a color image by the compound having a specific oxidation potential can be accounted for by the relationship between the highest occupied molecular orbital (HOMO) of the compound and a lowest unoccupied molecular orbital (LUMO) of ozone gas. That is, reaction occurs between the HOMO of a coloring compound and the LUMO of ozone to oxidize the coloring compound, which is considered to cause ozone resistance reduction of a color image. Therefore, ozone resistance improvement will be established by reducing the HOMO of a coloring compound to reduce its reactivity with ozone.

Oxidation potential represents electron mobility from a sample to an electrode. The higher (the nobler) the oxidation potential, the less mobile the electrons, i.e., the less susceptible to oxidation the sample. In relation to a chemical structure, oxidation potential becomes nobler with an electron-attracting group introduced therein, and it becomes less noble with an electron-donating group introduced therein.

Oxidation potential indicates the potential of the anode at which a compound lose its electrons in volutammetry as hereinafter described in detail. It is considered that oxidation potential approximates to the energy level of HOMO of a compound in its ground state.

Oxidation potential is measured with a DC polarographic system or a cyclic volutammetric system. A sample to be measured is dissolved in a solution of a supporting electrolyte, such as sodium perchlorate or tetrapropylammonium perchlorate, in a solvent, such as dimethylformamide or acetonitrile, in a concentration of $1 \times 10^{-4}$ to $1 \times 10^{-6}$ mol·dm$^{-3}$, and the electric potential of the working electrode is measured using an SCE as a reference electrode. Appropriate electrolyte and solvent are selected according to the oxidation potential or solubility of the sample. For the details of such selection reference can be made to P. Delahay, *New Instrumental Methods in Electrochemistry*, Interscience Publishers (1954), A. J. Bard, et al., *Electrochemical Methods*, John Willey & Sons (1980), and Akira Fujishima, et al., *Denkikagaku Sokuteiho*, pp. 101–118, Gihodo (1984).

The oxidation potential measurements can vary by about several tens of millivolts by the influences of potential difference between different liquids, resistance of the sample solution, etc. Correction can be made for such variation by using a standard sample (e.g., hydroquinone) thereby to assure reproducibility of the measurements.

In the present invention, oxidation potential measurement was made by DC polarography using an N,N-dimethylformamide solution containing 0.1 mol·dm$^{-3}$ of tetrapropylammonium perchlorate as a supporting electrolyte and $1 \times 10^{-3}$ mol·dm$^{-3}$ of a sample compound, an SCE as a reference electrode, a graphite electrode as a working electrode, and a platinum electrode as a counter electrode.

Manipulations for obtaining a compound having a noble oxidation potential include (i) selecting a compound structure inherently having a noble oxidation potential and (ii) introducing an electron-attracting group (i.e., a group having a large Hammett's substituent constant σp value, hereinafter described) to an arbitrary position of a compound. To select a dye structure inherently having a noble oxidation potential is a preferred manipulation from the standpoint of not only ozone resistance but molecular designing with ease of introducing an arbitrary electron-attracting or donating group to adjust color fastness, hue, and physical properties.

Where an electron-attracting group is introduced into an arbitrary position of a compound structure to make the oxidation potential nobler thereby reducing the reactivity with ozone that is an electrophilic reagent, a Hammett's substituent constant σp value can be made use of as a measure for electron-attracting or donating character of a substituent. The oxidation potential can be made nobler by introducing a substituent having a large σp value.

The Hammett's substituent constant σp value is explained here briefly. Hammett's rule is a rule of thumb proposed by L. P. Hammett in 1935 in an attempt to discuss quantitatively the influences of substituents on reaction and equilibrium of benzene derivatives and is today generally admitted to be valid. Substituent constants used in Hammett's rule include a σp value and a σm value. These values are found in many general books, such as J. A. Dean (ed.), *Lange's Handbook of Chemistry*, 12th Ed., McGraw-Hill (1979) and *Kagaku-no-ryoiki*, Extra No. 122, pp. 96–103, Nankodo (1979).

The azo compound which can be used in the coloring composition of the invention should have at least two substituents having a pKa value of −10 to 5, preferably −9 to 5, still preferably −8 to 5, in water. The "substituent having a pKa value of −10 to 5" is a substituent representing a proton-dissociating moiety of a compound having a pKa value of −10 to 5 as measured in water.

A pKa value is a value defined, e.g., in Yasuhiko Sawaki, *Kisokagaku Course Buturiyukikagaku*, pp. 47–60, Maruzen (1999). pKa values of a variety of compounds are given in M. B. Smith & J. March, *March's Advanced Organic Chemistry* 5th Ed., p. 329, Table 8.1, John Wiley & Sons (2001) and references cited therein, from which pKa values of substituents can be derived. pKa values of compounds not found in the literature can be obtained according to the method taught in The Chemical Society of Japan (ed.), *Jikken Kagaku Koza 1 Kihon Sosa I* (4th ed.), p. 115, Maruzen (1990) based on the definition of a pKa value. The pKa value of a weak acid can be obtained as a relative value in accordance with the method described in Yasuhiko Sawaki, *Kisokagaku Course Buturiyukikagaku*, p. 50, Maruzen (1999). Since a pKa value varies depending on such an environment as a solvent, the method described in The Chemical Society of Japan (ed.), *Jikken Kagaku Koza 9 Denki·Jiki* (4th ed.), p. 286, Maruzen (1991) may be followed.

Note that a pKa value of an arbitrary substituent in a compound is greatly influenced by the structure of the compound so that an actual value may differ from a value estimated from another compound. Although it is possible to measure the pKa value of a dissociating group of a compound by use of the above-described method, it is not easy to systematically comprehend the measured values in, for example, assigning the measured values because, for one thing, moieties other than the dissociating group can influence the measurements.

Hence, in the present invention, a pKa value of an arbitrary substituent of a compound is represented not by a value actually measured on the compound but by a general pKa value of a corresponding functional group. Evaluation is preferably made by utilizing the pKa value of a dissociating group of a compound whose structure near the dissociating group is analogous to that of the compound to be evaluated so as to minimize the substituent effect or steric effect. For example, for expressing the pKa value of a carboxyl group in a certain compound A in which the carboxyl group is bonded to a benzene ring, the pKa value of benzoic acid (=4.2) or a derivative thereof in which the kind and the position of substituents on the benzene ring are similar to those of the compound A can be used. The pKa values used in the invention for qualitatively defining a compound are those measured in water.

Substituents the pKa value of which falls between −10 and 5 include a sulfo group, a carboxyl group, a thiocarboxyl group, a sulfino group, a phosphono group, and a dihydroxyphosphino group, with a sulfo group and a carboxyl group being preferred.

While a dissociating group is expressed in a non-dissociated form or a salt form in the present invention, it is possible for the compound to be present actually in a dissociated state, a non-dissociated state or a dissociated/non-dissociated mixed state in an arbitrary ratio. The actual state of a dissociating group depends on the environment in which the compound is placed.

The number of the substituents whose pKa value is between −10 and 5 per molecule is 2 or more, preferably 3 or more, still preferably 4 or more. The substituents having a pKa value of −10 to 5 can be bonded at any positions in the azo compound independently of each other. Where the substituents are water-soluble groups, it is advisable to space them out according to the teachings about factors directly acting on cellulose fiber in Kazuo Kondo (editorial supervisor), *Senshoku* (3rd ed.), Tokyo Denki University Publishing Dep. (1987).

It is preferred that at least one substituent, particularly two or more substituents, having a pKa value of −10 to 5 be positioned on each side of the azo group —N═N—. Applied to preferred azo compounds represented by formula (5-I), this means that Het(A$^5$) and Het(B$^5$) each carry at least one substituent, particularly two or more substituents, having a pKa value of −10 to 5.

The improvement of ozone resistance of a color image by the specific azo compound could be accounted for by the action of an appropriate number of appropriate dissociating groups disposed on appropriate positions as well as the above-described influences of the specific oxidation potential. It is considered that such configuration of the specific dissociating groups in an azo compound increases the directness of the compound. It would follow that the azo compound in ink can be fixed at a desired position of an image-receiving medium. In other words, the configuration of the dissociating groups seem to produce a mordanting action between an azo compound and an image-receiving medium. This is not inconsistent with the results of a water resistance test in Examples hereinafter given. Assuming that high water resistance of a color image of an azo dye owes to firm mordanting between the azo dye and an image-receiving medium, the dyeing power could be estimated in a water resistance test. In fact, Examples hereinafter given demonstrate that images having satisfactory ozone resistance also have satisfactory water resistance, revealing some relationship between mordanting and ozone resistance.

The azo compound which can be used in the coloring composition of the invention is preferably a compound represented by formula (5-I):

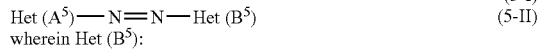
wherein Het ($B^5$):

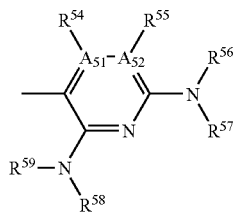

In formula (5-I), Het($A^5$) represents a substituted 5- or 6-membered heterocyclic ring. Examples of the heterocyclic ring are a thiophene ring, a furan ring, a pyrrole ring, a thiazole ring, an oxazole ring, an imidazole ring, an isothiazole ring, an isooxazole ring, a pyrazole ring, a thiadiazole ring, an oxadiazole ring, a triazole ring, a pyridine ring, a pyridazine ring, a pyrimidine ring, and a pyrazine ring. Preferred of them are a thiazole ring, an isothiazole ring, a pyrazole ring, a thiadiazole ring, a pyridine ring, and a pyrazine ring. Still preferred are an isothiazole ring, a pyrazole ring, a 1,2,4-thiadiazole ring, a 1,3,4-thiadiazole ring, and a pyridine ring. A pyrazole ring is particularly preferred.

The heterocyclic ring as represented by Het($A^5$) may have a substituent apart from the above-described substituent having a pKa value of −10 to 5. Suitable substituents the heterocyclic ring can have include a halogen atom, an alkyl group (including a cycloalkyl group and a bicycloalkyl group), an alkenyl group (including a cycloalkenyl group and a bicycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphono group, a phosphinyl group, a phosphinyloxy group, a phosphinylamino group, and a silyl group.

Of these substituents those having a hydrogen atom may further be substituted with the above-described substituent. Examples of such substituents the heterocyclic ring can have include an alkylcarbonylaminosulfonyl group, an arylcarbonylaminosulfonyl group, an alkylsulfonylaminocarbonyl group, and an arylsulfonylaminocarbonyl group.

The substituents on the heterocyclic ring may be connected to each other to form a substituted or unsubstituted hydrocarbon or heterocyclic condensed ring. The nitrogen-containing heterocyclic group as Het($A^5$) may have its nitrogen atom quaternized. Where the heterocyclic ring shows tautomerism, the compound includes both tautomers even where only one of them is described.

In formula (5-II) representing Het($B^5$), $A_{51}$ and $A_{52}$ each represent a carbon atom or a nitrogen atom provided that they do not represent a nitrogen atom simultaneously. It is preferred that $A_{51}$ and $A_{52}$ both represent a carbon atom.

$R^{54}$ and $R^{55}$ each represent a hydrogen atom, a halogen atom, a substituted or unsubstituted alkyl group, a substituted or unsubstituted aryl group, a halogen atom, a carboxyl group (which may be substituted with an alkyl group having 1 to 3 carbon atoms), a carbamoyl group, a cyano group, an alkoxycarbonyl group or a hydroxyl group. $R^{54}$ and $R^{55}$ each preferably represent a hydrogen atom, a halogen atom, a substituted or unsubstituted alkyl group having 1 to 3 carbon atoms, a substituted or unsubstituted aryl group, a carboxyl group (which may be substituted with an alkyl group having 1 to 3 carbon atoms), an alkoxycarbonyl group, a carbamoyl group or a cyano group. $R^{54}$ and $R^{55}$ each still preferably represent a hydrogen atom, a methyl group, an ethyl group, a cyano group, a carbamoyl group or a carboxyl group. In particular, $R^{54}$ is preferably a hydrogen atom, a substituted or unsubstituted alkyl group, an aryl group, a carboxyl group or an alkoxycarbonyl group, still preferably a hydrogen atom or a substituted or unsubstituted alkyl group, particularly preferably a hydrogen atom or a methyl group; and $R^{55}$ is preferably a hydrogen atom, a cyano group, a carbamoyl group or a carboxyl group, still preferably a hydrogen atom, a cyano group or a carbamoyl group, particularly preferably a hydrogen atom or a cyano group.

$R^{56}$, $R^{57}$, $R^{58}$, and $R^{59}$ each represent a hydrogen atom, a substituted or unsubstituted alkyl group, a substituted or unsubstituted aryl group or a substituted or unsubstituted heterocyclic group. $R^{56}$, $R^{57}$, $R^{58}$, and $R^{59}$ each preferably represent a hydrogen atom, a substituted or unsubstituted aryl group or a substituted or unsubstituted heterocyclic group. In particular, $R^{56}$ and $R^{57}$ each preferably represent a substituted or unsubstituted aryl group; $R^{58}$ preferably represents a substituted or unsubstituted heterocyclic group; and $R^{59}$ preferably represents a hydrogen atom.

Where the substituent having a pKa value of −10 to 5 is in the moiety Het($B^5$), i.e., at any one or more positions selected from $R^{54}$, $R^{55}$, $R^{56}$, $R^{57}$, $R^{58}$ and $R^{59}$, it is preferably at any one or more positions selected from $R^{56}$, $R^{57}$, $R^{58}$ and $R^{59}$, particularly $R^{56}$ or $R^{57}$.

The substituent having a pKa value of −10 to 5 may be bonded either directly or via an arbitrary divalent linking group. The divalent linking group includes those derived from the above-recited monovalent substituents by removing a hydrogen atom or a substituent. Examples of such linking groups are an alkylene group (e.g., methylene, ethylene, propylene, butylene or pentylene), an arylene group (e.g., phenylene, naphthylene or 2,4,6-trimethylphenylene), an alkenylene group (e.g., ethenylene or propenylene), an alkynylene group (e.g., ethynylene or propynylene), an amido linkage, an ester linkage, a sulfonamido linkage, a sulfonic acid ester linkage, a urea group, a sulfonyl group, a sulfinyl group, a thio-ether linkage, an ether linkage, a carbonyl group, —N(Rq)— (wherein Rq represents a hydrogen atom, a substituted or unsubstituted alkyl group or a substituted or unsubstituted aryl group), a divalent heterocyclic group (e.g., benzothiazole-2,6-diyl, 6-chloro-1,3,5-triazine-2,4-diyl, pyrimidine-2,4-diyl or quinoxaline-2,3-diyl), and a combination of two or more thereof. These linking groups or linkages may have an arbitrary substituent(s).

While the azo group in the azo compounds of the second preferred embodiment of the present invention can be an azo type —N=N— or a hydrazo type =N—NH— according to the structure, both are described as an azo type in the chemical structures given herein. The azo compounds can show tautomerism depending on the environment in which they are placed. While only one of the tautomers is described, the other tautomer is included under the scope of the invention.

Of the compound represented by formula (5-I) those represented by formula (5-III) are particularly preferred:

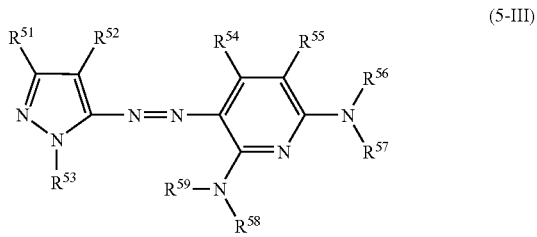

(5-III)

wherein $R^{54}$, $R^{55}$, $R^{56}$, $R^{57}$, $R^{58}$, and $R^{59}$ are as defined above; $R^{51}$ and $R^{52}$ have the same meaning as $R^{54}$ and $R^{55}$; and $R^{53}$ has the same meaning as $R^{56}$, $R^{57}$, $R^{58}$, and $R^{59}$; with proviso that the compound contains at least two substituents having a pKa value of −10 to 5 at any one or more positions selected from $R^{51}$, $R^{52}$, $R^{53}$, $R^{54}$, $R^{55}$, $R^{56}$, $R^{57}$, $R^{58}$, and $R^{59}$.

In formula (5-III), $R^{51}$ is preferably a hydrogen atom, a substituted or unsubstituted alkyl group or a substituted or unsubstituted aryl group, still preferably a substituted or unsubstituted alkyl group. $R^{52}$ is preferably a hydrogen atom, a halogen atom, a substituted or unsubstituted alkyl group, an aryl group, a carbamoyl group or a cyano group, still preferably a cyano group. $R^{53}$ is preferably a substituted or unsubstituted aryl group or a substituted or unsubstituted heterocyclic group, still preferably a substituted or unsubstituted heterocyclic group. Preferred ranges of $R^{54}$, $R^{55}$, $R^{56}$, $R^{57}$, $R^{58}$, and $R^{59}$ are the same as those described above.

The configuration of the substituents having a pKa value of −10 to 5 in formula (5-III) is desirably such that at least one, preferably two or more are at positions selected from $R^{51}$, $R^{52}$, and $R^{53}$, and at least one, preferably two or more are at positions selected from $R^{54}$, $R^{55}$, $R^{56}$, $R^{57}$, $R^{58}$, and $R^{59}$ (at least two in total). Of the positions $R^{51}$, $R^{52}$ and $R^{53}$ the position $R^{53}$ is preferred. Of the positions $R^{54}$, $R^{55}$, $R^{56}$, $R^{57}$, $R^{58}$, and $R^{59}$ the positions $R^{56}$, $R^{57}$, $R^{58}$, and $R^{59}$ are preferred. The position $R^{56}$ or $R^{57}$ is still preferred.

Specific examples of azo compound which can be used in the coloring composition of the present invention are listed below for illustrative purposes only but not for limitation.

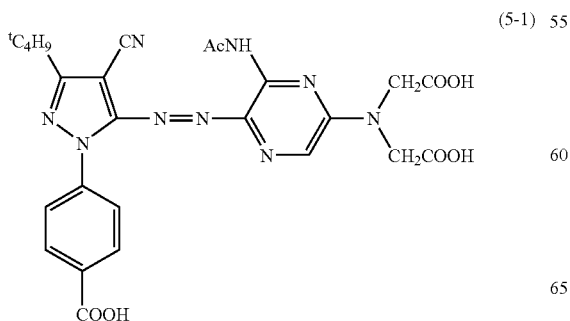

(5-1)

-continued

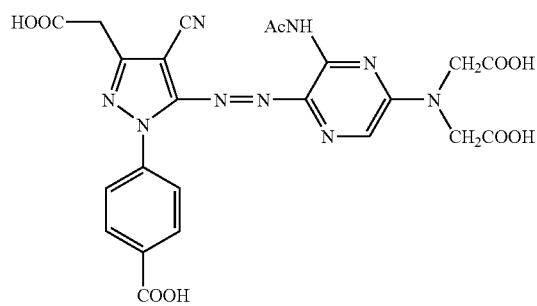

(5-2)

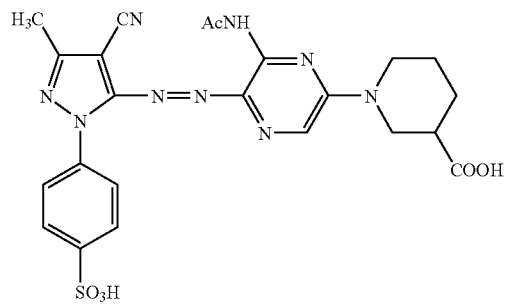

(5-3)

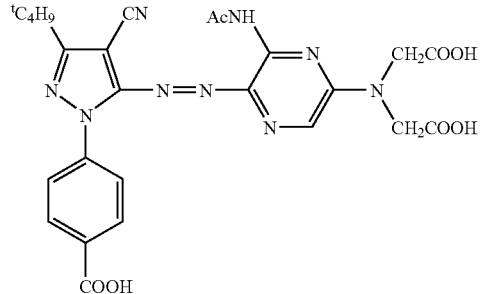

(5-4)

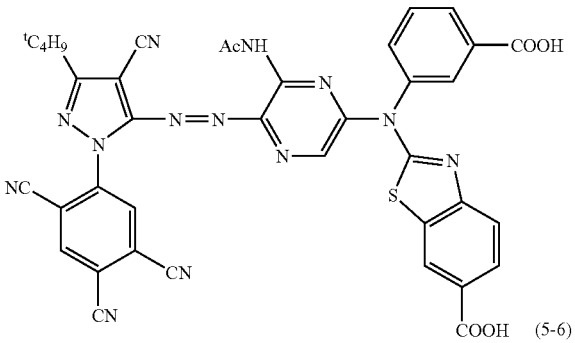

(5-5)

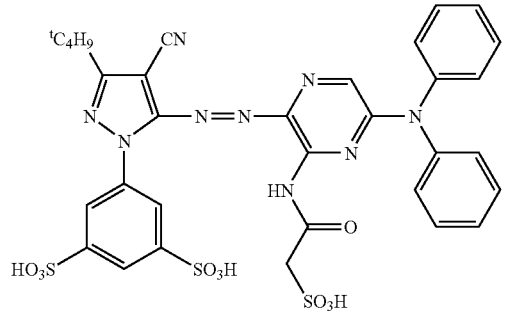

(5-6)

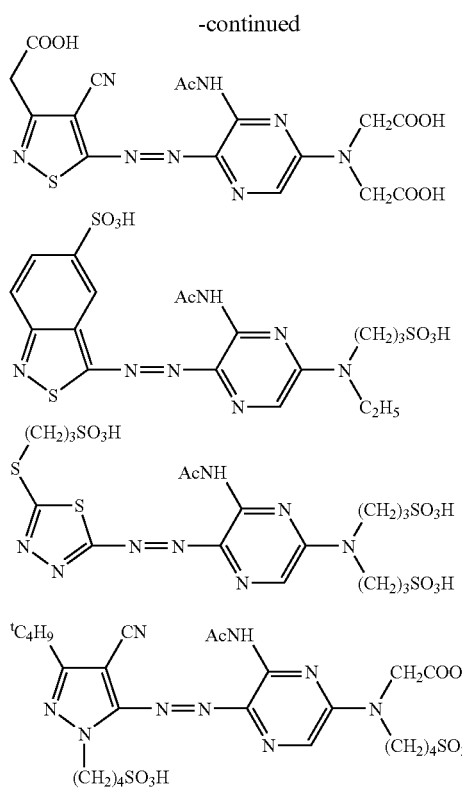
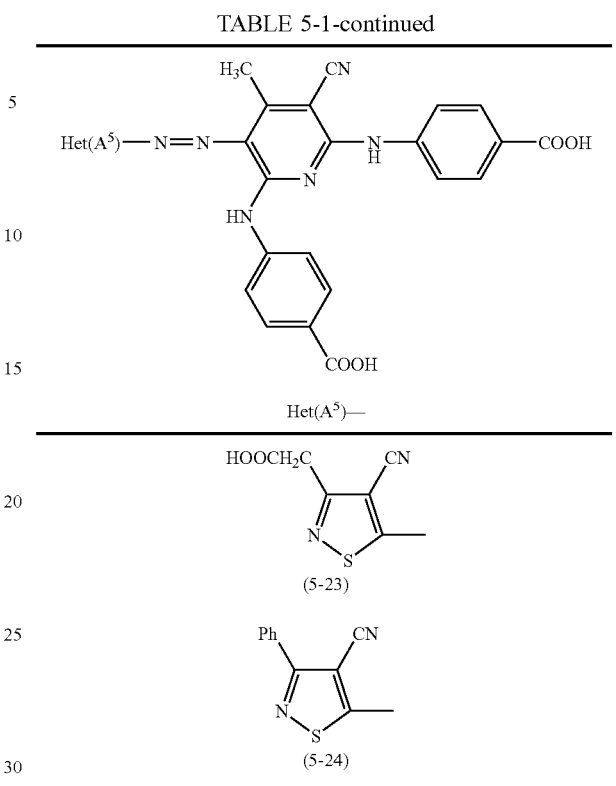
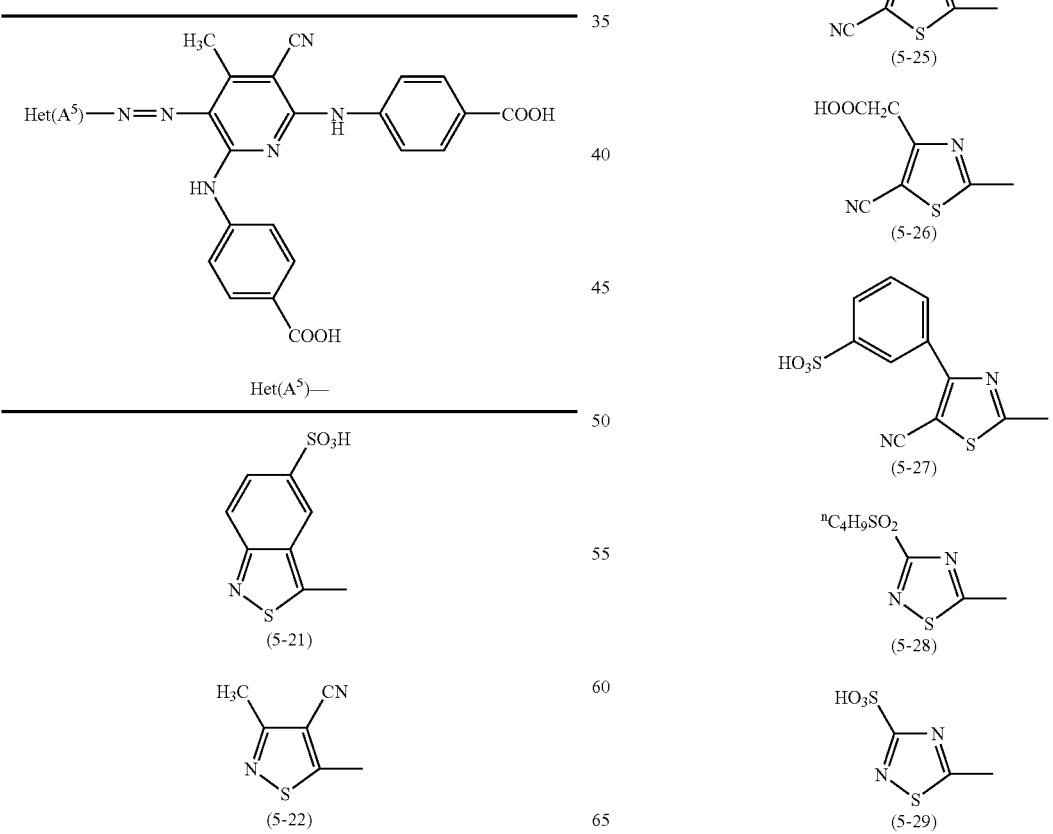

TABLE 5-1-continued
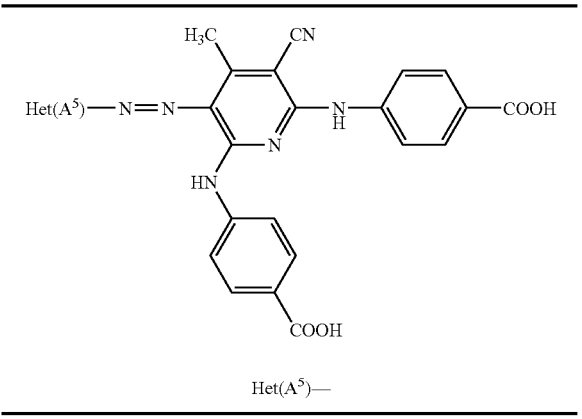
Het(A⁵)—
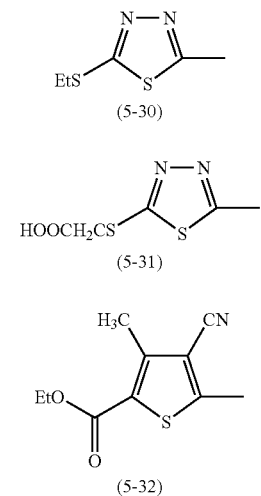
(5-30)
(5-31)
(5-32)
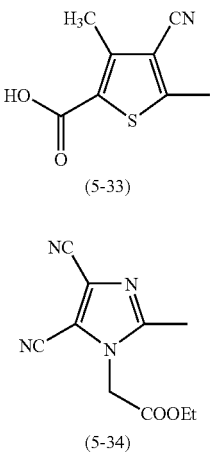
(5-33)
(5-34)
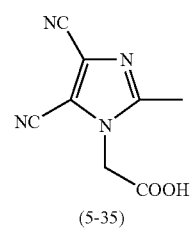
(5-35)
TABLE 5-1-continued
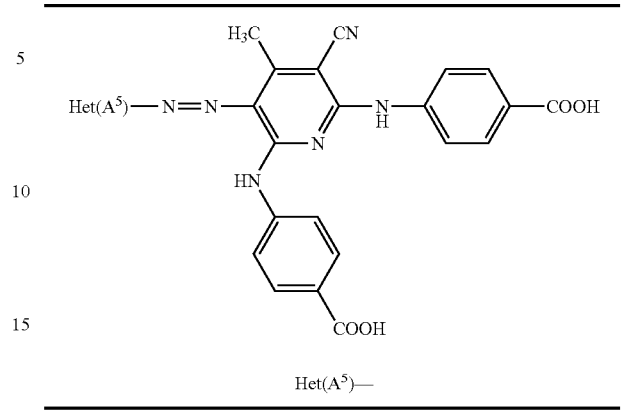
Het(A⁵)—
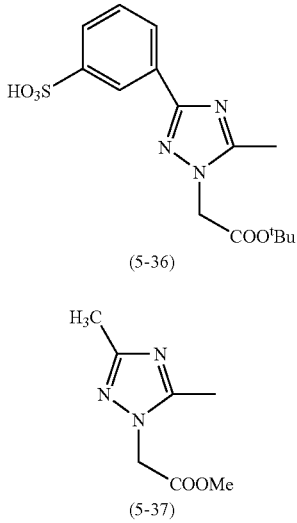
(5-36)
(5-37)
(5-38)
(5-34)

TABLE 5-1-continued
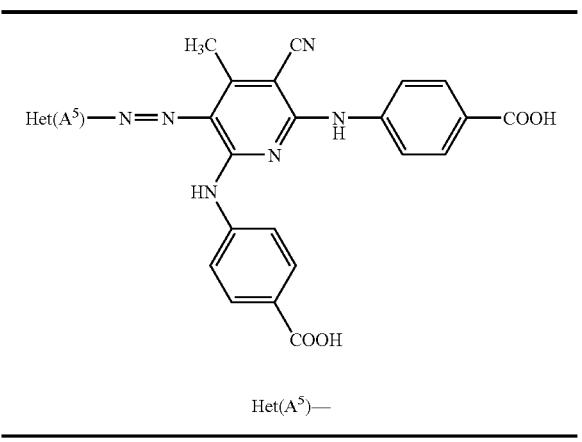
Het(A⁵)—
TABLE 5-2
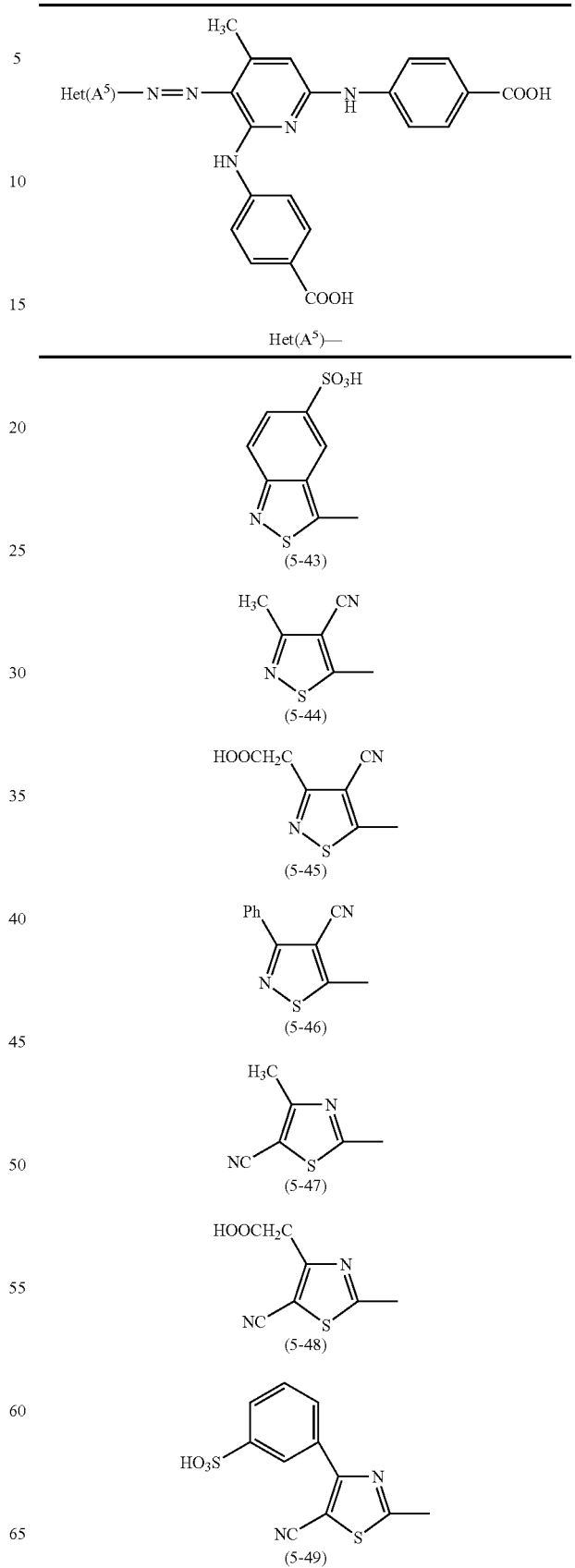

TABLE 5-2-continued
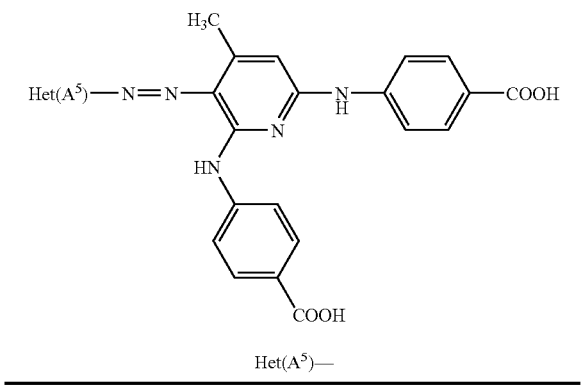
Het(A⁵)—
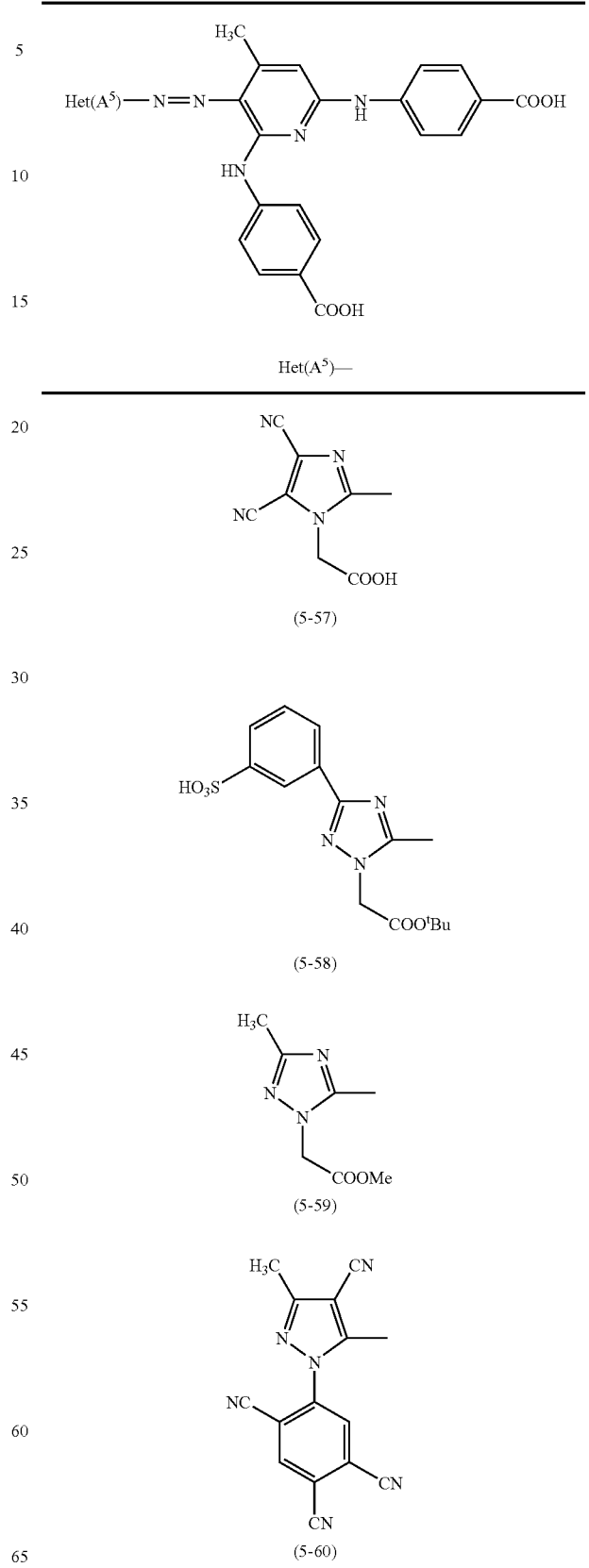

TABLE 5-2-continued
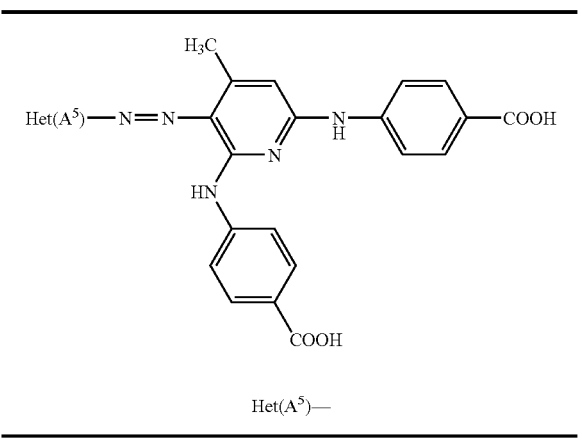
Het(A⁵)—
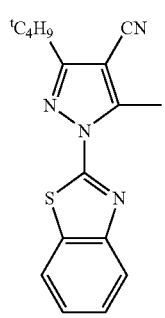
(5-61)
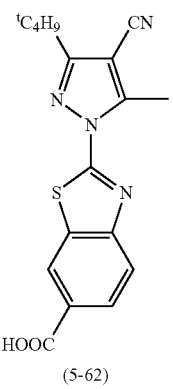
(5-62)
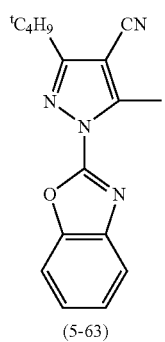
(5-63)
TABLE 5-2-continued
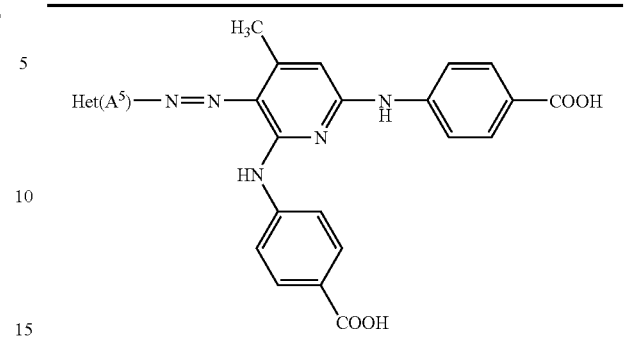
Het(A⁵)—
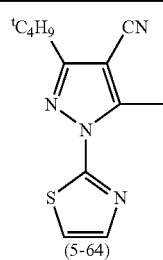
(5-64)
TABLE 5-3
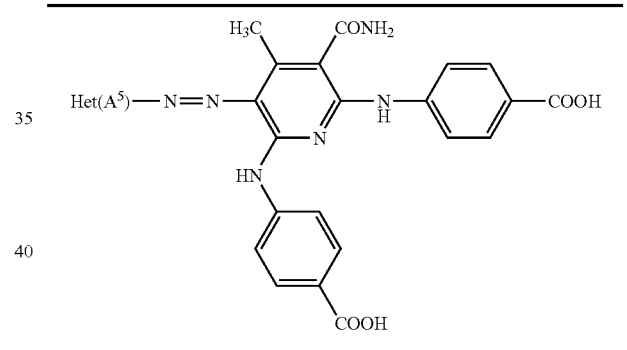
Het(A⁵)—
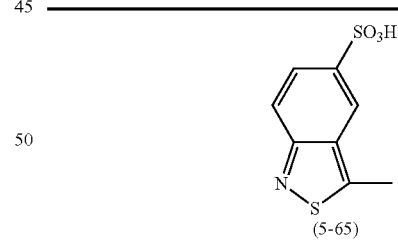
(5-65)
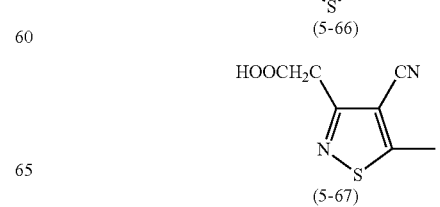
(5-66)
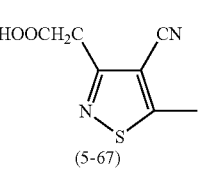
(5-67)

TABLE 5-3-continued
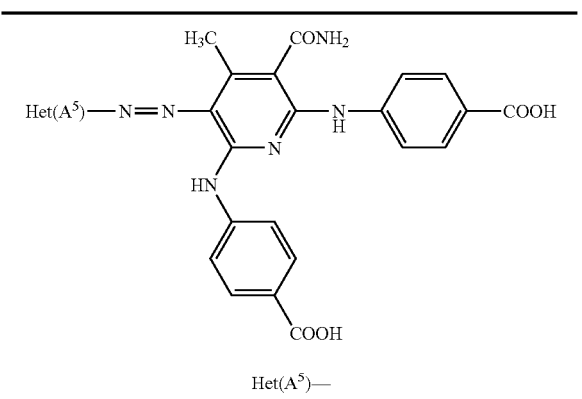
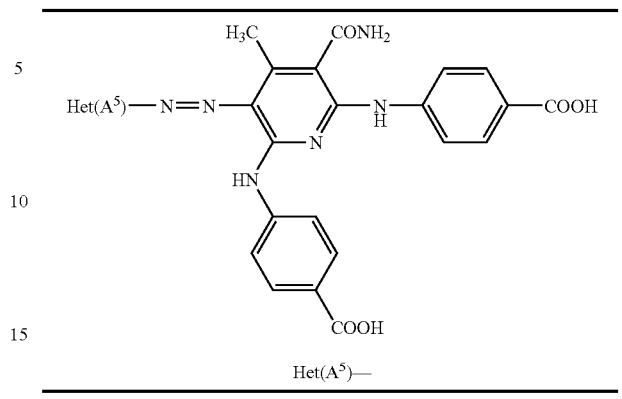
| Het(A⁵)— | Het(A⁵)— |
|---|---|
| 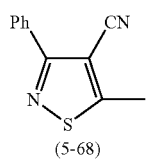 (5-68) | 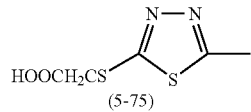 (5-75) |
| 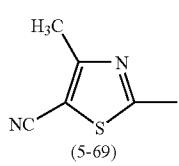 (5-69) | 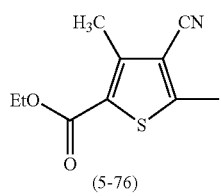 (5-76) |
| 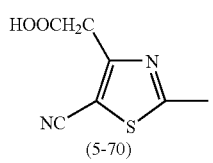 (5-70) | 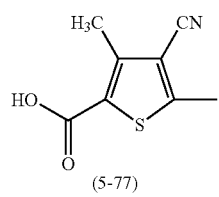 (5-77) |
| 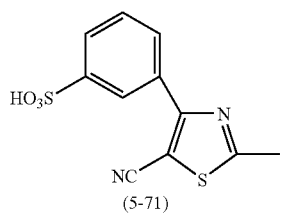 (5-71) | 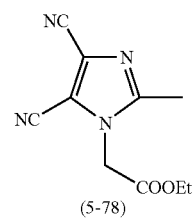 (5-78) |
| 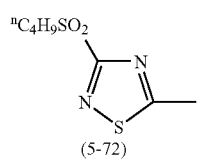 (5-72) | 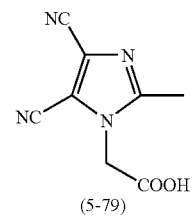 (5-79) |
| 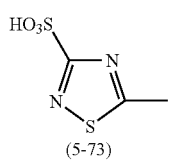 (5-73) | 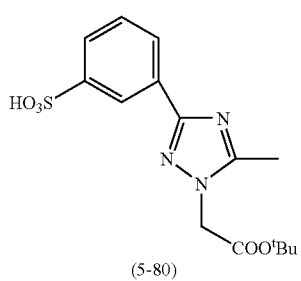 (5-80) |
| 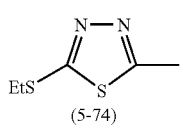 (5-74) | |

TABLE 5-3-continued
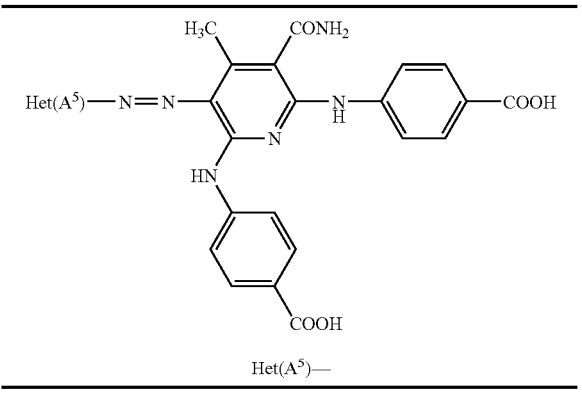
Het(A⁵)—
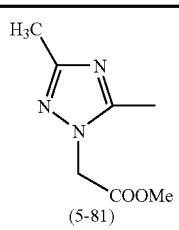
(5-81)
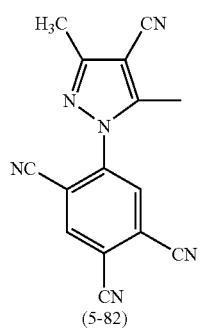
(5-82)
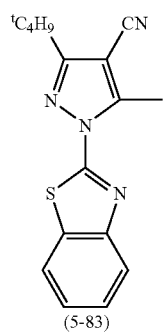
(5-83)
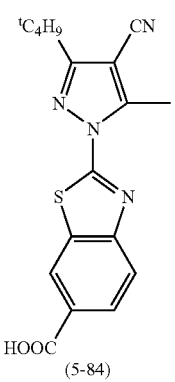
(5-84)
TABLE 5-3-continued
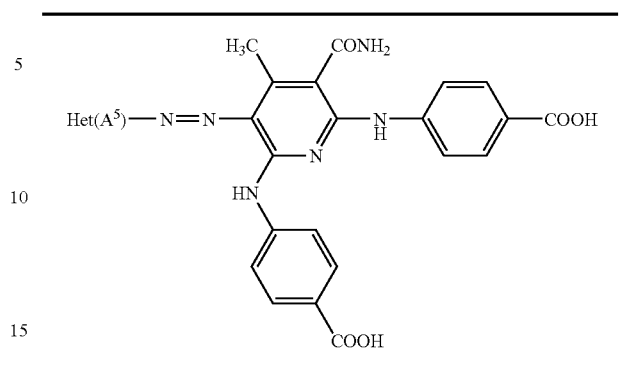
Het(A⁵)—
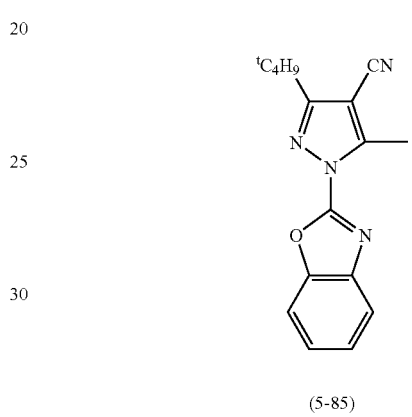
(5-85)
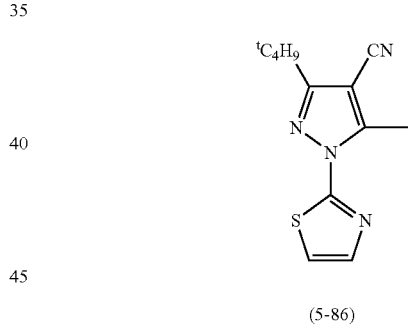
(5-86)
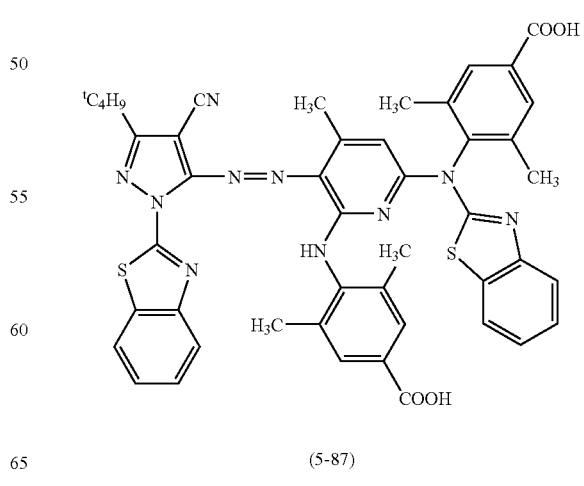
(5-87)

TABLE 5-3-continued
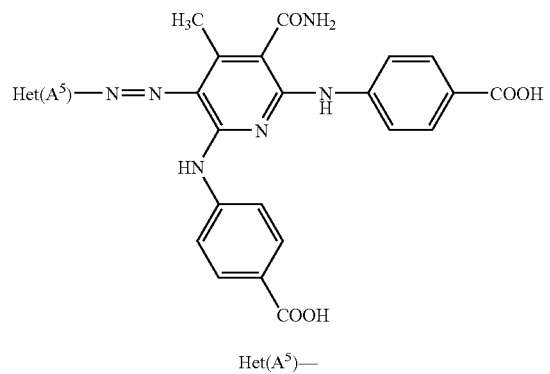
Het(A⁵)—
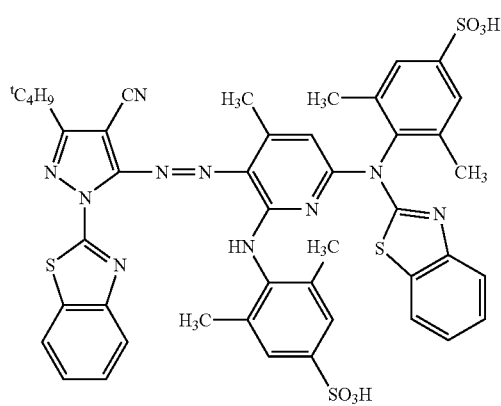
(5-88)
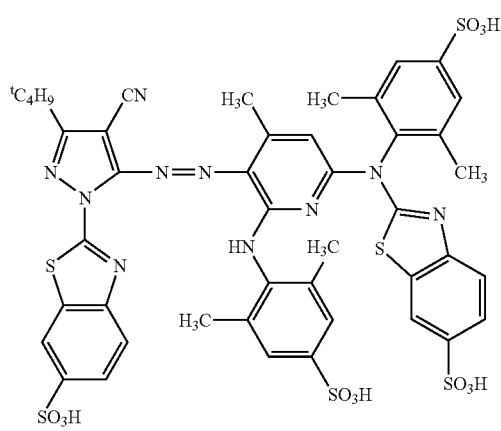
(5-89)
TABLE 5-3-continued
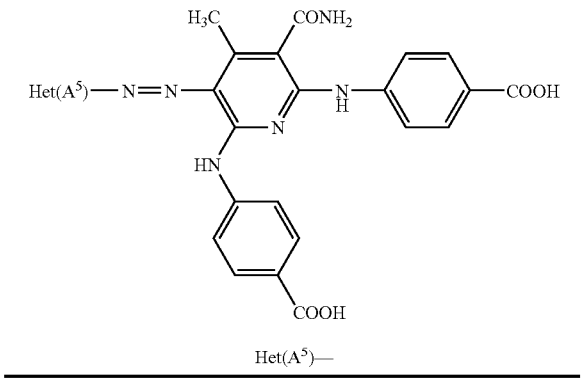
Het(A⁵)—
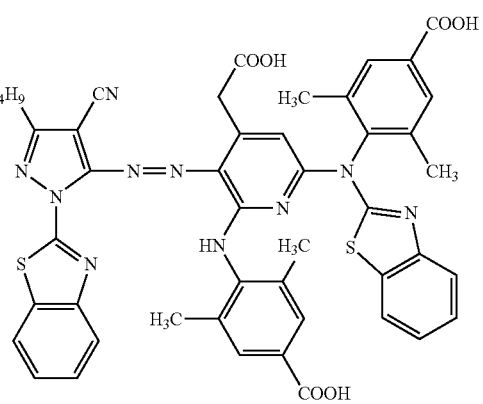
(5-90)
(5-91)

TABLE 5-3-continued
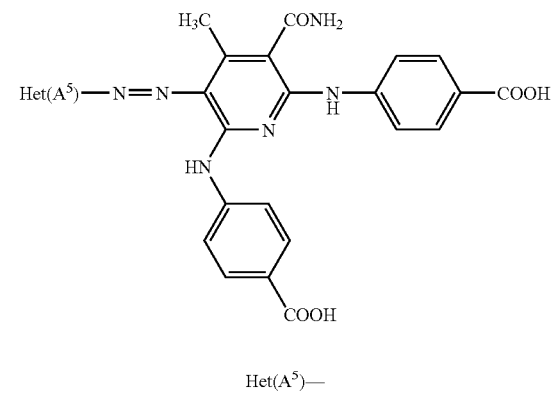
(5-92)
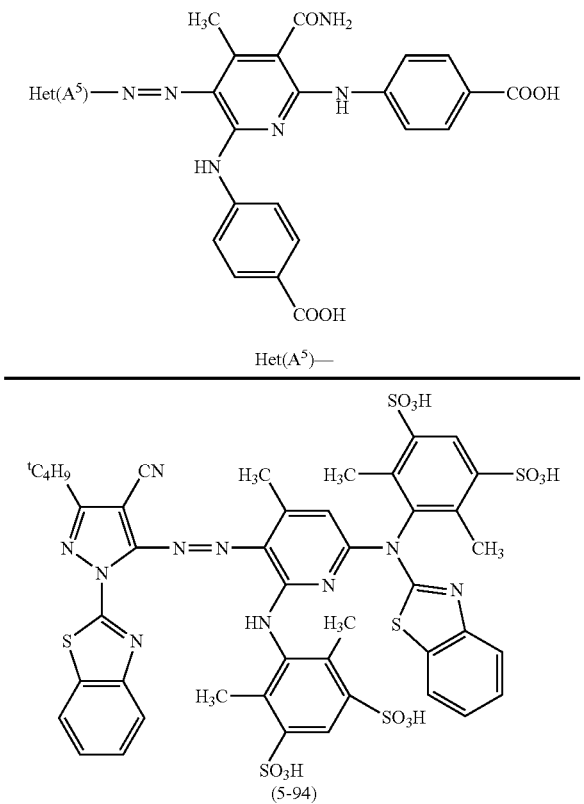
(5-94)
TABLE 5-4
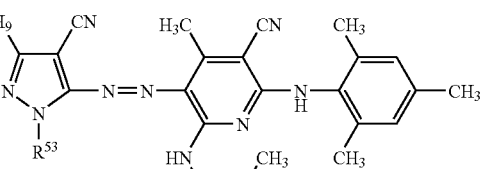
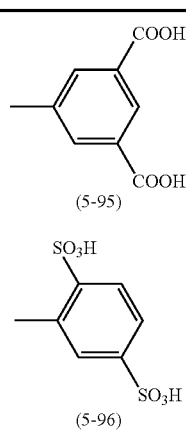
(5-95)
(5-96)

TABLE 5-4-continued
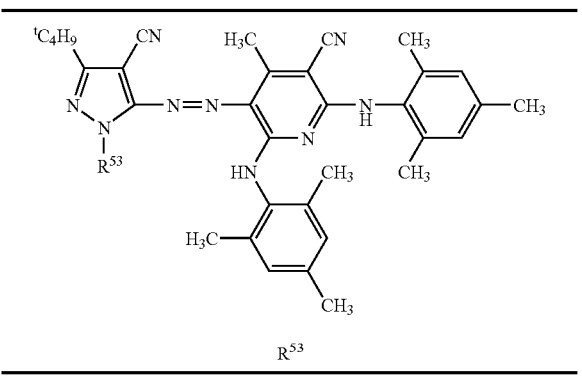
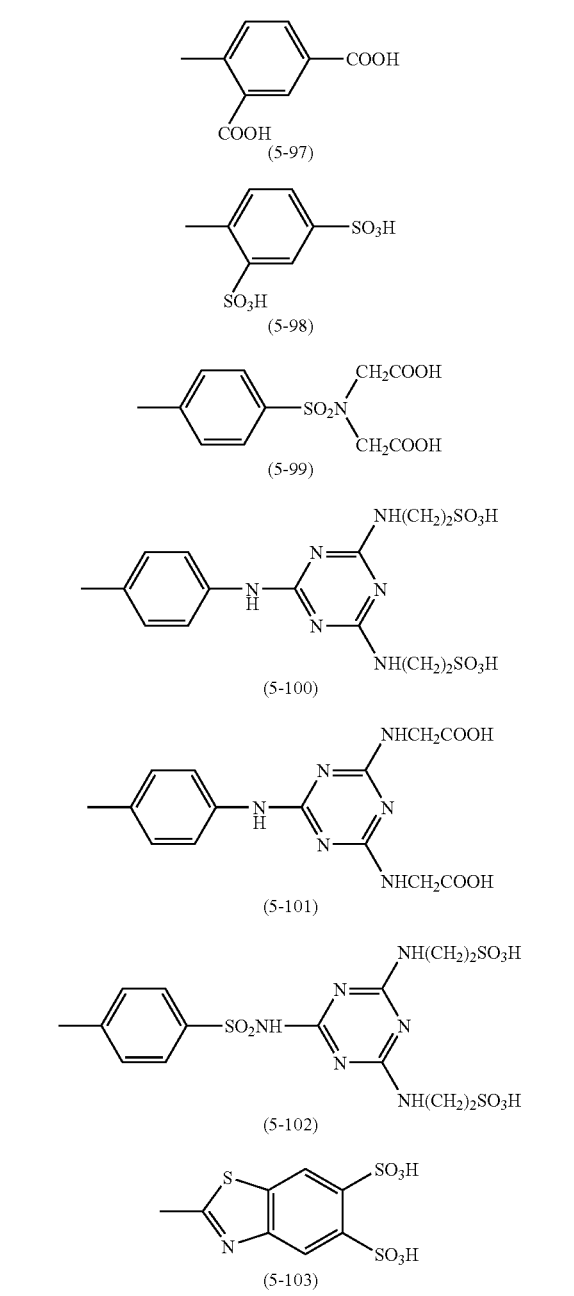
TABLE 5-4-continued
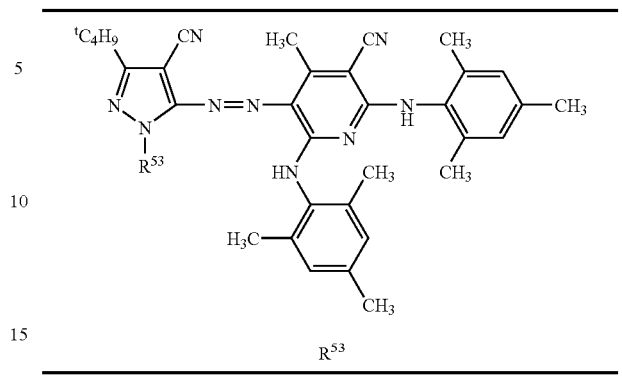
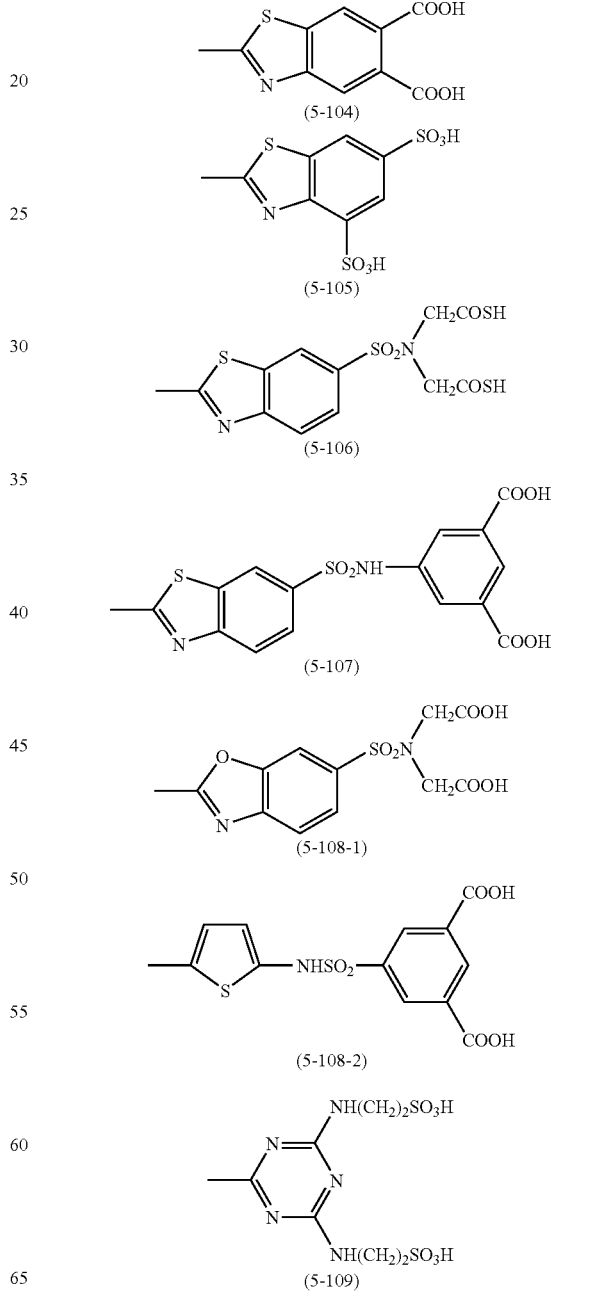

TABLE 5-4-continued
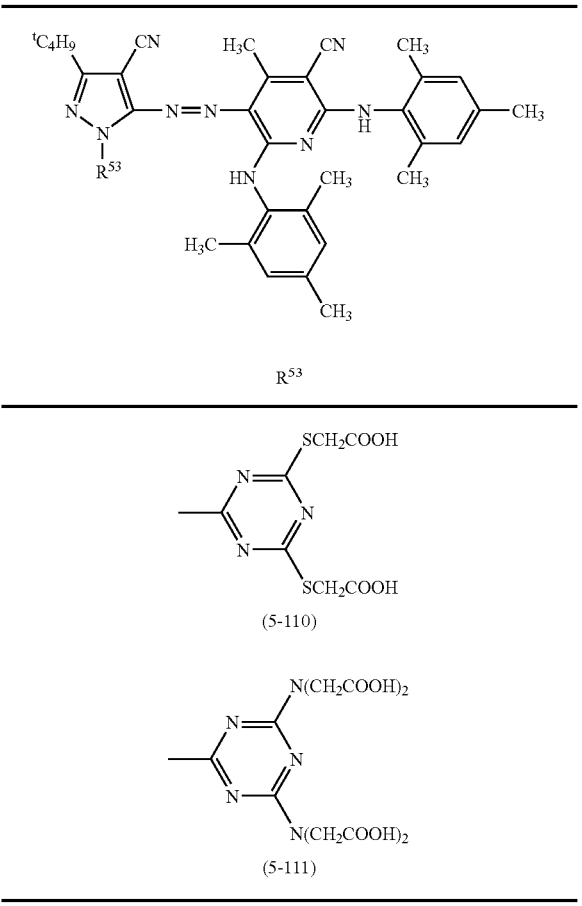
R⁵³
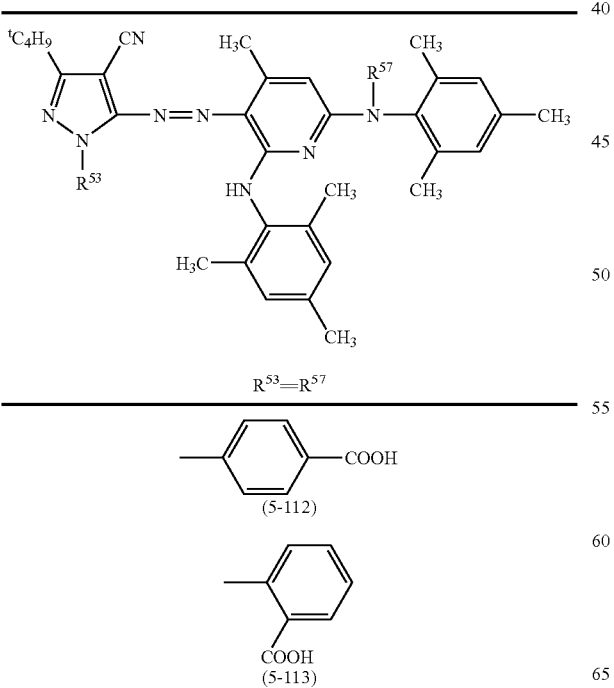
TABLE 5-5
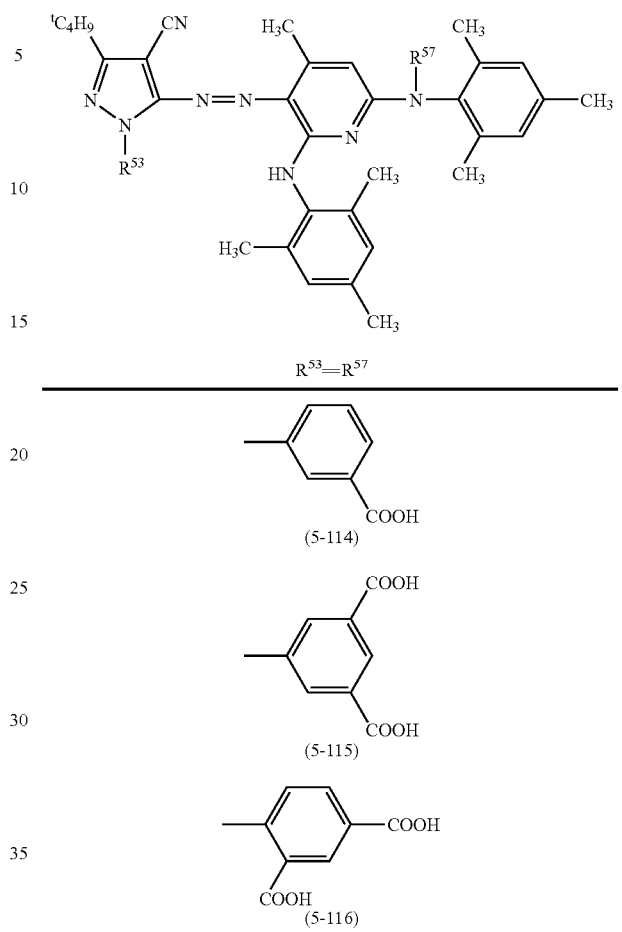
R⁵³=R⁵⁷
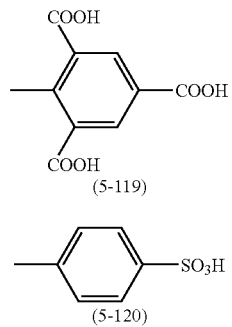
TABLE 5-5-continued
R⁵³=R⁵⁷

TABLE 5-5-continued
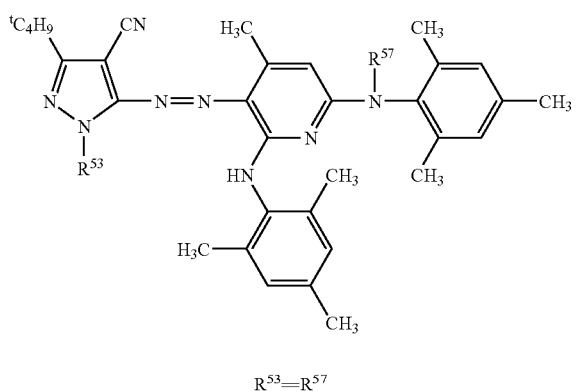
$R^{53}=R^{57}$
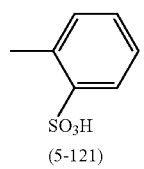
(5-121)
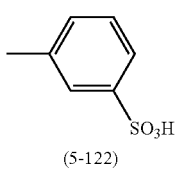
(5-122)
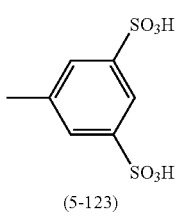
(5-123)
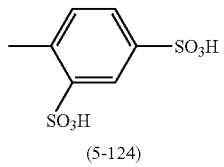
(5-124)
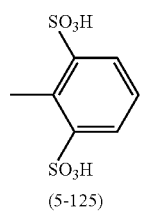
(5-125)
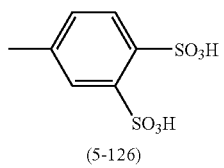
(5-126)
TABLE 5-5-continued
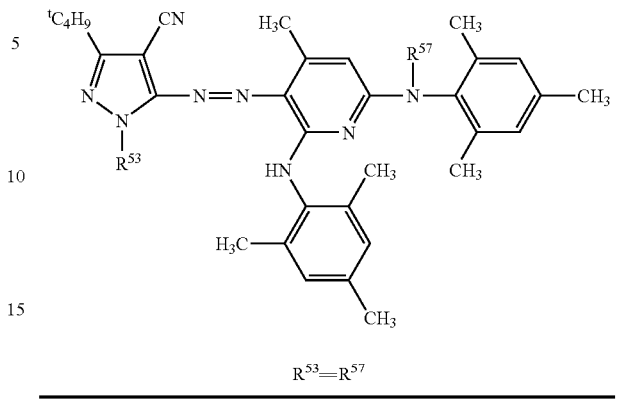
$R^{53}=R^{57}$
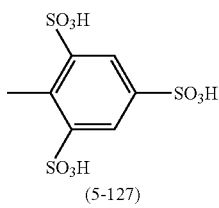
(5-127)
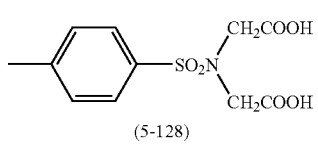
(5-128)
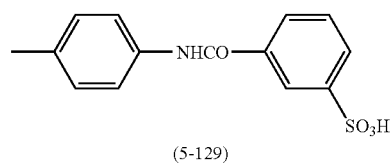
(5-129)
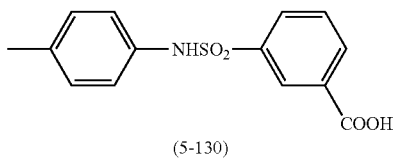
(5-130)
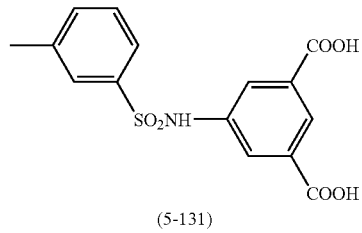
(5-131)
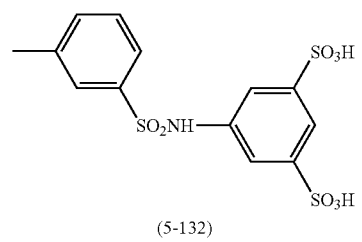
(5-132)

TABLE 5-5-continued
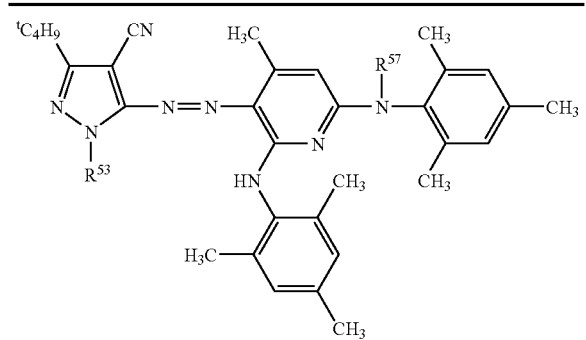
R⁵³=R⁵⁷
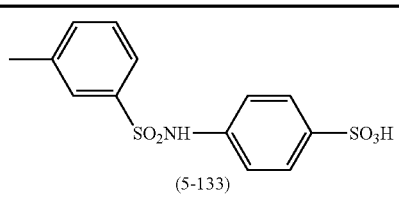
(5-133)
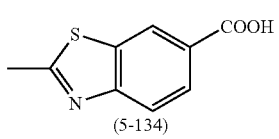
(5-134)
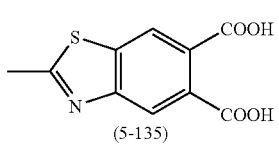
(5-135)
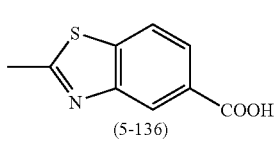
(5-136)
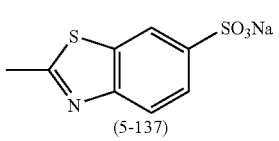
(5-137)
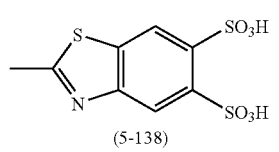
(5-138)
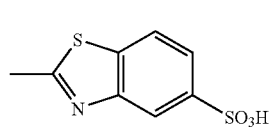
(5-139)
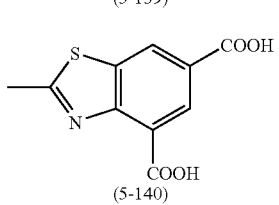
(5-140)
TABLE 5-5-continued
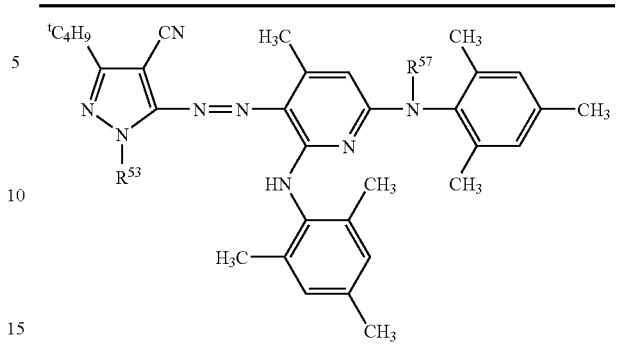
R⁵³=R⁵⁷
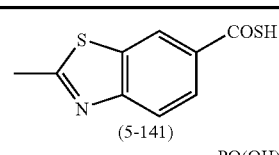
(5-141)
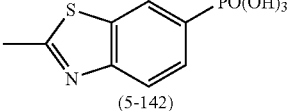
(5-142)
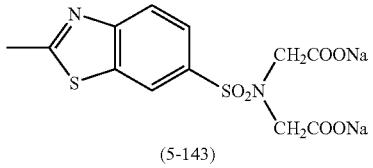
(5-143)
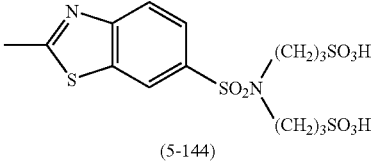
(5-144)
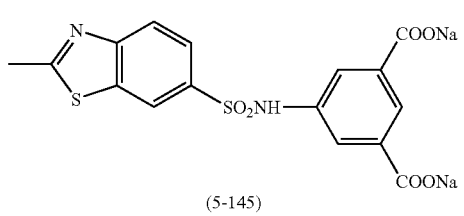
(5-145)
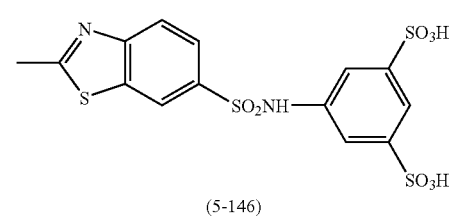
(5-146)
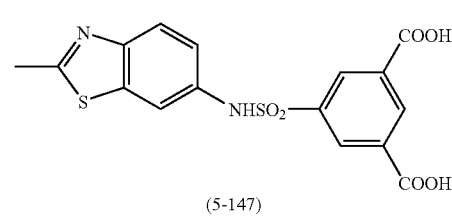
(5-147)

TABLE 5-5-continued

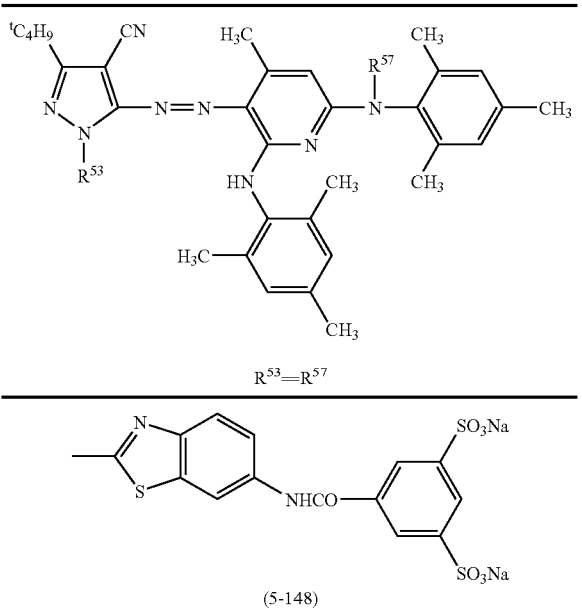

(5-148)

The coloring composition of the present invention is not particularly limited as long as it contains the above-described specific azo compound. The coloring composition can contain other various components according to the intended use. For example, for use as an ink composition, the coloring composition is prepared by dissolving and/or dispersing the azo compound in a medium, either oil-soluble or water-soluble, and adding appropriate additives hereinafter described to the solution or dispersion to impart properties and performance required of an ink composition.

The coloring composition can contain components for use as a color toner composition such as those disclosed in JP-A-7-209912, components for use as a resist composition for a color filter such as those disclosed in JP-A-6-35182, or components for use as a thermal transfer dye donating material (ink sheet) such as those disclosed in JP-A-7-137466.

The azo compounds used in the coloring composition of the invention can have selected substituents so as to exhibit physical properties desired for intended applications, such as solubility, dispersibility, and thermal mobility. The azo compounds are used in a selected form fit for intended applications, such as a solution or a dispersion (e.g., an emulsion or a suspension).

The coloring composition of the present invention is applicable to various image recording materials, particularly color image recording materials. Specifically, the coloring composition is applicable to ink jet recording materials, heat-sensitive recording materials, pressure-sensitive recording materials, electrophotographic recording materials, transfer type silver halide photographic materials, printing ink formulations, recording pens, ink compositions, and so forth. It is particularly suitable for ink compositions and ink jet recording materials. The coloring composition also finds application to color filters in solid-state image sensors, such as CCDs, and image displays, such as LCDs and PDPs, and dye baths for textile.

Third Preferred Embodiment

The method of improving ozone gas resistance of a color image according to the third preferred embodiment of the invention is characterized by using a compound having an oxidation potential nobler than 1.0 V vs. SCE. A compound having a nobler oxidation potential brings better results. A compound having an oxidation potential nobler than 1.1 V (vs. SCE) is still preferred. A compound having an oxidation potential nobler than 1.2 V (vs. SCE) is particularly preferred.

In the study on ozone resistance of a color image, the present inventors have found that there is a correlation between the oxidation potential of a coloring compound used for forming a color image and ozone resistance. They have ascertained that ozone resistance can be improved by using a compound whose oxidation potential is nobler than 1.0 V with respect to a saturated calomel electrode (SCE).

The improvement of ozone resistance of a color image by the compound according to the invention can be accounted for by the relationship between the highest occupied molecular orbital (HOMO) of the compound and a lowest unoccupied molecular orbital (LUMO) of ozone gas. That is, reaction occurs between the HOMO of a coloring compound and the LUMO of ozone to oxidize the coloring compound, which is considered to cause ozone resistance reduction of a color image. Therefore, ozone resistance improvement will be established by reducing the HOMO of a coloring compound to reduce its reactivity with ozone gas.

Oxidation potential $E_{ox}$ represents electron mobility from a sample to an electrode. The higher (the nobler) the $E_{ox}$, the less mobile the electrons, i.e., the less susceptible to oxidation the sample. In relation to a chemical structure, $E_{ox}$ becomes nobler with an electron-attracting group introduced therein, and it becomes less noble with an electron-donating group introduced therein.

$E_{ox}$ indicates the potential of the anode at which a compound lose its electrons in volutammetry as hereinafter described in detail. It is considered that $E_{ox}$ approximates to the energy level of HOMO of a compound in its ground state.

$E_{ox}$ can easily be measured by one skilled in the art. Reference can be made, e.g., in P. Delalhay, *New Instrumental Methods in Electrochemistry,* Interscience Publishers (1954), A. J. Bard, et al., *Electrochemical Methods,* John Willey & Sons (1980), and Akira Fujishima, et al., *Denkikagaku Sokuteiho,* Gihodo (1984).

Oxidation potential is measured with a DC polarographic system or a cyclic volutammetric system. A sample to be measured is dissolved in a solution of a supporting electrolyte, such as sodium perchlorate or tetrapropylammonium perchlorate, in a solvent, such as dimethylformamide or acetonitrile, in a concentration of $1 \times 10^{-4}$ to $1 \times 10^{-6}$ mol/l, and the electric potential of the working electrode is measured using an SCE as a reference electrode. Appropriate electrolyte and solvent are selected according to the oxidation potential or solubility of the sample. For the details of such selection reference can be made to A. Fujushima, et al., *Denkikagaku Sokuteiho,* pp. 101–118, Gihodo (1984).

The oxidation potential measurements can vary by about several tens of millivolts by the influences of potential difference between different liquids, resistance of the sample solution, etc. Correction can be made for such variation by using a standard sample (e.g., hydroquinone) thereby to assure reproducibility of the measurements.

In the present invention, oxidation potential measurement was made by DC polarography using an N,N-dimethylformamide solution containing 0.1 mol·dm$^{-3}$ of tetrapropylammonium perchlorate as a supporting electrolyte and $1 \times 10^{-3}$ mol·dm$^{-3}$ of a sample compound, an SCE as a reference electrode, a graphite electrode as a working electrode, and a platinum electrode as a counter electrode.

Oxidation potential also varies according to the structure of a compound. In order to reduce the reactivity with ozone, an electrophilic reagent, it is preferred to select a compound structure inherently having a noble oxidation potential from the standpoint of not only ozone resistance but molecular designing with ease of introducing an arbitrary electron-attracting or donating group to adjust color fastness, hue, and physical properties.

For example, it is desirable for reducing the reactivity with electrophilic ozone that an electron-attracting group be introduced into an arbitrary position of a compound structure thereby to make the oxidation potential nobler. A Hammett's substituent constant σp value can be made use of as a measure for electron attraction or donation of a substituent. The oxidation potential can be made nobler by introducing a substituent having a large σp value.

The Hammett's substituent constant σp value is explained here briefly. Hammett's rule is a rule of thumb proposed by L. P. Hammett in 1935 in an attempt to discuss quantitatively the influences of substituents on reaction and equilibrium of benzene derivatives and is today generally admitted to be valid. Substituent constants used in Hammett's rule include a σp value and a σm value. These values are found in many general books, such as J. A. Dean (ed.), *Lange's Handbook of Chemistry*, 12th Ed., McGraw-Hill (1979) and *Kagaku-no-ryoiki*, Extra No. 122, pp. 96–103, Nankodo (1979).

A maximum absorption wavelength and a half-value width which are used to characterize the compound of the present invention can easily be measured by one skilled in the art. Reference can be made, e.g., in The Chemical Society of Japan (ed.), *Jikken Kagaku Koza 7 Bunko II*, 4th Ed., pp. 175–199, Maruzen (1992). Specifically, measurements are made with a spectrophotometer using two quartz- or glass-made cells, one for a sample solution and the other for a control. The solvent for the sample solution is chosen arbitrarily from among those capable of dissolving the sample, having no absorption in the evaluation wavelength region, having small interaction with solute molecules, and having not so high volatility. In the present invention, N,N-dimethylformamide (DMF) was used for the measurement.

As for measurement of half-value with of an absorption spectrum, the description of *Jikken Kagaku Koza 7 Bunko II, 4th Ed.*, ibid, p. 154 can be referred to. A half-value width of an absorption spectrum represents a width of an absorption band at a half of the peak absorbance, which is used to describe the shape of the absorption band. A spectrum having a small half-value width is sharp, and one having a large half-value width is broad. Since existence of unnecessary absorptions in the shorter and the longer wavelength sides has no good influences on color reproduction, a dye having a spectrum with a smaller half-value with is preferred for hue. The maximum absorption wavelength and the half-value width used in the present invention are those measured on a DMF solution containing $5\times10^{-5}$ mol·dm$^{-3}$ of a sample compound using quartz cells having an optical path length of 1 cm.

The compound used in the present invention which has a maximum absorption at a wavelength between 500 nm and 580 nm with a half-value width of 150 nm or narrower serves as a magenta dye. The maximum absorption wavelength is preferably between 520 nm and 580 nm, still preferably between 520 nm and 570 nm, for a better hue. The half-value width is preferably 110 nm or less, still preferably 90 nm or less.

Compounds having the above-described physical properties are selected arbitrarily from azo dyes, quinone dyes, cyanine dyes, cationic dyes, phthalocyanine dyes, indigo dyes, fulgide dyes, intermolecular charge-transfer dyes, and the like. While dye compounds of any of these types are serviceable in the present invention, azo compounds are particularly preferred for their wide selection of tones and ease of synthesizing compounds satisfying the requirements for oxidation potential and hue. While the compounds which can be used in the present invention will further be described with particular reference to azo compounds, the description applies appropriately to other different dye structures and is not construed as being limiting the invention.

Compounds satisfying the condition as to oxidation potential can be obtained not only through actual oxidation potential measurement as described above but molecular design based on a chemical structure. It is known that a compound's oxidation potential relates to the energy level of the compound's HOMO as taught in Manabu Seno-o, et al. (ed.), *Daigakuin Buturikagaku* (Chu), pp. 534–536, Kodansha Scientific (1992) and Yasuhiko Sawaki, *Kisokagaku Course Buturiyukikagaku*, pp. 187–189, Maruzen (1999). Accordingly, oxidation potential of a compound can be brought nearer to a desired level by adjusting the HOMO level.

Before adjustment of a compound's HOMO level, it is necessary to grasp the HOMO level by any known technique. A compound's HOMO level can be calculated backward from the oxidation potential or by a molecular orbital method. The latest molecular orbital methods and details therefor are described in The Chemical Society of Japan (ed.), *Kikan Kagaku Sousetu No. 46 Koseido Bunshi Sekkei to Shinsozai Kaihatsu—Kinokagaku no Shintenkai wo Mezashite—*, pp. 65–96, Japan Scientific Societies Press (2000), and Sumio Tokita, *Electronics Kanren Shikiso—Genjo to Shorai Tenbo—*, pp. 20–25, CMC (1998). While it is desirable to obtain proper calculation results by as accurate molecular orbital calculations as possible, it may be convenient to use simpler calculations according to the required level of accuracy.

The relation between the structure of an azo compound and its HOMO level will be discussed with reference to substituent effects and a color development structure. Makoto Ohkawara, et al., *Kinousei Shikiso*, pp. 39–42, Kodansha Scientific (1992), Makoto Ohkawara, et al., *Kinosei Shikiso no Kagaku*, pp. 43–45, CMC (1981), and Sumio Tokita, *Kihousei Shikiso no Bunshi Sekkei—PPP Bunshikidoho to sono katuyo*, pp. 89–108, Maruzen (1989) describe substituent effects in relation to an absorption wavelength shift and an orbital energy level. It is understood that the HOMO level can be adjusted by introducing an arbitrary substituent to a position having a large HOMO coefficient. That is, introducing an electron-attracting substituent results in reduction in HOMO level, and introducing an electron-donating substituent results in increase in HOMO level.

In case an oxidation potential of a certain compound does not reach the range specified in the present invention, it can be raised to a desired level by introducing substituents according to the molecular designing guidelines as taught. In this case, a proper substituent can be selected by making use of the aforementioned Hammett's substituent constant σp value. To know molecular orbitals by the molecular orbital method is significant for knowing the HOMO coefficient. However, there is a limit in improvement by the substituent effects. It is easily anticipated that introducing many substituents would make dye synthesis difficult. Further, substitution is accompanied by hue changes, making it difficult to satisfy both requirements for oxidation potential and hue. It would be possible but probably very difficult to accomplish the objects of the invention merely by introducing substituents into known compounds. Because of the difficulties in freely and broadly adjusting a HOMO level of a compound by simply utilizing the substituent effects, it is recognized that manipulations should be added to the color development structure per se.

The color development structure will then be discussed. The color development structure may be either an azobenzene structure, which is a basic structure, or a heterylazo structure having a hetero ring. Considering that not only oxidation potential but absorption characteristics should be controlled, it is easier to make physical properties fall within the specific ranges by optimizing the color development structure than by utilizing the substituent effects. That is, as is easily anticipated, the freedom of molecular design would be broadened when a color development structure with a minimized HOMO level and a hue close to a desired one is selected as a basic structure into which a substituent is introduced to have an adjusted oxidation potential and an adjusted hue, as compared with adjustment relying on the above-mentioned substituent effects only. From this viewpoint, a heterylazo type compound is deemed preferred.

Makoto Ohkawara, et al., *Kinousei Shikiso*, p. 42, Kodansha Scientific (1992) supra shows examples in which use of a hetero ring, especially a sulfur-containing hetero ring, results in a shift of an absorption wavelength to a longer wavelength side. It is thought that utilization of such a color development system broadens the freedom of choice of an employable substituent and then makes it easier to design a compound that can achieve the objects of the invention.

In addition to the whole structure of a color development system and the substitute effects, other factors that influence the color development system of dyes include intermolecular and intramolecular actions, solvent effects, tautomerism, acid-base equilibrium, steric effects, and so forth as described in *Kinosei Shikiso no Kagaku*, pp. 58–63, CMC (1981).

A compound designed to have the above-recited half-value width in its absorption spectrum gives a color image with a satisfactory hue. As taught by Sumio Tokita in *Chemical Seminar 9 Color Chemistry*, pp. 150–161, Maruzen (1982), hues are always influenced by not only the energy level of electrons but the levels of molecular vibration or rotation. It is expected therefore that reduction of the influences by molecular vibration or rotation will make an absorption band narrower and sharper with a narrower half-value width. Approaches for reducing the contribution of molecular vibration and rotation to a hue include introduction of a sterically large substituent into a proper position for suppressing rotation of an arbitrary bond.

From the above-described experimentation and observations it has been revealed that a combination of the specific oxidation potential and half-value width according to the present invention yields a color image excellent in ozone gas resistance and hue. Of the compounds having the combination of the specific oxidation potential and half-value width which can be used in the present invention preferred are azo compounds represented by formula (7):

$$A^6-N=N-B^6 \tag{7}$$

wherein $A^6$ and $B^6$ each represent a substituted or unsubstituted aryl group or a substituted or unsubstituted 5- or 6-membered heteryl group.

The substituted or unsubstituted aryl group as $A^6$ or $B^6$ is preferably one having 6 to 30 carbon atoms, such as phenyl, naphthyl or anthracenyl, each of which may have a substituent(s). Two substituents on the aryl group may be connected to each other to form a condensed ring.

The substituted or unsubstituted 5- or 6-membered heteryl group as $A^6$ or $B^6$ is preferably one having 3 to 30 carbon atoms, such as thienyl, furyl, pyrrolyl, indolyl, imidazolyl, pyrazolyl, indazolyl, thiazolyl, isothiazolyl, oxazolyl, isooxazolyl, thiadiazolyl, oxadiazolyl, triazolyl, pyridyl, pyrazyl, pyrimidyl pyridazyl, quinolyl, isoquinolyl, phthalazinyl, quinoxalinyl, and quinozolinyl, each of which may have a substituent(s). Tow substituents on the heteryl group may be connected to each other to form a condensed ring. Where the heteryl group contains a nitrogen atom, the nitrogen atom may be a quaternarized one. It is preferred that at least one of $A^6$ and $B^6$ be a substituted or unsubstituted 5-or 6-membered heteryl group. It is still preferred that both $A^6$ and $B^6$ be a substituted or unsubstituted 5- or 6-membered heteryl group.

Of the above-described azo compounds, those having a heterylazo type color development structure are particularly successful in achieving the objects of the invention. Based on this knowledge, the inventors have reached compounds whose oxidation potential, maximum absorption wavelength, and half-value width fall within the above-specified ranges and which accomplish the objects of the invention.

The following list is specific examples of the azo compounds which are included in the compounds having an oxidation potential nobler than 1.0 V vs. SCE and showing a maximum absorption at a wavelength between 500 nm and 580 nm with a half-value width of 150 nm or narrower. These examples are given for illustrative purposes only but not for limitation.

6-(1)

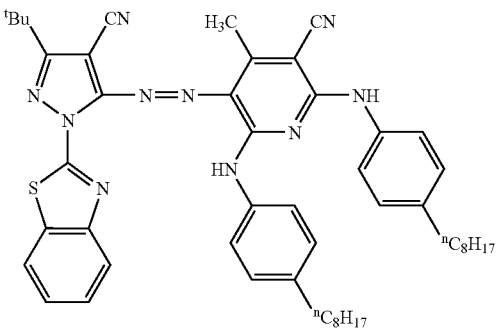

6-(2)

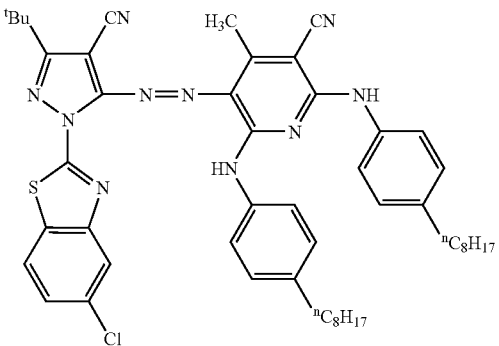

-continued
6-(3)
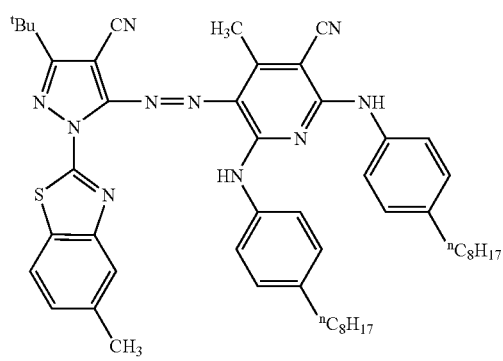
6-(4)
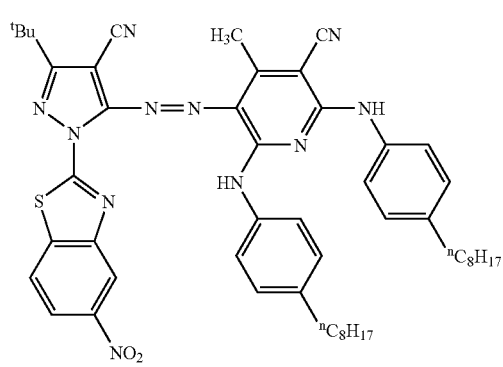
6-(5)
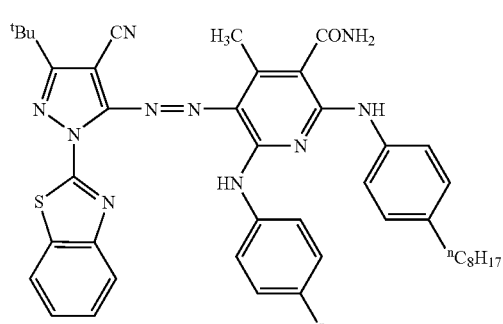
6-(6)
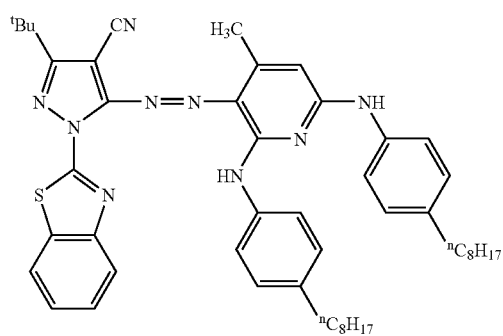
-continued
6-(7)
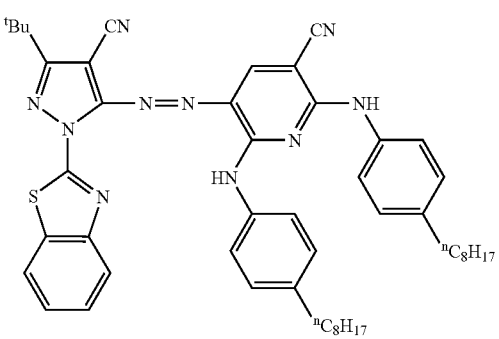
6-(8)
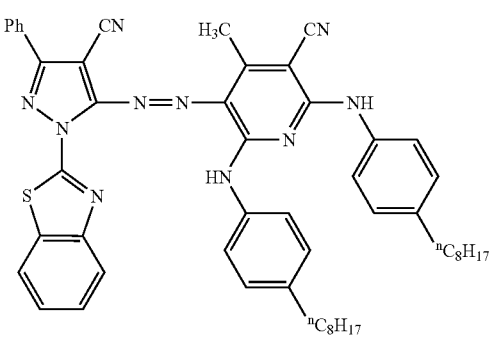
6-(9)
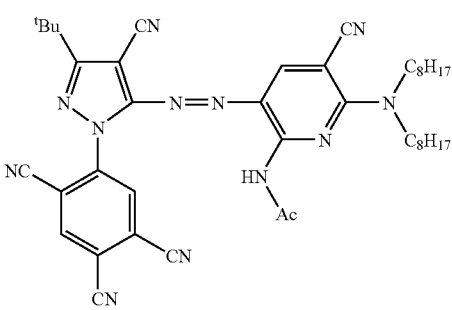
6-(10)
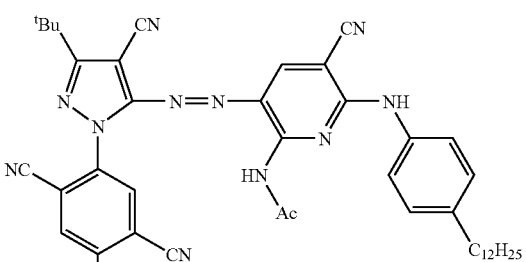
6-(11)
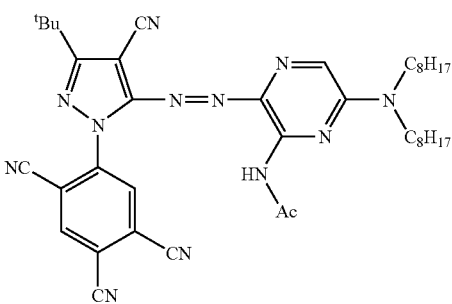

-continued
6-(12)
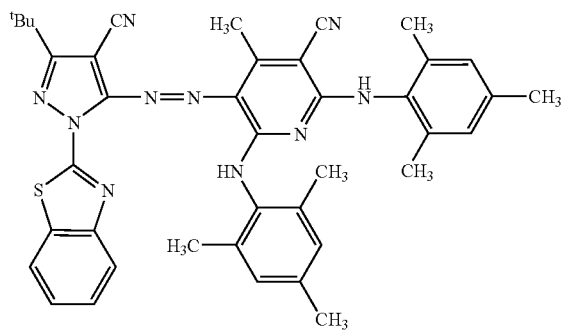
6-(13)
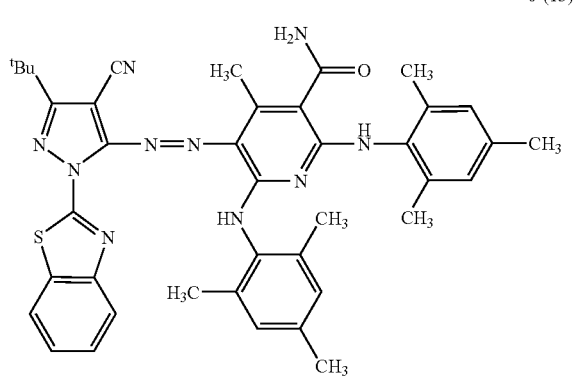
6-(14)
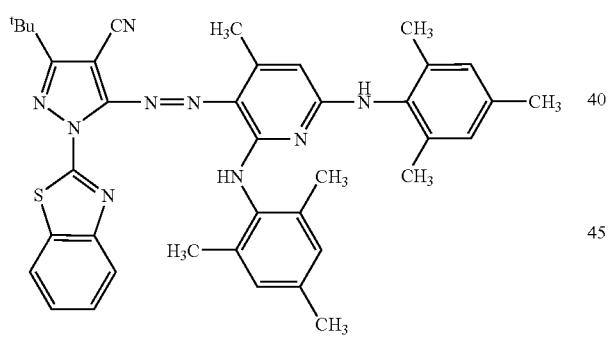
6-(15)
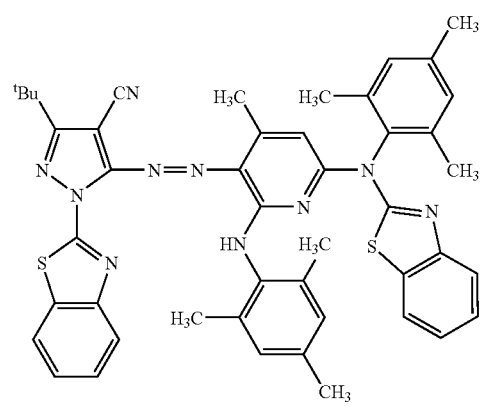
-continued
6-(16)
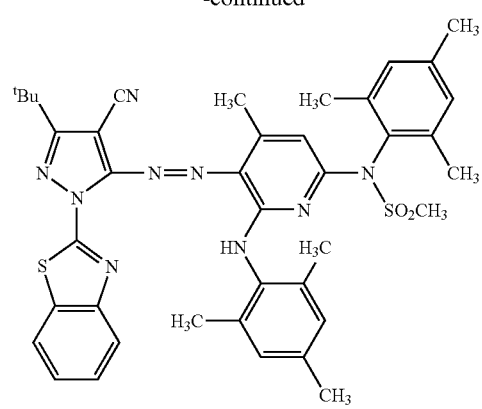
6-(17)
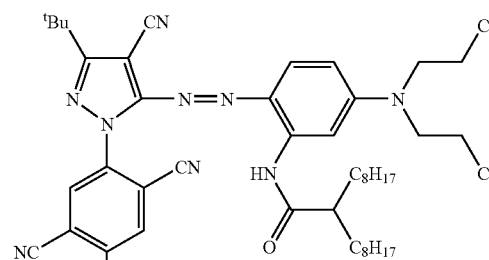
6-(18)
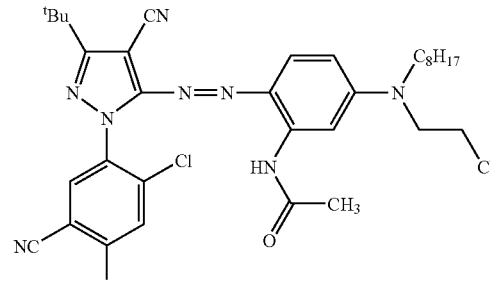
6-(19)
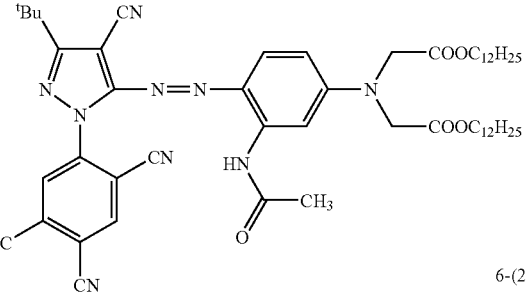
6-(20)
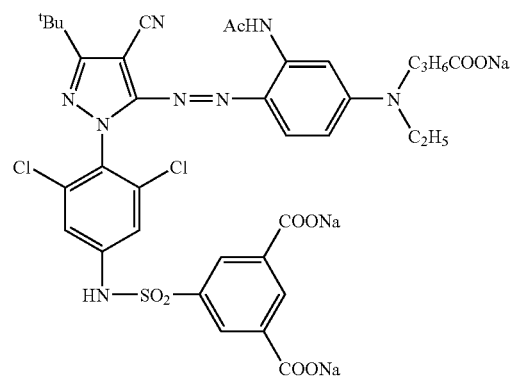

-continued
6-(21)
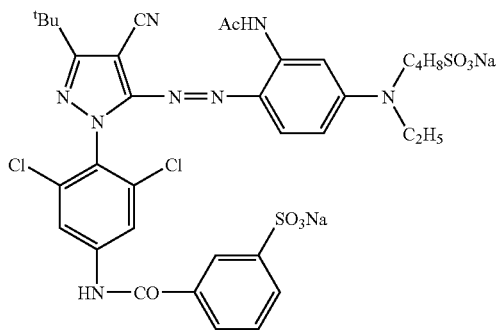
6-(25)
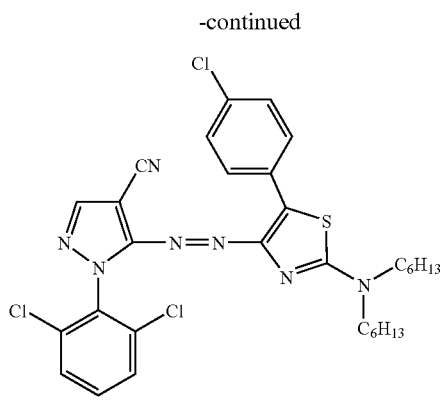
6-(22)
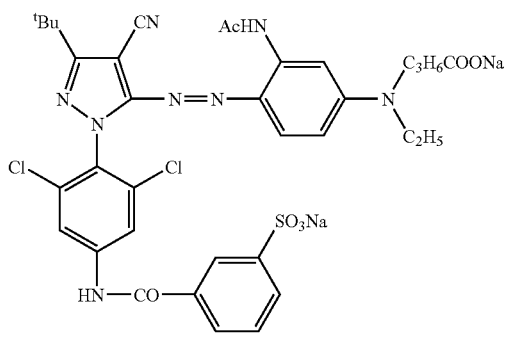
6-(26)
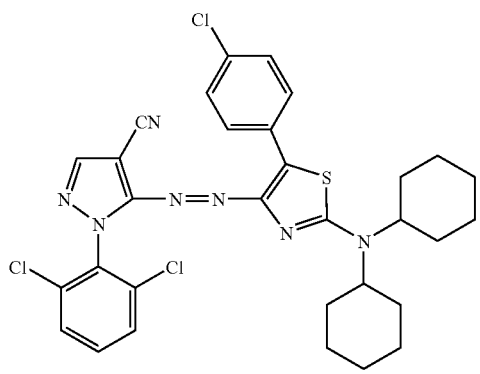
6-(23)
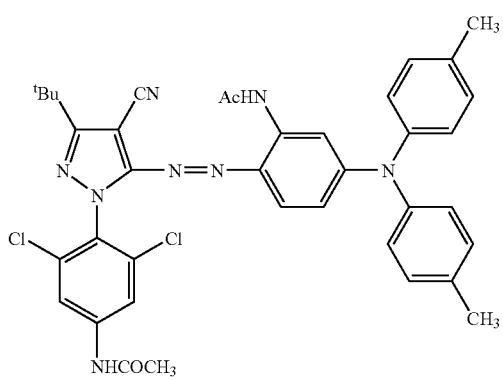
6-(27)
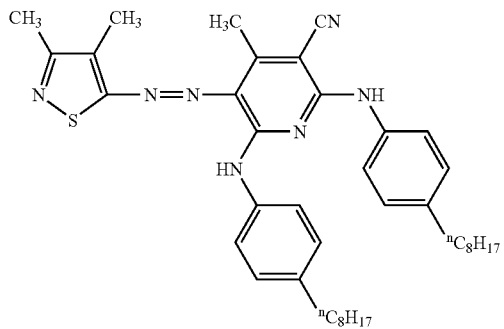
6-(24)
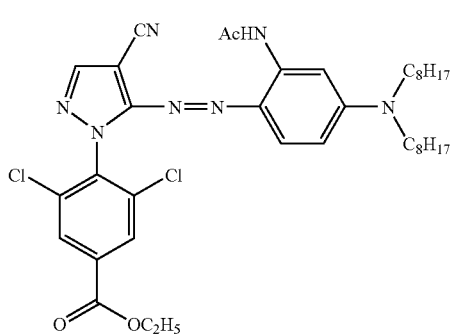
6-(28)
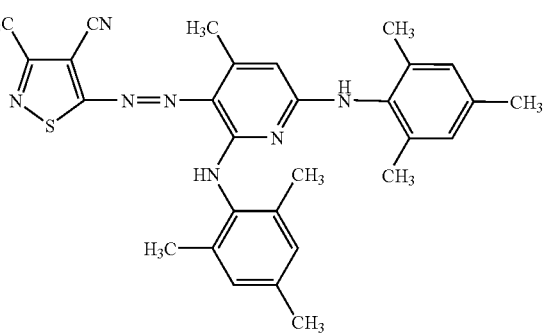

6-(29)
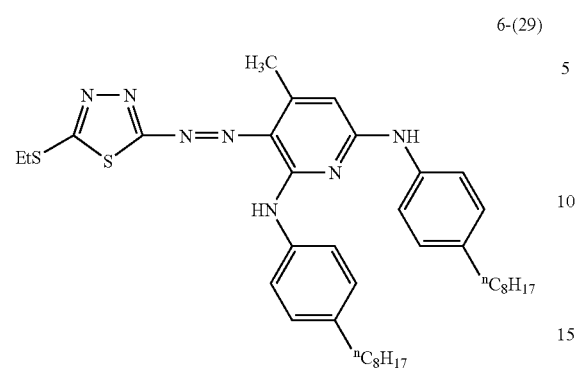
6-(30)
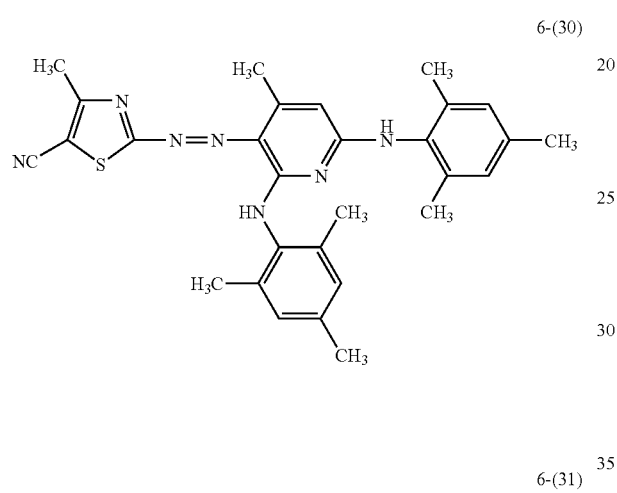
6-(31)
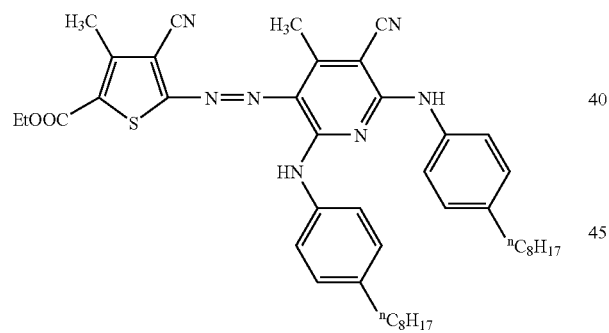
6-(32)
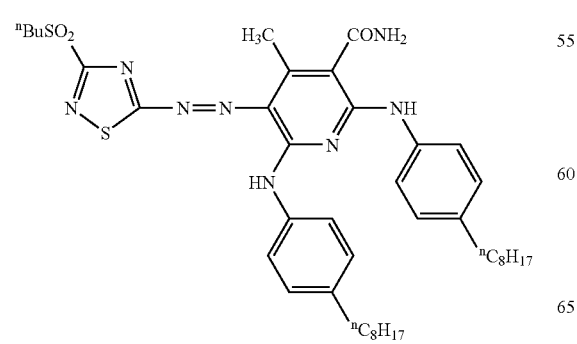
6-(-)
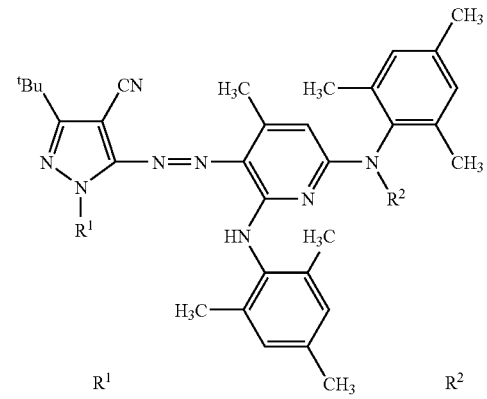
R¹   R²
6-(33)
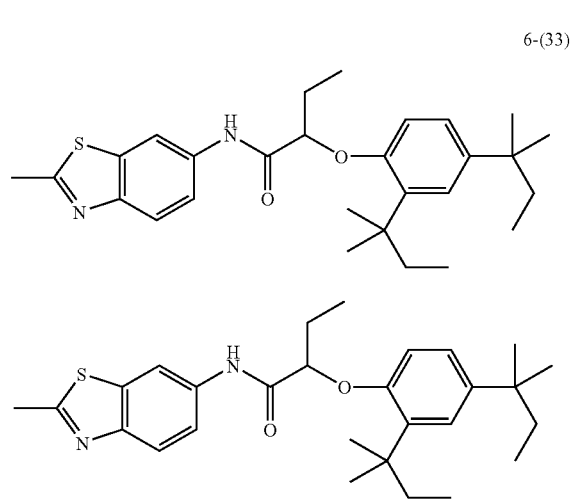
6-(34)
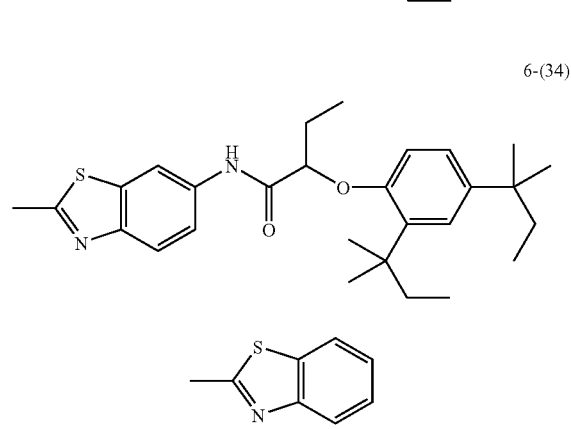
6-(35)
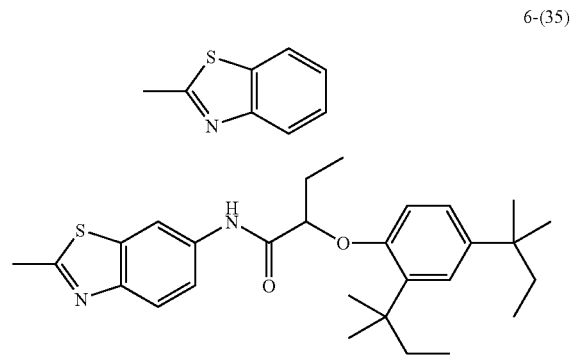

-continued
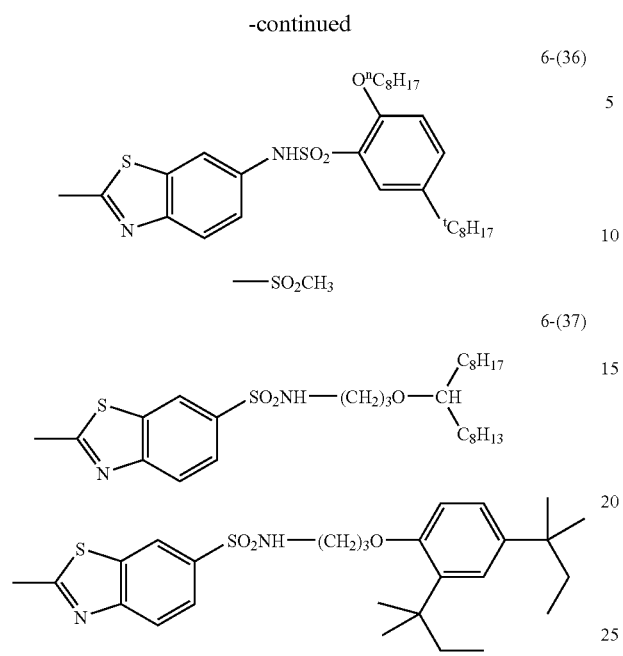
6-(36)
6-(37)
—SO₂CH₃
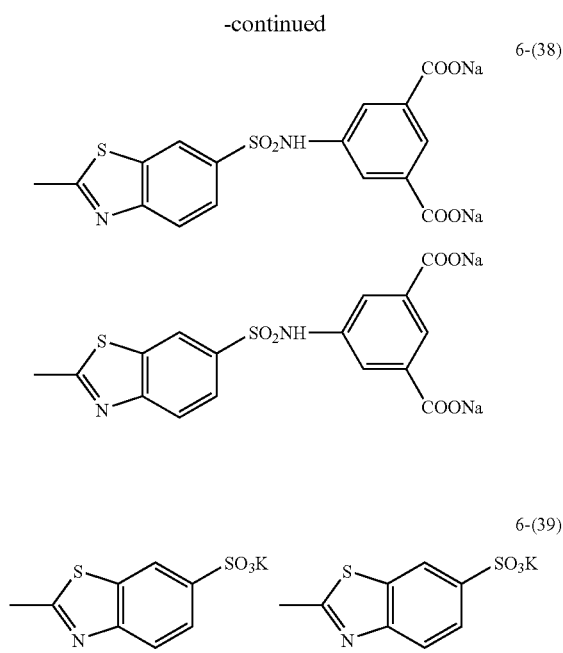
6-(38)
6-(39)
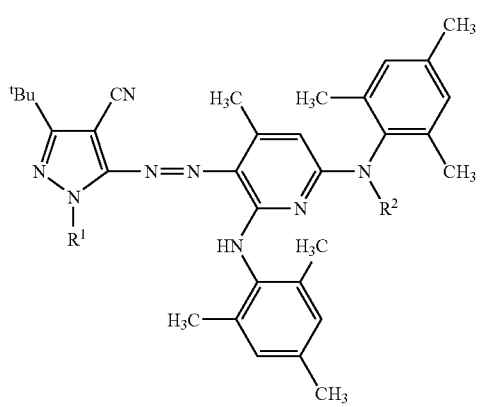
| R¹ | R² |
|---|---|
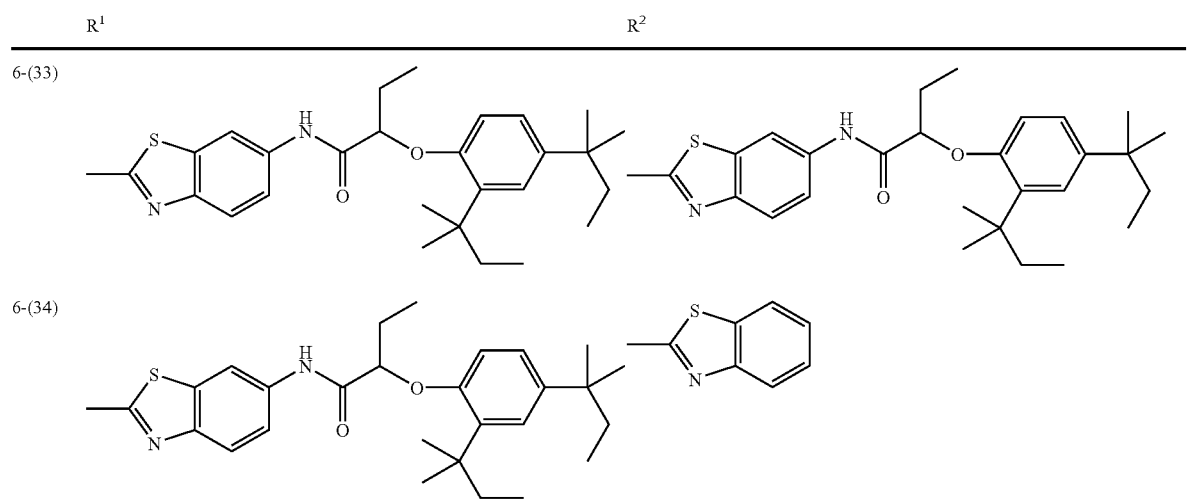
6-(33)
6-(34)

-continued

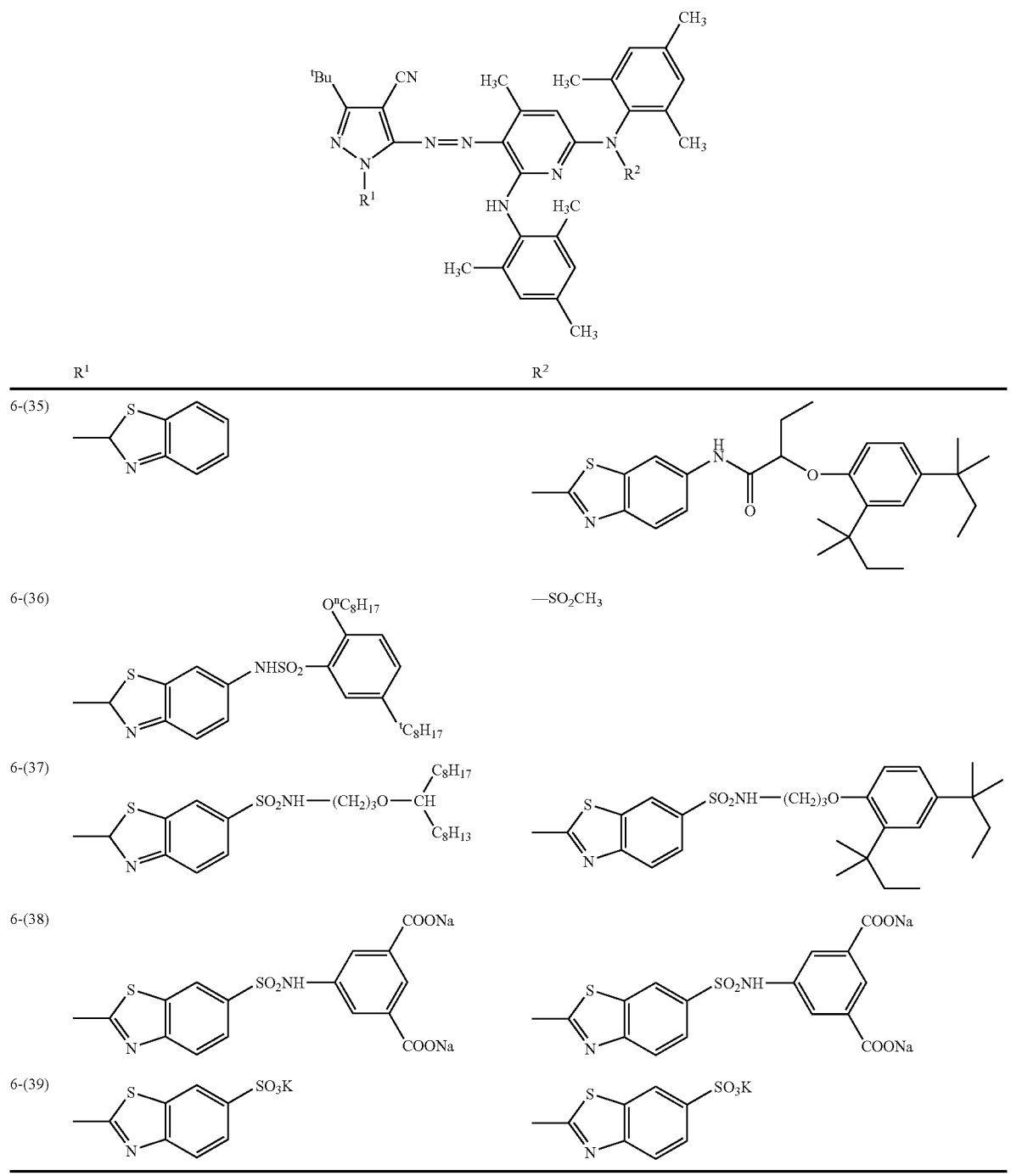

As is recognizable from the above list of useful compounds, it is impossible to estimate an oxidation potential of an azo compound from its chemical structure. In other words, a compound with desired physical properties can be obtained by optimizing the aforementioned various factors.

The method of the present invention for improving ozone resistance is applicable to various image recording materials, particularly color image recording materials. Specifically, the method is applicable to ink jet recording materials, heat-sensitive recording materials, pressure-sensitive recording materials, electrophotographic recording materials, transfer type silver halide photographic materials, printing inks, recording pens, and so forth. It is particularly effective on ink jet recording materials, heat-sensitive recording materials, and electrophotographic recording materials. The most preferred application is ink jet recording.

The method also finds application to color filters for solid-state image sensors, such as CCDs and CMOSs, image displays, such as LCDs and PDPs, and dye baths for textile.

The method of the invention is embodied by preparing a compound having selected substituents according to molecular design so as to exhibit physical properties fit for an intended application, such as solubility, dispersibility, and thermal mobility. The compound can be used in a selected form suited to an intended application, such as a solution or a dispersion (e.g., an emulsion or a suspension).

[Ink Composition for Ink-jet Recording]

The ink-jet ink composition according to the present invention is prepared by dissolving and/or dispersing the above-described azo dye in a lipophilic or aqueous medium. Water-based ink compositions using an aqueous medium are preferred. Other necessary additives are added in ranges that do not impair the effects of the invention. Useful additives include drying preventives (wetting agents), emulsion stabilizers, penetrants, ultraviolet absorbers, anti-browning agents, antifungals, pH adjustors, surface tension modifiers, defoaming agents, antiseptics, viscosity modifiers, dispersants, dispersion stabilizers, rust preventives, and chelating agents. These additives are directly added to a water-based ink formulation. Where an oil-soluble dye is used in the form of a dispersion, the additives are generally added to a prepared dye dispersion or, may be added to the oily phase or the aqueous phase in ink preparation.

Drying preventives are preferably used for the purpose of preventing clogging of nozzles due to ink drying. Water-soluble organic solvents having a lower vapor pressure than water are preferred drying preventives. Examples of such water-soluble organic solvents include polyhydric alcohols, such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerol, and trimethylolpropane; lower alkyl ethers of polyhydric alcohols, such as ethylene glycol monomethyl (or monoethyl) ether, diethylene glycol monomethyl (or monoethyl) ether, and triethylene glycol monoethyl (or monobutyl) ether; heterocyclic compounds, such as 2-pyrrolidone, N-methyl-2-pyrrolidone, 1,3-dimethyl-2-imidazolidinone, and N-ethylmorpholine; sulfur-containing compounds, such as sulfolane, dimethyl sulfoxide, and 3-sulfolene; polyfunctional compounds, such as diacetone alcohol and diethanolamine; and urea derivatives. Preferred of them are polyhydric alcohols, such as glycerol and diethylene glycol. These drying preventives can be used either individually or as a combination of two or more thereof. A preferred content of the drying preventive in the ink composition is 10 to 50% by weight.

Penetrants are preferably added for the purpose of helping ink penetrate paper. Useful penetrants include alcohols, such as ethanol, isopropyl alcohol, butanol, di(or tri) ethylene glycol monobutyl ether, and 1,2-hexanediol; sodium lauryl sulfate, sodium oleate, and nonionic surface active agents. The content of the penetrant is decided so as not to cause feathering or strike-through. A penetrant content of 5 to 30% by weight in the ink composition will suffice to produce satisfactory effect.

UV absorbers are used to improve archival stability. Useful UV absorbers include benzotriazole compounds disclosed, e.g., in JP-A-58-185677, JP-A-61-190537, JP-A-2-782, JP-A-5-197075, and JP-A-9-34057, benzophenone compounds described, e.g., in JP-A-46-2784, JP-A-5-194483, and U.S. Pat. No. 3,214,463, cinnamic acid compounds described, e.g., in JP-B-48-30492, JP-B-56-21141, and JP-A-10-88106, triazine compounds disclosed, e.g., in JP-A-4-298503, JP-A-8-53427, JP-A-8-239368, JP-A-10-182621, and JP-W-8-501291 (the term "JP-W" as used herein means an unexamined published international patent application), and the compounds given in Research Disclosure No. 24239. Compounds emitting fluorescence on UV absorption, i.e., fluorescent brightening agents, such as stilbene derivatives and benzoxazole derivatives, are also useful.

Anti-browning agents are used to improve archival stability. Various organic or metal complex anti-browning agents are usable. Organic anti-browning agents include hydroquinones, alkoxyphenols, dialkoxyphenols, phenols, anilines, amines, indanes, chromans, alkoxyanilines, and heterocyclic compounds. Metal complex anti-browning agents include nickel complexes and zinc complexes. Specific examples of the anti-browning agents are given in Research Disclosure, No. 17643, VII-I to VII-J, ibid, No. 15162, ibid, No. 18716, p. 650, left column, ibid, No. 36544, p. 527, ibid, No. 307105, p. 872, and the patents cited in ibid, No. 15162. The compounds represented by the general formulae and their specific examples described in JP-A-62-215272, pp. 127–137 are also useful.

Useful antifungals include sodium dehydroacetate, sodium benzoate, sodium pyridinethione-1-oxide, ethyl p-hydroxybenzoate, ad 1,2-benzisothiazolin-3-one and its salts. A preferred content of the antifungals in the ink composition ranges from 0.02 to 1.00% by weight.

Neutralizing agents, such as organic bases and inorganic alkalis, can be used as pH adjustors. For the purpose of improving ink storage stability, pH adjustors are preferably added to adjust the ink composition at a pH of 6 to 10, particularly 7 to 10, taking use in summer into consideration.

Surface tension modifiers include nonionic, cationic or anionic surface active agents. It is preferred for the ink-jet ink composition to have a surface tension of 20 to 60 mN/m, particularly 25 to 45 mN/m. It is preferred for the ink composition to have a viscosity of 30 mPa·s or less, particularly 20 mPa·s or less.

Useful anionic surface active agents include fatty acid salts, alkylsulfates, alkylbenzenesulfonates, alkylnaphthalenesulfonates, dialkylsufosuccinates, alkylphosphoric ester salts, naphthalenesulfonic acid-formalin condensates, and polyethylene glycol alkylsulfates. Useful nonionic surface active agents include polyethylene glycol alkyl ethers, polyethylene glycol alkyl allyl ethers, polyethylene glycol fatty acid esters, sorbitan fatty acid esters, polyoxyethylene sorbitan fatty acid esters, polyoxyethylene alkylamines, glycerol fatty acid esters, ethylene oxide/propylene oxide block copolymers, and acetylenic diol-based surfactants available from Air Products & Chemicals, Inc. under the trade name Surfynol. Amine oxide type amphoteric surface active agents, such as N,N-dimethyl-N-alkylamine oxides, are useful as well. The surface active agents described in JP-A-59-157636, pp. 37–38 and Research Disclosure, No. 308119 (1989) are also useful.

Antifoaming agents which can be added if desired include fluorine-containing compounds, silicone compounds, and chelating agents, such as EDTA.

Where the azo dye of the invention is dispersed in an aqueous medium, techniques that are preferably taken are described in JP-A-11-286637 and Japanese Patent Application Nos. 2000-78491, 2000-80259, and 2000-62370, in which coloring particles comprising a dye and an oil-soluble polymer are dispersed in an aqueous medium, or Japanese Patent Application Nos. 2000-78454, 2000-78491, 2000-203856, and 2000-203857, in which a dye dissolved in a high-boiling organic solvent is dispersed in an aqueous medium. The particulars of the methods for dispersing the dye in an aqueous medium and the kinds and amounts of the materials used therefor (oil-soluble polymers, high-boiling organic solvents, and additives) are selected appropriately with reference to the publications cited above. It is also possible to finely disperse the azo dye directly in an aqueous medium. Dispersants or surface active agents can help dispersing. Suitable dispersing apparatus include simple stirrers, impeller stirrers, in-line stirrers, mills (e.g., a colloid mill, a ball mill, a sand mill, an attritor, a roll mill or an agitator mill), ultrasonic stirrers, and high-pressure emulsifiers or homogenizers (e.g., Gaulin Homogenizer, Microfluidizer, and DeBEE2000).

In addition to the aforementioned literature, JP-A-5-148436, JP-A-5-295312, JP-A-7-97541, JP-A-7-82515, JP-A-7-118584, JP-A-11-286637, and Japanese Patent Application No. 2000-87539 furnish information about ink-jet ink formulations.

The aqueous medium which can be used in the ink composition of the present invention is water generally containing a water-miscible organic solvent. Useful water-miscible organic solvents include alcohols, e.g., methanol, ethanol, propanol, isopropyl alcohol, butanol, isobutanol, sec-butanol, t-butanol, pentanol, hexanol, cyclohexanol, and benzyl alcohol; polyhydric alcohols, e.g., ethylene glycol, diethylene glycol, triethylene glycol, polyethylene glycol, propylene glycol, dipropylene glycol, polypropylene glycol, butylene glycol, hexanediol, pentanediol, glycerol, hexanetriol, and thiodiglycol; glycol derivatives, e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, ethylene glycol diacetate, ethylene glycol monomethyl ether acetate, triethylene glycol monomethyl ether, triethylene glycol monoethyl ether, and ethylene glycol monophenyl ether; amines, e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethylene-imine, and tetramethylpropylenediamine; and other polar solvents, e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone. These solvents may be used either individually or as a combination of two or more thereof.

The ink-jet ink composition preferably contains the azo compound of the invention in a concentration of 0.2 to 10% by weight. The ink-jet ink composition may contain known colorants in addition to the azo compound of the invention. In this case, it is preferred that a total concentration of colorants be within in the above range.

The ink-jet ink composition of the invention is used to form not only monochromatic but full color images. For full-color image formation, magenta ink, cyan ink, and yellow ink are used. Black ink may be used in combination for tone adjustment.

Yellow dyes to be used in combination are arbitrarily chosen. Useful yellow dyes include aryl or heterylazo dyes having, as a coupling component, phenols, naphthols, anilines, heterocyclic compounds (e.g., pyrazolone or pyridone), open-chain active methylene compounds, etc.; azomethine dyes having an open-chain active methylene compound as a coupling component; methine dyes such as benzylidene dyes and monomethine oxonol dyes; quinone dyes such as naphthoquinone dyes and anthraquinone dyes; quinophthalone dyes, nitro dyes, nitroso dyes, acridine dyes, and acridinone dyes.

Cyan dyes to be used in combination are arbitrary. Useful cyan dyes include aryl or heterylazo dyes having phenols, naphthols, anilines, etc. as a coupling component; azomethine dyes having phenols, naphthols, heterocyclic compounds (e.g., pyrrolotriazole), etc. as a coupling component; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; indigo dyes; and thioindigo dyes.

Yellow or cyan dyes which do not develop a color until part of their chromophore is dissociated are also useful. Counter cations in this type of dyes include inorganic cations such as alkali metals or ammonium, organic cations such as pyridinium or a quaternary ammonium salt, or a polymeric cation having such a cation as a partial structure.

Black dyes which can be used in combination include disazo dyes, trisazo dyes, tetraazo dyes, and a carbon black dispersion.

[Ink Jet Recording Method]

Ink jet recording is carried out by supplying energy to ink-jet ink to form fine ink droplets which fly onto a known image-receiving medium to form an image. Known media include plain paper, resin-coated paper (for example, ink-jet papers disclosed in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, and JP-A-10-337947), films, electrophotographic papers, cloth, glass, metal, and earthenware.

Polymer latex compounds may be used for image formation to impart gloss, water resistance or improved weatherability to images. A latex compound is supplied to an image-receiving medium before, after or simultaneously with image formation. In other words, a latex compound may be present in either the medium or the ink composition or be separately applied in the form of liquid. For the detail, Japanese Patent Application Nos. 2000-363090, 2000-315231, 2000-354380, 2000-343944, 2000-268952, 2000-299465, and 2000-297365 can be referred to.

Recording paper and recording film which can be used as an image-receiving medium to be ink-jet printed in the ink composition of the invention usually comprises a substrate and an ink-receptive layer, and, if desired, a backcoating layer. The substrate includes paper, synthetic paper, and plastic films. Paper as a substrate is prepared from a slurry of chemical pulp (e.g., LBKP or NBKP), mechanical pulp (e.g., groundwood pulp (GP), pressurized groundwood pulp (PGW), refiner mechanical pulp (RMP), thermo-mechanical pulp (TMP), chemothermo-mechanical pulp (CTMP), chemomechanical pulp (CMP) or chemogroundwood pulp (CGP)) or used paper pulp (e.g., de-inked pulp (DIP)) which can contain, if desired, known additives such as pigments, binders, sizes, fixatives, cationic agents, paper strengthening agents, and the like by papermaking techniques with a wire paper machine, a cylinder paper machine, etc. The substrate preferably has a thickness of 10 to 250 μm and a basis weight of 10 to 250 g/m$^2$.

An ink-receptive layer or a backcoating layer is provided on the substrate either directly or after sizing with starch, polyvinyl alcohol, etc. or forming an anchor coat. If necessary, the substrate is smoothened on a machine calender, a temperature-gradient calender, a soft nip calender, etc. Preferred substrates are paper laminated on both sides with film of a polyolefin (e.g., polyethylene), polystyrene, polyethylene terephthalate, polybutene or a copolymer thereof and plastic films. It is desirable to add into the laminating resin a white pigment (e.g., titanium dioxide or zinc oxide) or a tinting material (e.g., cobalt blue, ultramarine or neodymium oxide).

The ink-receptive layer provided on the substrate comprises a pigment, preferably a white pigment, and an aqueous binder. Useful white pigments include inorganic ones, such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate; and organic ones, such as styrene plastic pigments, acrylic plastic pigments, urea resins, and melamine resins. Porous inorganic pigments are preferred. Those with a large surface area, such as synthetic amorphous silica, are still preferred. Silicic acid anhydride obtained by a dry process and hydrous silicic acid obtained by a wet process are both usable. Hydrous silicic acid is particularly preferred.

Useful aqueous binders which can be used to form the ink-receptive layer include water-soluble polymers such as polyvinyl alcohol, silanol-modified polyvinyl alcohol, starch, cationic starch, casein, gelatin, carboxymethyl cellulose, hydroxyethyl cellulose, polyvinylpyrrolidone, polyalkylene oxides, and polyalkylene oxide derivatives; and water-dispersible polymers such as styrene-butadiene latices and acrylic emulsions. The aqueous binders are used either individually or as a combination thereof. Preferred of the recited binders are polyvinyl alcohol and silanol-modified polyvinyl alcohol for their adhesion to pigment particles and capability of forming a peel-resistant coat.

The ink-receptive layer can contain, in addition to the pigments and aqueous binders, mordants, waterproofing agents, light fastness improving agents, surface active agents, and other additives.

The mordant to be added to the ink-receptive layer is preferably immobilized. For this, polymeric mordants are preferably used. The details of useful polymeric mordants are given in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, and U.S. Pat. Nos. 2,484,430, 2,548,564, 3,148,061, 3,309,690, 4,115,124, 4,124,386, 4,193,800, 4,273,853, 4,282,305, and 4,450,224. In particular, the polymeric mordants described in JP-A-1-161236, pp. 212–215 are preferred for obtaining images of high image quality with improved light fastness.

The waterproofing agents, which are effective for making images water-resistant, preferably include cationic resins, such as polyamide-polyamine epichlorohydrin, polyethylene-imine, polyamine sulfone, dimethyldiallylammonium chloride polymers, cationic polyacrylamide, and colloidal silica. Polyamide-polyamine epichlorohydrin is particularly preferred. A preferred cationic resin content in the image-receiving layer is 1 to 15% by weight, particularly 3 to 10% by weight.

The light fastness improving agents include zinc sulfate, zinc oxide, hindered amine antioxidants, and benzophenone or benzotriazole UV absorbers. Zinc sulfate is particularly suitable.

The surface active agents in the image-receiving layer function as a coating aid, a peel resistance improving agent, a slip improving agent or an antistatic agent. Useful surface active agents are described in JP-A-62-173463 and JP-A-62-183457. Organic fluorine compounds may be used in place of the surface active agents. Hydrophobic organic fluorine compounds, such as fluorine surface active agents, oily fluorine compounds (e.g., fluorine oil), and solid fluorine compounds (e.g., tetrafluoroethylene resin), are preferred. Details of the organic fluorine compounds are described in JP-B-57-9053 (cols. 8–17), JP-A-61-20994 and JP-A-62-135826. Other additives that can be added to the ink-receptive layer include pigment dispersants, thickeners, defoaming agents, dyes, fluorescent whitening agents, antiseptics, pH adjustors, matting agents, and hardeners. The ink-receptive layer can have a single or double layer structure.

The backcoating layer, which can be provided if desired, comprises a white pigment, an aqueous binder, and additives. The white pigment includes inorganic ones such as light precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate, and magnesium hydroxide; and organic ones such as styrene plastic pigments, acrylic plastic pigments, polyethylene, hollow particles, urea resins, and melamine resins.

Aqueous binders which can be used in the backcoating layer include water-soluble polymers such as styrene/maleic acid salt copolymers, styrene/acrylic acid salt copolymers, polyvinyl alcohol, silanol-modified polyvinyl alcohol, starch, cationic starch, casein, gelatin, carboxymethyl cellulose, hydroxyethyl cellulose, and polyvinylpyrrolidone; and water-dispersible polymers such as styrene-butadiene latices and acrylic emulsions. Additives which can be used in the backcoating layer include defoaming agents, foam-suppressors, dyes, fluorescent whitening agents, antiseptics, and waterproofing agents.

A polymer latex may be incorporated into any layer constituting the paper or film for ink-jet recording inclusive of the backcoating layer for the purpose of improving film properties, for example, dimensional stabilization, curling prevention, anti-blocking, and crack prevention. For the details refer to JP-A-62-245258, JP-A-62-136648, and JP-A-62-110066. Addition of a polymer latex having a low glass transition temperature (40° C. or lower) into a layer containing a mordant will prevent cracking or curling. Addition of a polymer latex having a high glass transition temperature to a backcoating layer is also effective for curling prevention.

The ink-jet ink composition according to the present invention is applicable to any known ink jet recording systems, such as an electrostatic system in which ink droplets are ejected by an electrostatic attracting force, a piezoelectric system in which vibrating pressure by a piezoelectric element is utilized (pressure pulse system), an acoustic system in which electrical signals are converted to an acoustic beam, which is applied to ink, and ink is ejected by making use of a radiating pressure, and a thermal system in which air bubbles are generated by heat to eject ink droplets. Further, ink jet recording includes a system in which a number of fine droplets of low concentration ink called photoink are ejected, a system in which a plurality of ink formulations having substantially the same hue but different concentrations are used to improve image quality, and a system of using colorless transparent ink.

[Color Toner]

The color toner according to the present invention comprises a binder resin having dispersed therein the azo compound of the invention as a colorant. Any kind of binder resins commonly employed in toners, such as styrene resins, acrylic resins, styrene/acrylic resins, and polyester resins, can be used.

The toner particles can be mixed with inorganic or organic particles as an external additive for improving fluidity or for charge control. Fine particles of silica or titania having been surface-treated with alkyl-containing coupling agent, etc. are preferably used. The particles preferably have an average primary particle size of 10 to 500 nm. An advisable content of the particles in the color toner is 0.1 to 20% by weight.

The toner can contain a release agent. Any kind of release agents customarily employed for toners is useful. Examples of useful release agents include olefins, such as low-molecular polypropylene, low-molecular polyethylene, and ethylene-propylene copolymers, microcrystalline wax, carnauba wax, Fischer-Tropsch wax, and paraffin wax. A suitable content of the release agent in the toner is 1 to 5% by weight.

If desired, the toner can contain a charge control agent. A colorless one is desirable for color development. For example, a charge control agent having a quaternary ammonium salt structure or a calix-arene structure are useful.

Carriers, which can be used in combination with the toner to make up a two-component developer, include non-coated carriers composed solely of magnetic particles, such as iron and ferrite, and coated carriers composed of the magnetic particles and a resin coat. Carrier particles preferably have a volume average particle size of 30 to 150 μm.

Color image forming systems to which the color toner of the invention is applicable are not particularly limited. For example, the color toner is applicable to a system in which a full color image formed on a photoreceptor by successive monochromatic image formation is transferred to a medium or a system in which a monochromatic image formed on a photoreceptor is successively transferred onto an intermediate image holding member to form a full color image, which is then transferred to a medium.

[Thermal Transfer Recording Material]

The thermal transfer recording material according to the present invention is made up of an ink sheet and an image-receiving sheet. The ink sheet comprises a substrate and an ink layer of the azo dye of the invention dispersed in a binder. The image-receiving sheet receives and fixes the dye which is transferred from the ink sheet by the heat of a thermal head according to image recording signals. The ink layer of the ink sheet is prepared by coating the substrate with an ink composition prepared by dissolving the azo dye in a solvent together with the binder or finely dispersing the azo dye in the binder and drying the coating layer. The binder resin, the ink solvent and the substrate to be used to make the ink sheet and the image-receiving sheet to be combined are preferably chosen from those disclosed in JP-A-7-137466.

For full color image formation, a cyan ink sheet having an ink layer containing a thermally diffusing cyan dye, a magenta ink sheet having an ink layer containing a thermally diffusing magenta dye, and a yellow ink sheet having an ink layer containing a thermally diffusing yellow dye are prepared. If desired, a black ink sheet having an ink layer containing a black image-forming material may be used in combination.

[Color Filter]

A color filter is produced by a process comprising forming a pattern by use of a photoresist and dyeing the pattern and a process comprising forming a pattern of a photoresist containing a colorant. The latter process is disclosed in JP-A-4-163552, JP-A-4-128703, and JP-A-4-175753. Either of these processes is applicable to the production of the color filter according to the present invention. The color filter of the invention is preferably produced by the processes disclosed in JP-A-4-175753 and JP-A-6-35182, which comprise coating a substrate with a positive resist composition comprising a thermosetting resin, a quinonediazide compound, a crosslinking agent, a colorant, and a solvent, exposing the coating layer (photoresist) to light through a mask, developing the exposed area to form a positive resist pattern, exposing the entire resist pattern to light, and curing the resist pattern. A black matrix is formed in a usual manner to obtain an RGB or YMC color filter. The kinds and amounts of the thermosetting resin, quinonediazide compound, crosslinking agent, and solvent to be used are preferably selected from those disclosed in the above-cited publications.

The present invention provides a method of improving ozone resistance of a color image in ink jet recording on an image-receiving medium having a substrate and an ink-receptive layer containing inorganic white pigment particles formed on the substrate with an ink-jet ink composition, which comprises using the above-described ink composition for ink-jet recording according to the present invention.

The image-receiving medium used in this aspect of the invention is the same as described with respect to the ink jet recording method.

EXAMPLES

The present invention will now be illustrated in greater detail with reference to Examples, but it should be understood that the invention is not deemed to be limited thereto. Unless otherwise noted, all the percents and parts are by weight.

Example 1

Preparation of Water-based Ink

The following components were mixed, and deionized water was added to make one liter. The mixture was heated at 30 to 40° C. for 1 hour while stirring. If necessary, the pH of the mixture was adjusted to 9 with a 10 mol/l aqueous solution of potassium hydroxide, and the mixture was filtered under pressure through a microfilter with an average pore size of 0.25 μm to prepare ink composition A.

Formulation of Ink Composition A:

| | |
|---|---|
| Azo compound a-26 | 8.5 g/l |
| Diethylene glycol | 150 g/l |
| Urea | 37 g/l |
| Glycerol | 130 g/l |
| Triethylene glycol monobutyl ether | 130 g/l |
| Triethanolamine | 6.9 g/l |
| Benzotriazole | 0.08 g/l |
| Surfynol 465 (from Air Products & Chemicals, Inc.) | 10 g/l |
| Proxel XL | 3.5 g/l |

Ink compositions B to L were prepared in the same manner as for ink composition A, except for replacing compound a-26 with the azo dye shown in Table 10 below.

Image Recording and Evaluation

An image was recorded on photo glossy paper (Super Photo Grade, available from Fuji Photo Film Co., Ltd.) on an ink jet printer (PM-700C, available from Seiko Epson Corp.) by using each of ink compositions A to L. The resulting image was evaluated for hue, light fastness, and ozone resistance as follows. The results obtained are shown in Table 10.

1) Hue

The hue was observed with the naked eye and graded on an A-to-C scale. A means "excellent", B "good", and C "poor".

2) Light Fastness

The image density immediately after recording (initial density: $C_i$) was measured with a reflection densitometer X-Rite 310TR. After the image was exposed to xenon light (85,000 lux) for 7 days in a weather-o-meter (Atlas Ci65, from Atlas Electric Devices Co.), the image density ($C_f$) was again measured at three points whose initial densities $C_i$ were 1, 1.5, and 2.0. A dye retention (%) was calculated from equation:

Dye retention (%)=$[(C_i-C_f)/C_i] \times 100$

An image having a dye retention of 80% or higher at every measuring point was graded A. An image having a dye retention lower than 80% at one or two out of three points was graded B. An image having a dye retention lower than 80% at every point was graded C.

3) Ozone Resistance

The image immediately after recording was left to stand in a chamber having an ozone gas concentration of 0.5 ppm for 24 hours. A dye retention after exposure to ozone was obtained on three measuring points in the same manner as for evaluation of light fastness. The ozone concentration in the chamber was set with an ozone gas monitor (OZG-EM-01, available from Applics Co., Ltd.). An image having a dye retention of 70% or higher at every measuring point was graded A. An image having a dye retention lower than 70% at one or two out of three points was graded B. An image having a dye retention lower than 70% at every point was graded C.

TABLE 10

| Ink | Dye | Hue | Light Fastness | Ozone Resistance | Remark |
|-----|-----|-----|----------------|------------------|--------|
| A | a-26 | A | A | A | Invention |
| B | a-27 | A | A | A | " |
| C | a-28 | A | A | A | " |
| D | a-29 | A | A | A | " |
| E | b-5 | A | A | A | " |
| F | b-8 | A | A | A | " |
| G | c-2 | A | A | A | " |
| H | c-3 | A | A | A | " |
| I | (a) | A–B | C | C | Comparison |
| J | (b) | B–C | B | C | " |
| K | (c) | B | B | C | " |
| L | (d) | A | B | C | " |

TABLE 10-continued

| Ink | Dye | Hue | Light Fastness | Ozone Resistance | Remark |
|-----|-----|-----|----------------|------------------|--------|

Comparative dye (a):

Comparative dye (b):

Comparative dye (c):

Comparative dye (d):

As is seen from Table 10, the magenta images printed in ink compositions A to H according to the present invention are clearer than those printed in comparative ink compositions I to L. Further, the images printed in ink compositions A to H were superior in light fastness and ozone resistance.

Further, super fine glossy paper (MJA4S3P, available from Seiko Epson) was printed on the same inkjet printer (PM-700C) by using ink compositions A to H. Evaluation of the resulting images for hue, light fastness, and ozone resistance gave satisfactory results similar to those shown in Table 10.

Example 2

Preparation of Ink Sample 201

Azo dye b-1 (oil-soluble dye) (4.83 g) and 7.04 g of sodium dioctylsulfosuccinate were dissolved in a mixture of 4.22 g of high-boiling organic solvent S-2 (shown below), 5.63 g of high-boiling organic solvent S-11 (shown below), and 50 ml of ethyl acetate at 70° C. To the solution was added 500 ml of deionized water while stirring with a magnetic stirrer to prepare an oil-in-water coarse dispersion, which was passed through Microfluidizer (available from Microfluidics Inc.) under a pressure of 600 bar five times. The solvent was removed from the resulting emulsion on a rotary evaporator until no smell of ethyl acetate was felt. The resulting fine emulsion of the hydrophobic dye was mixed with 140 g of diethylene glycol, 50 g of glycerol, 7 g of Surfynol 465 (from Air Products & Chemicals, Inc.), and 900 ml of deionized water to prepare ink sample 201.

S-2:

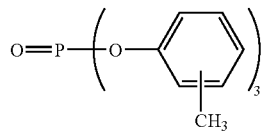

S-11:

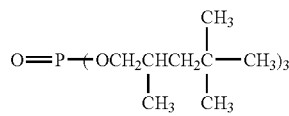

Preparation of Ink Samples 202 to 210

Ink samples 202 to 210 were prepared in the same manner as for ink sample 201, except for replacing the oil-soluble compound b-1 with the oil-soluble azo compound shown in Table 11 below. Table 11 also shows the volume average particle size of the resulting emulsion ink formulations 201 to 210 measured with a particle size analyzer Micro Track UPA, supplied from Nikkiso Co., Ltd.

Image Recording and Evaluation

An image was recorded on photo glossy paper (Ink Jet Paper Photo Grade, from Fuji Photo Film) on an ink jet printer (PM-700 from Seiko Epson) by using each of ink samples 201 to 210. The recorded images were evaluated for hue, paper independence, water resistance, light fastness, and ozone resistance according to the following methods. The comparative ink compositions I to L prepared in Example 1 were also evaluated in the same manner. The results obtained are shown in Table 11.

1) Hue

A reflection spectrum of the image was measured in a region of 390 to 730 nm at a 10 nm wavelength interval, and $a^*$ and $b^*$ values were calculated based on the CIE 1976 $L^*a^*b^*$ color space system. A preferred magenta tone was defined as follows, and the hue of the image was graded on an A-to-C scale according to the following standard.

Preferred $a^*$ value: 76 or greater
Preferred $b^*$ value: −30 to 0
A: Both $a^*$ and $b^*$ values are within the respective preferred ranges.
B: One of $a^*$ and $b^*$ values is within its preferred range.
C: Both $a^*$ and $b^*$ values are out of the respective preferred ranges.

2) Paper Independence

The tone of the image formed on the photo glossy paper and that of an image separately formed on paper for plain paper copiers were compared. A small difference between the two, which indicates small paper dependence, was graded A (satisfactory), and a large difference was graded B (poor).

3) Water Resistance

The photo glossy paper having an image formed thereon was dried at room temperature for 1 hour, then soaked in water for 30 seconds, and dried spontaneously at room temperature. Feathering of the ink image was observed, and water resistance of the ink was graded A (no feathering), B (slight feathering) or C (considerable feathering).

4) Light Fastness

The image formed on the photo glossy paper was exposed to xenon light (85,000 lux) for 3 days in a weather-o-meter (Ci65 from Atlas). A dye retention on three measuring points was obtained in the same manner as in Example 1. An image having a dye retention of 70% or higher at every measuring point was graded A. An image having a dye retention lower than 70% at one or two out of three points was graded B. An image having a dye retention lower than 70% at every point was graded C.

5) Ozone Resistance

The same test method and grading system as used in Example 1 were followed.

TABLE 11

| Sample | Dye | Average Particle Size (nm) | Hue | Paper Independence | Water Resistance | Light Fastness | Ozone Resistance |
|---|---|---|---|---|---|---|---|
| 201 | a-21 | 55 | A | A | A | A | A |
| 202 | a-22 | 48 | A | A | A | A | A |
| 203 | a-23 | 63 | A | A | A | A | A |
| 204 | a-24 | 58 | A | A | A | A | A |
| 205 | a-25 | 70 | A | A | A | A | A |
| 206 | b-1 | 73 | A | A | A | A | A |
| 207 | b-3 | 72 | A | A | A | A | A |
| 208 | c-4 | 53 | A | A | A | A | A |
| 209 | c-5 | 52 | A | A | A | A | A |
| 210 | e-1 | 68 | A | A | A | A | A |
| I | (a) | — | B | B | B | B | C |
| J | (b) | — | B | B | B | A–B | C |
| K | (c) | — | B | B | B | B | C |
| L | (d) | — | A–B | B | B | A–B | C |

As is apparent from Table 11, the ink-jet ink compositions according to the present invention are excellent in color developability, paper independence, hue, water resistance, and light fastness.

Example 3

Ink jet printing was carried out on photo glossy paper GP-301 (available from Canon Inc.) with an ink jet printer BJ-F850 (from Canon Inc.) loaded with an ink cartridge filled with each of the ink compositions prepared in Example 2. The results of evaluation of the images were equal to those obtained in Example 2.

Example 4

Preparation of Color Toner

Three parts of azo dye a-16 and 100 parts of a styrene-acrylate copolymer HIMR TB-1000F, available from Sanyo Chemical Industries, Ltd., were ground in a ball mill, kneaded at 150° C., and cooled. The solid was crushed in a Hammer mill, pulverized in an air jet pulverizer, and classified to prepare a toner having a particle size of from 1 to 20 μm. The toner was mixed with an iron powder carrier EFV250/400, available from Powdertech Corp., at a weight ratio of 10:90 to prepare a two-component developer.

Developers were prepared in the same manner, except for replacing 3 parts of azo dye a-16 with 3 parts of the dye shown in Table 12 or 6 parts of the pigment shown in Table 12.

Image Formation and Evaluation

A copy test was carried out using each of the resulting developers on a dry process electrophotographic copying machine NP-5000, supplied by Canon Inc. Paper and OHP sheets were used as image-receiving media to form reflected images and transmitted images, respectively. The amount of the toner attached to the medium was set at 0.7±0.05 mg/cm$^2$. The resulting images were evaluated for hue, light fastness, and transparency (of OHP images) according to the following methods. The results obtained are shown in Table 12.

1) Hue

Hue was observed and graded in the same manner as in Example 1.

2) Light Fastness

The toner image was exposed to xenon light (85,000 lux) for 5 days in a weather-o-meter (Ci65 from Atlas), and a dye retention after exposure was calculated in the same manner as in Example 1. An image having a dye retention of 90% or higher was graded A. An image having a dye retention of 80 to 90% was graded B. An image having a dye retention lower than 80% was graded C.

3) Transparency

The visible light transmittance of the OHP image at 650 nm was measured with an autographic spectrophotometer Model 330 from Hitachi, Ltd. The spectral transmittance (650 nm) of an OHP sheet with no image formed was used for correction. An image having a spectral transmittance of 80% or higher was graded A. An image having a spectral transmittance of 70 to 80% was graded B. An image having a spectral transmittance lower than 70% was graded C.

TABLE 12

| | Colorant | Hue | Light Fastness | Transparency |
|---|---|---|---|---|
| Invention | a-16 | A | A | A |
| " | a-17 | A | A | A |
| " | a-1 | A | A | A |

TABLE 12-continued

| | Colorant | Hue | Light Fastness | Transparency |
|---|---|---|---|---|
| " | b-2 | A | A | A |
| Comparison | (e) | A | C | A |
| " | (f) | B | B | B |
| " | C.I. Pigment Red 57:1 | C | A | C |
| " | C.I. Pigment Red 122 | C | A | C |

Comparative dye (e)

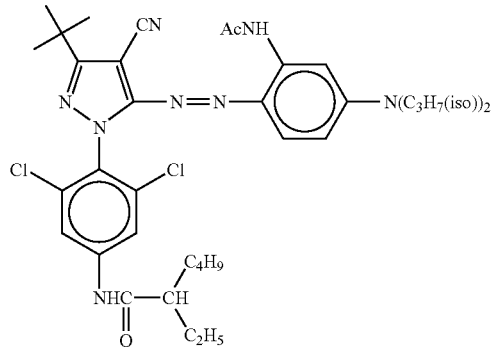

Comparative Dye (f)
(compound of JP-A-7-209912, Example 1):

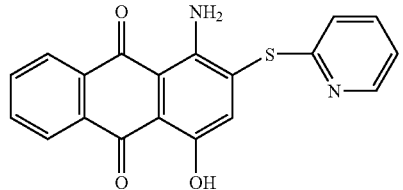

As is apparent from Table 12, the color toners according to the present invention exhibit excellent color reproducibility and high transparency fit for OHPs. Therefore, they are suitable for full color reproduction. Having satisfactory light fastness, the toners of the invention are capable of providing images preservable for an extended period of time.

Example 5

Preparation of Thermal Transfer Ink Sheet

A coating composition for ink layer having the following formulation was applied with a wire bar coater on a 6 μm thick polyethylene terephthalate film having a heat-resistant slip coat on the back side thereof (available from Teijin Ltd.) to a dry thickness of 1.5 μm to prepare a thermal transfer ink sheet 501.

Formulation of Coating Composition for Ink Layer:

| | |
|---|---|
| Azo dye b-2 | 10 mmol |
| Polyvinyl butyral resin (Denka Butyral 5000-A, from Denki Kagaku Kogyo K.K.) | 3 g |
| Toluene | 40 ml |
| Methyl ethyl ketone | 40 ml |
| Polyisocyanate (Takenate D110N, from Takeda Chemical Industries, Ltd.) | 0.2 ml |

Thermal transfer ink sheets 502 to 505 were prepared in the same manner as for ink sheet 501, except for replacing compound b-2 with the dye compound shown in Table 13 below.

Preparation of Thermal Transfer Image-receiving Sheet

A coating composition having the following formulation was applied to 150 μm thick synthetic paper YUPO-FPG-150 (available from YUPO Corp.) with a wire bar coater to a dry thickness of 8 μm and dried in an oven at 100° C. for 30 minutes to prepare a thermal transfer image-receiving sheet.

Formulation of Coating Composition for Image-receiving Layer:

| | |
|---|---|
| Polyester resin (Vylon 280, from Toyobo Co., Ltd.) | 22 g |
| Polyisocyanate (KP-90, from Dainippon Ink & Chemicals, Inc.) | 4 g |
| Amino-modified silicone oil (KF-857, from Shin-Etsu Silicone Co., Ltd.) | 0.5 g |
| Methyl ethyl ketone | 85 ml |
| Toluene | 85 ml |
| Cyclohexanone | 15 ml |

Each of the ink sheets 501 to 505 and the image-receiving sheet were superposed on each other with the ink layer and the image-receiving layer faced each other. Thermal transfer recording was conducted by applying heat energy from the ink sheet side with a thermal head under conditions of an output of 0.25 W/dot, a pulse width of 0.15 to 15 msec, and a dot density of 6 dots/mm. The magenta image formed on the image-receiving layer was clear with no transfer unevenness.

The maximum density of the resulting image was measured. Further, the image on the image-receiving layer was exposed to xenon light (17000 lux) for 5 days. The status A reflection density of the image area having an initial status A reflection density (before exposure) of 1.0 was measured to calculate a dye retention percentage to evaluate light fastness of the dye. The results obtained are shown in Table 13.

TABLE 13

| Dye-donating sheet | Dye | Maximum Density | Light Fastness (%) | Remark |
|---|---|---|---|---|
| 501 | b-2 | 1.8 | 91 | Invention |
| 502 | b-6 | 1.7 | 89 | " |
| 503 | a-16 | 1.6 | 92 | " |
| 504 | a-19 | 1.6 | 90 | " |
| 505 | (g) | 1.8 | 52 | Comparison |

Comparative dye (g):

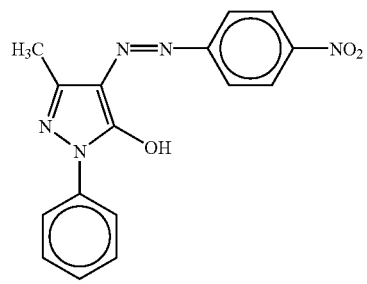

As can be seen from Table 13, the thermal transfer recording materials containing the azo dyes of the present invention provide transfer images having a clear hue and higher light fastness than the comparative materials.

Example 6

Preparation of Positive Resist Composition

A positive resist composition was prepared from the following components.

Thermosetting resin: cresol novolak resin obtained from m-cresol/p-cresol/formaldehyde (molar ratio=5/5/7.5); average molecular weight on polystyrene conversion: 4300 3.4 parts Quinonediazide compound: o-naphthoquinonediazide 5-sulfonate (with an average of two hydroxyl groups esterified) prepared from a phenol compound of formula:

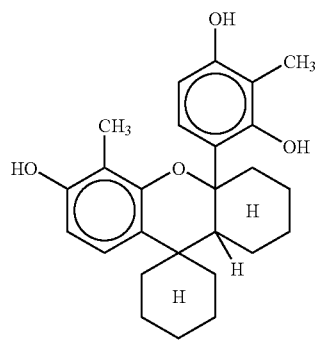

1.8 parts

| | |
|---|---|
| Crosslinking agent: hexamethoxymethylolated melamine | 0.8 part |
| Solvent: ethyl lactate | 20 parts |
| Magenta dye of the invention (see Table 14) | 1 part |

Preparation of Color Filter

The positive resist composition was applied to a silicon wafer by spin coating and heated to evaporate the solvent. The photoresist layer thus formed was exposed to light through a mask by use of an i-line stepper LD-5010-i (NA=0.40), supplied by Hitachi, Ltd., to decompose the quinonediazide compound in the exposed areas. The exposed photoresist was heated to 100° C. and then developed with an alkaline developer SOPD or SOPD-B available from Sumitomo Chemical Co., Ltd. to remove the exposed areas to obtain a mosaic color pattern having a resolution of 0.8 μm. The entire area of the pattern was exposed to light and heated at 150° C. for 15 minutes to obtain a magenta color filter for subtractive color reproduction.

Preparation of Comparative Color Filter

A positive resist composition was prepared in the same manner as described above, except for replacing the magenta dye of the invention with a comparative magenta dye, Orasol Pink from Ciba-Geigy, Ltd. The resulting positive resist composition was applied to a silicon wafer by spin coating, followed by heating to evaporate the solvent. The silicon wafer was imagewise exposed to light, developed with an alkaline developer to form a positive color pattern having a resolution of 1 μm, which was entirely exposed to light and heated at 150° C. for 10 minutes to obtain a comparative magenta color filter.

Evaluation

The absorption characteristics and light fastness of the resulting color filters were evaluated as follows. The results obtained are shown in Table 14.

1) Absorption Characteristics

The transmission spectrum of each magenta color filter was measured, and the spectra were compared in terms of sharpness of the slope on the shorter and the longer wavelength sides. A color filter with a sharp slope on both sides was graded A. A color filter with a sharp slope on one of the sides was graded B. A color filter with no sharpness on either side was graded C.

2) Light Fastness

The color filter was exposed to xenon light (85000 lux) in a weather-o-meter (Ci65 from Atlas) for 7 days. The light fastness was evaluated from the dye retention (%) after the exposure. The results obtained are shown in Table 14.

TABLE 14

|  | Dye | Absorption Characteristics | Light Fastness (%) |
|---|---|---|---|
| Invention | a-16 | A | 92 |
| " | b-2 | A | 88 |
| " | e-3 | A | 87 |
| " | e-5 | A | 85 |
| Comparison | Orasol Pink | B | 67 |

It is apparent from Table 14 that the color filters prepared by using the azo dyes of the present invention show steep slopes on both the shorter and the longer wavelength sides to ensure excellent color reproducibility and excellent light fastness as compared with the comparative filter.

Containing a novel dye exhibiting excellent absorption characteristics as one of three primaries and sufficient fastness against light, heat, humidity, and active gases in the environment, the coloring composition of the present invention is capable of providing color images or coloring materials excellent in hue and fastness. The coloring composition is particularly suited in the preparation of printing inks such as ink-jet ink, ink sheets of thermal transfer recording materials, color toners for electrophotography, color filters to be used in displays such as LCDs and PDPs and solid-state image sensors such as CCDs, and dye baths for textile.

The ink-jet ink composition comprising the coloring composition and the ink jet recording method using the ink-jet ink composition provide images with a satisfactory hue and resistance against light and active gases in the environment, particularly ozone gas.

The thermal transfer recording materials prepared by using the coloring composition provide color transfer images with a clear hue and excellent light fastness.

The color toners prepared by using the coloring composition provide toner images which exhibit high light fastness, excellent color reproducibility, and high transparency for OHPs.

The color filters prepared by using the coloring composition are excellent in color reproducibility and light fastness.

Example 7

Preparation of Water-based Ink

The following components were mixed, heated at 30 to 40° C. for 1 hour while stirring, and filtered under pressure through a microfilter with an average pore size of 0.8 μm and a diameter of 47 mm to prepare ink composition 2-A.

Formulation of Ink Composition 2-A:

| Azo compound 2-a-6 | 5 parts |
|---|---|
| Diethylene glycol | 9 parts |
| Tetraethylene glycol monobutyl ether | 9 parts |
| Glycerol | 7 parts |
| Diethanolamine | 2 parts |
| Water | 70 parts |

Ink compositions 2-B to 2-L were prepared in the same manner as for ink composition 2-A, except for replacing compound 2-a-6 with the azo dye shown in Table 2-6 below.

Image Recording and Evaluation

An image was recorded on photo glossy paper (Super Photo Grade, available from Fuji Photo Film Co., Ltd.) on an ink jet printer (PM-700C, available from Seiko Epson Corp.) by using each of ink compositions 2-A to 2-L. The resulting image was evaluated for hue, light fastness, and ozone resistance as follows. The results obtained are shown in Table 2-6.

1) Hue

The hue was observed with the naked eye and graded on an A-to-C scale. A means "excellent", B "good", and C "poor".

2) Light Fastness

The image density immediately after recording (initial density: $C_i$) was measured with a reflection densitometer X-Rite 310TR. After the image was exposed to xenon light (85,000 lux) for 7 days in a weather-o-meter (Atlas Ci65, from Atlas Electric Devices Co.), the image density ($C_f$) was again measured at three points whose initial densities were 1, 1.5, and 2.0. A dye retention (%) was calculated from equation:

$$\text{Dye retention (\%)} = [(C_i - C_f)/C_i] \times 100$$

An image having a dye retention of 80% or higher at every measuring point was graded A. An image having a dye retention lower than 80% at one or two out of three points was graded B. An image having a dye retention lower than 80% at every point was graded C.

3) Ozone Resistance

The image immediately after recording was left to stand in a chamber having an ozone gas concentration of 0.5 ppm for 24 hours. The image density after the ozone exposure was measured with X-Rite 310TR at three points whose initial densities were 1, 1.5, and 2.0 to obtain a dye retention according to the same equation as for evaluation of light fastness. The ozone concentration in the chamber was set with an ozone gas monitor (OZG-EM-01, available from Applics Co., Ltd.). An image having a dye retention of 70% or higher at every measuring point was graded A. An image having a dye retention lower than 70% at one or two out of three points was graded B. An image having a dye retention lower than 70% at every point was graded C.

TABLE 2-6

| Ink | Dye | Hue | Light Fastness | Ozone Resistance | Remark |
|---|---|---|---|---|---|
| 2-A | 2-a-6 | A | A | A | Invention |
| 2-B | 2-a-7 | A | A | A | " |
| 2-C | 2-a-8 | A | A | A | " |
| 2-D | 2-a-9 | A | A | A | " |
| 2-E | 2-b-1 | A | A | A | " |
| 2-F | 2-b-4 | A | A | A | " |

TABLE 2-6-continued

| Ink | Dye | Hue | Light Fastness | Ozone Resistance | Remark |
|---|---|---|---|---|---|
| 2-G | 2-c-1 | A | A | A | " |
| 2-H | 2-c-3 | A | A | A | " |
| 2-I | (2-a) | A–B | C | C | Comparison |
| 2-J | (2-b) | B–C | B | C | " |
| 2-K | (2-c) | B | B | C | " |
| 2-L | (2-d) | A | B | C | " |

Comparative dye (2-a):

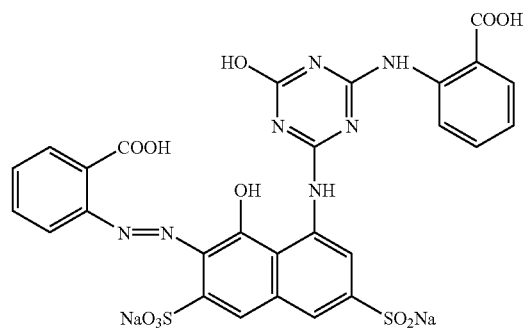

Comparative dye (2-b):

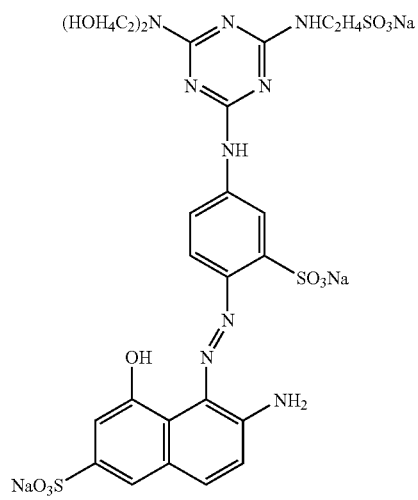

Comparative dye (2-c):

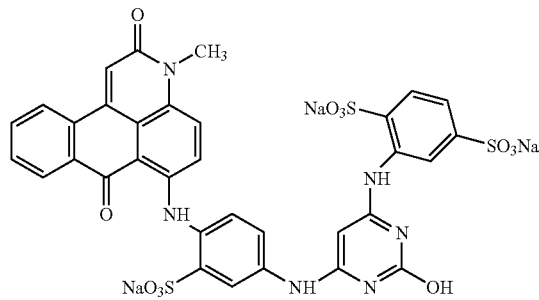

Comparative dye (2-d):

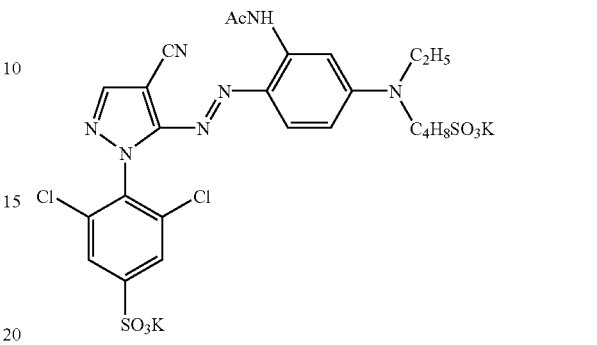

As is seen from Table 2-6, the magenta images printed in ink compositions 2-A to 2-H according to the present invention are clearer than those printed in comparative ink compositions 2-I to 2-L. Further, the images printed in ink compositions 2-A to 2-H were superior in light fastness and ozone resistance.

Further, super fine glossy paper (MJA4S3P, available from Seiko Epson) was printed on the same ink jet printer (PM-700C) by using ink compositions 2-A to 2-H. Evaluation of the resulting images for hue, light fastness, and ozone resistance gave satisfactory results similar to those shown in Table 2-6.

Containing a novel dye exhibiting excellent absorption characteristics for hue and color reproduction as one of three primaries and sufficient fastness against light, heat, humidity, and active gases in the environment, the coloring composition of the present invention is capable of providing color images or coloring materials excellent in hue and fastness. The coloring composition is particularly suited in the preparation of printing inks such as ink-jet ink and dye baths for textile.

The ink-jet ink composition comprising the coloring composition and the ink jet recording method using the ink-jet ink composition provide images with a satisfactory hue and resistance against light and active gases in the environment, particularly ozone gas.

Example 8

Synthesis of Compound 3-12

A mixture of 0.13 g (0.6 mmol) of 2-amino-4,5-dicyano-1-ethoxycarbonylmethylimidazole, 0.8 ml of acetic acid, and 1.2 ml of propionic acid was stirred at an inner temperature of 0° C. or lower, and 0.19 g (0.66 mmol) of 45% nitrosylsulfuric acid was added thereto. The mixture was stirred at that temperature for 30 minutes to form a diazonium salt.

In a separate flask, 0.26 g (0.5 mmol) of 2,6-bis(4-octylanilino)-3-cyano-4-methylpyridine, 0.8 g of sodium acetate, 4.5 ml of dimethylformamide (DMF), and 2 ml of ethyl acetate were stirred and cooled to an inner temperature of 0° C. or lower. The diazonium salt was put into the mixture. After the addition, the reaction mixture was further allowed to react at the same temperature for 1 hour. Thirty milliliters of a saturated aqueous solution of sodium chloride was added to the reaction mixture. The precipitate (including compound 3-5) thus formed was collected by filtration by suction. The crude crystals were purified by column chromatography (hexane-ethyl acetate) to give compound 3-12.

$\lambda_{max}$=510 nm (DMF solution) m/z (FAB-MS, positive ion mode)=755

Example 9

Synthesis of Compound 3-15

A mixture of 0.13 g (0.6 mmol) of 2-amino-4,5-dicyano-1-ethoxycarbonylmethylimidazole, 0.8 ml of acetic acid, and 1.2 ml of propionic acid was stirred at an inner temperature of 0° C. or lower, and 0.19 g (0.66 mmol) of 45% nitrosylsulfuric acid was added thereto. The mixture was stirred at that temperature for 30 minutes to form a diazonium salt.

In a separate flask, 0.25 g (0.5 mmol) of 2,6-bis(4-octylanilino)-4-methylpyridine, 0.8 g of sodium acetate, 4.5 ml of DMF, and 2 ml of ethyl acetate were stirred and cooled to an inner temperature of 0° C. or lower. The diazonium salt was put into the mixture, and the reaction mixture was allowed to react at the same temperature for 1 hour. Thirty milliliters of a saturated aqueous solution of sodium chloride was added to the reaction mixture. The precipitate thus formed was collected by filtration by suction. The crude crystals were purified by column chromatography (hexane-ethyl acetate) to yield compound 3-15.

$\lambda_{max}$=528 nm (DMF solution) m/z (FAB-MS, positive ion mode)=730

Example 10

Synthesis of Compound 3-35

A mixture of 0.16 g (0.6 mmol) of 5-amino-1-t-butoxycarbonylmethyl-3-phenyltriazole, 0.6 ml of acetic acid, and 0.9 ml of propionic acid was stirred at an inner temperature of 0° C. or lower, and 0.19 g (0.66 mmol) of 45% nitrosylsulfuric acid was added thereto. The mixture was stirred at that temperature for 30 minutes to form a diazonium salt.

In a separate flask, 0.26 g (0.5 mmol) of 2,6-bis(4-octylanilino)-3-cyano-4-methylpyridine, 0.8 g of sodium acetate, 4.5 ml of DMF, and 2 ml of ethyl acetate were stirred and cooled to an inner temperature of 0° C. or lower. The diazonium salt was put into the mixture, and the addition, the reaction mixture was further allowed to react at the same temperature for 1 hour. Thirty milliliters of a saturated aqueous solution of sodium chloride was added to the reaction mixture. The precipitate thus formed was collected by filtration by suction. Recrystallization from acetonitrile gave 0.15 g (37%) of compound 3-35.

$\lambda_{max}$=493 nm (DMF solution) m/z (FAB-MS, positive ion mode)=810

Example 11

Synthesis of Compound 3-37

A mixture of 0.16 g (0.6 mmol) of 5-amino-1-t-butoxycarbonylmethyl-3-phenyltriazole, 0.6 ml of acetic acid, and 0.9 ml of propionic acid was stirred at an inner temperature of 0° C. or lower, and 0.19 g (0.66 mmol) of 45% nitrosylsulfuric acid was added thereto. The mixture was stirred at that temperature for 30 minutes to form a diazonium salt.

In a separate flask, 0.25 g (0.5 mmol) of 2,6-bis(4-octylanilino)-3-carbamoyl-4-methylpyridine, 0.8 g of sodium acetate, 4.5 ml of DMF, and 2 ml of ethyl acetate were stirred and cooled to an inner temperature of 0° C. or lower. The diazonium salt was put into the mixture. After the addition, the reaction mixture was further allowed to react at the same temperature for 1 hour. Thirty milliliters of a saturated aqueous solution of sodium chloride was added to the reaction mixture, and the organic matter was extracted with ethyl acetate. The resulting crude crystals were purified by column chromatography (hexane-ethyl acetate) to yield compound 3-37.

$\lambda_{max}$=507 nm (DMF solution) m/z (FAB-MS, positive ion mode)=828

Example 12

Synthesis of Compound 3-38

A mixture of 0.16 g (0.6 mmol) of 5-amino-1-t-butoxycarbonylmethyl-3-phenyltriazole, 0.6 ml of acetic acid, and 0.9 ml of propionic acid was stirred at an inner temperature of 0° C. or lower, and 0.19 g (0.66 mmol) of 45% nitrosylsulfuric acid was added thereto. The mixture was stirred at that temperature for 30 minutes to form a diazonium salt.

In a separate flask, 0.27 g (0.5 mmol) of 2,6-bis(4-octylanilino)-4-methylpyridine, 0.8 g of sodium acetate, 4.5 ml of DMF, and 2 ml of ethyl acetate were stirred and cooled to an inner temperature of 0° C. or lower. The diazonium salt was put into the mixture. After the addition, the reaction mixture was further allowed to react at the same temperature for 1 hour. Thirty milliliters of a saturated aqueous solution of sodium chloride was added to the reaction mixture, and the organic matter was extracted with ethyl acetate. The resulting crude crystals were purified by column chromatography (hexane-ethyl acetate) to afford compound 3-38.

$\lambda_{max}$=511 nm (DMF solution) m/z (FAB-MS, positive ion mode)=785

Example 13

Preparation of Ink-jet Ink

The following components were mixed, heated at 30 to 40° C. for 1 hour while stirring, and filtered under pressure through a microfilter with an average pore size of 0.8 µm and a diameter of 47 mm to prepare ink composition 3-A.

Formulation of Ink Composition 3-A:

| | |
|---|---|
| Compound 3-21 | 5 parts |
| Diethylene glycol | 9 parts |
| Tetraethylene glycol monobutyl ether | 9 parts |
| Glycerol | 7 parts |
| Diethanolamine | 1 part |
| Water | 70 parts |

Ink compositions 3-B to 3-D were prepared in the same manner as for ink composition 3-A, except for replacing compound 3-21 with the azo compound shown in Table 3-5 below. Comparative ink compositions 3-E to 3-H were also prepared in the same manner but using the following comparative dyes (3-a) to (3-d)

Comparative dye (3-a):

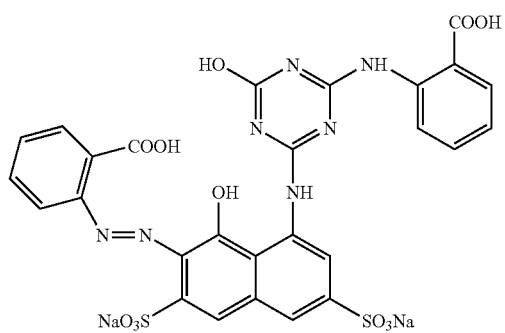

Comparative dye (3-b):

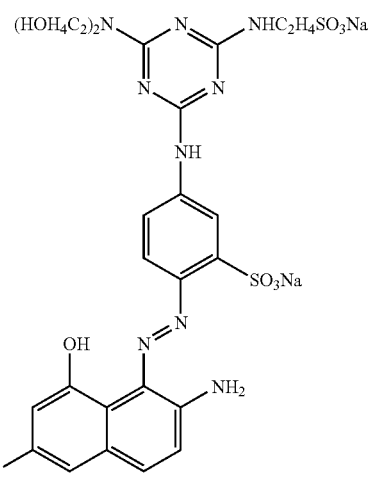

Comparative dye (3-c):

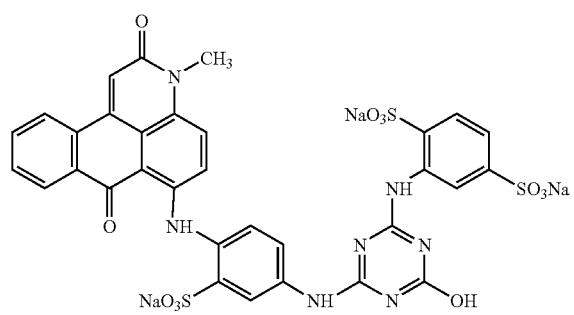

Comparative dye (3-d):

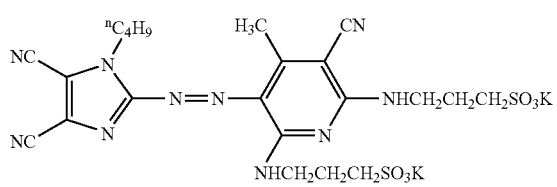

Image Recording and Evaluation

An image was recorded on photo glossy paper (Super Photo Grade, available from Fuji Photo Film Co., Ltd.) on an ink jet printer (PM-700C, available from Seiko Epson Corp.) by using each of ink compositions 3-A to 3-H. The resulting image was evaluated for light fastness and ozone resistance as follows. The results obtained are shown in Table 3-5.

1) Light Fastness

The image density immediately after recording (initial density: $C_i$) was measured with a reflection densitometer X-Rite 310TR. After the image was exposed to xenon light (85,000 lux) for 7 days in a weather-o-meter (Atlas Ci65, from Atlas Electric Devices Co.), the image density ($C_f$) was again measured at three points whose initial densities were 1, 1.5, and 2.0. A dye retention (%) was calculated from equation:

$$\text{Dye retention (\%)} = [(C_i - C_f)/C_i] \times 100$$

An image having a dye retention of 80% or higher at every measuring point was graded A. An image having a dye retention lower than 80% at one or two out of three points was graded B. An image having a dye retention lower than 80% at every point was graded C.

2) Ozone Resistance

The image immediately after recording was left to stand in a chamber having an ozone gas concentration of 0.5 ppm for 24 hours. A dye retention after exposure to ozone was obtained in the same manner as for evaluation of light fastness. The ozone concentration in the chamber was set with an ozone gas monitor (OZG-EM-01, available from Applics Co., Ltd.). An image having a dye retention of 70% or higher at every measuring point was graded A. An image having a dye retention lower than 70% at one or two out of three points was graded B. An image having a dye retention lower than 70% at every point was graded C.

TABLE 3-5

| Ink | Dye | Light Fastness | Ozone Resistance | Remark |
|---|---|---|---|---|
| 3-A | 3-21 | A | A | Invention |
| 3-B | 3-23 | A | A | " |
| 3-C | 3-44 | A | A | " |
| 3-D | 3-46 | A | A | " |
| 3-E | 3-a | C | C | Comparison |
| 3-F | 3-b | B | C | " |
| 3-G | 3-c | B | C | " |
| 3-H | 3-d | A–B | B | " |

As is seen from Table 3-5, the magenta images printed in ink compositions 3-A to 3-D are superior to those printed in ink compositions 3-E to 3-H in light fastness and ozone resistance. In addition, the dyes according to the invention have absorption spectra with a steep slope on the shorter and the longer wavelength sides, exhibiting excellent color reproducibility, as compared with the comparative dyes.

Further, super fine glossy paper (MJA4S3P, available from Seiko Epson) was printed on the same inkjet printer (PM-700C) by using ink compositions 3-A to 3-D. Evaluation of the resulting images for light fastness and ozone resistance gave satisfactory results similar to those shown in Table 3-5.

Example 14

Preparation of in Sample 3-101 (Emulsion Ink)

Azo compound 3-12 (oil-soluble dye) (5.63 g) and 7.04 g of sodium dioctylsulfosuccinate were dissolved in a mixture of 4.22 g of high-boiling organic solvent 3-S-2 (shown below), 5.63 g of high-boiling organic solvent 3-S-11

(shown below), and 50 ml of ethyl acetate at 70° C. To the solution was added 500 ml of deionized water while stirring with a magnetic stirrer to prepare an oil-in-water coarse dispersion, which was passed through Microfluidizer (available from Microfluidics Inc.) under a pressure of 600 bar five times. The solvent was removed from the resulting emulsion on a rotary evaporator until no smell of ethyl acetate was felt. The resulting fine emulsion of the hydrophobic dye was mixed with 140 g of diethylene glycol, 50 g of glycerol, 7 g of Surfynol 465 (available from Air Products & Chemicals, Inc.), and 900 ml of deionized water to prepare ink sample 3-101.

Preparation of Ink Samples 3-102 to 3-105

Ink samples 3-102 to 3-105 were prepared in the same manner as for ink sample 3-101, except for replacing the oil-soluble compound 3-12 with the oil-soluble compound shown in Table 3-6 below. Comparative ink samples 3-106 to 3-107 were prepared in the same manner, except for using the following comparative dyes (3-e) and (3-f).

Comparative dye (3-e):

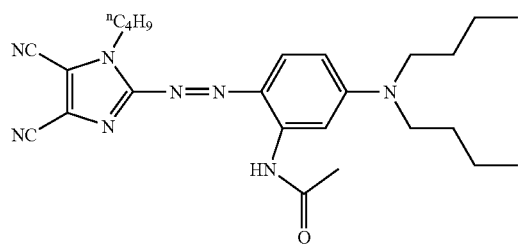

Comparative dye (3-f):

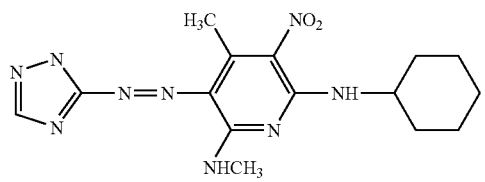

3-S-2:

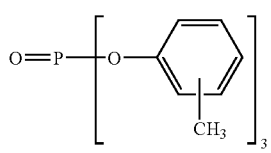

3-S-11:

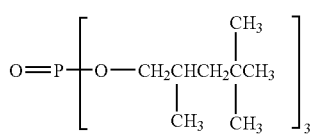

Image Recording and Evaluation

An image was recorded on photo glossy paper (Ink Jet Paper Photo Grade, available from Fuji Photo Film) on an ink jet printer (PM-700 from Seiko Epson) by using each of ink samples 3-101 to 3-107. The recorded images were evaluated for paper independence, water resistance, light fastness, and ozone resistance according to the following methods. The results obtained are shown in Table 3-6.

1) Paper Independence

The hue of the image formed on the photo glossy paper and that of an image separately formed on paper for plain paper copiers (PPCs) were compared. A small difference between the two, which indicates small paper dependence, was graded A (satisfactory), and a large difference was graded B (poor).

2) Water Resistance

The photo glossy paper having an image formed thereon was dried at room temperature for 1 hour, then soaked in water for 30 seconds, and dried spontaneously at room temperature. Feathering of the ink image was observed, and water resistance of the ink was graded A (no feathering), B (slight feathering) or C (considerable feathering).

3) Light Fastness

The image formed on the photo glossy paper was exposed to xenon light (85,000 lux) for 3 days in a weather-o-meter (Ci65 from Atlas). A dye retention was obtained in the same manner as in Example 8. An image having a dye retention of 70% or higher at every measuring point was graded A. An image having a dye retention lower than 70% at one or two out of three points was graded B. An image having a dye retention lower than 70% at every point was graded C.

4) Ozone Resistance

The same test method and grading system as used in Example 13 (water-based ink) were followed.

TABLE 3-6

| Sample | Dye | Paper Independence | Water Resistance | Light Fastness | Ozone Resistance |
|---|---|---|---|---|---|
| 3-101 | 3-12 | A | A | A | A |
| 3-102 | 3-17 | A | A | A | A |
| 3-103 | 3-36 | A | A | A | A |
| 3-104 | 3-43 | A | A | A | A |
| 3-105 | 3-45 | A | A | A | A |
| 3-106 | 3-e | B | B | B | C |
| 3-107 | 3-f | B | B | B | B |

As is apparent from the results in Table 3-6, the ink-jet ink compositions according to the present invention are excellent in paper independence, water resistance, Light fastness, and ozone gas resistance. Further, the dyes according to the invention have absorption spectra with a steep slope on the shorter and the longer wavelength sides, exhibiting excellent color reproducibility, as compared with the comparative dyes.

Example 15

Ink jet printing was carried out on photo glossy paper GP-301 (available from Canon Inc.) with an ink jet printer BJ-F850 (from Canon Inc.) loaded with an ink cartridge filled with each of the ink compositions prepared in Example 14, and the printed images were evaluated in the same manner as in Example 13. The results of evaluation of the images were equal to those obtained in Example 13.

The novel dye compound of the present invention exhibits excellent absorption characteristics. The image forming materials containing the compound of the invention have sufficient fastness against light, heat, humidity, and oxidizing gases in the environment.

Example 16

Synthesis of Compound 4-5

A mixture of 0.1 g (0.6 mmol) of 5-amino-2-ethylthio-1, 3,4-thiadiazole, 0.4 ml of acetic acid, and 0.6 ml of propionic acid was stirred at an inner temperature of 0° C. or lower, and 0.19 g (0.66 mmol) of 45% nitrosylsulfuric acid was added thereto. The mixture was stirred at that temperature for 30 minutes to form a diazonium salt.

In a separate flask, 0.26 g (0.5 mmol) of 2,6-bis(4'-octylanilino)-3-cyano-4-methylpyridine, 0.8 g of sodium acetate, 4.5 ml of dimethylformamide (DMF), and 2 ml of ethyl acetate were stirred and cooled to an inner temperature of 0° C. or lower. The diazonium salt was put into the mixture. After the addition, the reaction mixture was allowed to react at the same temperature for 1 hour. Thirty milliliters of a saturated aqueous solution of sodium chloride was added to the reaction mixture. The precipitate thus formed was collected by filtration by suction. The crude crystals were recrystallized from acetonitrile to give 0.2 g (57%) of compound 4-5.

$\lambda_{max}$=517 nm (DMF solution) $\epsilon$=41300 m/z (FAB-MS, positive ion mode)=697

Example 17

Synthesis of Compound 4-8

A mixture of 0.084 g (0.6 mmol) of 5-amino-4-cyano-3-methylisothiazole, 0.4 ml of acetic acid, and 0.6 ml of propionic acid was stirred at an inner temperature of 0° C. or lower, and 0.19 g (0.66 mmol) of 45% nitrosylsulfuric acid was added thereto. The mixture was stirred at that temperature for 30 minutes to form a diazonium salt.

In a separate flask, 0.27 g (0.5 mmol) of 2,6-bis(4-octylanilino)-3-carbamoyl-4-methylpyridine, 0.8 g of sodium acetate, 4.5 ml of DMF, and 2 ml of ethyl acetate were stirred and cooled to an inner temperature of 0° C. or lower. The diazonium salt was put into the mixture, and the reaction mixture was allowed to react at the same temperature for 1 hour. Thirty milliliters of a saturated aqueous solution of sodium chloride was added to the reaction mixture. The precipitate thus formed was collected by filtration by suction. The crude crystals were recrystallized from methanol to give 0.19 g (55%) of compound 4-8.

$\lambda_{max}$=563 nm (DMF solution) $\epsilon$=47700 m/z (FAB-MS, positive ion mode)=693

Example 18

Synthesis of Compound 4-13

A mixture of 0.44 g (2.1 mmol) of 2-amino-5-carboethoxy-3-cyano-4-methylthiophene, 2.8 ml of acetic acid, and 4.2 ml of propionic acid was stirred at an inner temperature of 0° C. or lower, and 0.64 g (2.3 mmol) of 45% nitrosylsulfuric acid was added thereto, followed by stirring at the same temperature for 30 minutes to form a diazonium salt.

In a separate flask, 1 g (2 mmol) of 2,6-bis(4-octylanilino)-4-methylpyridine, 4 ml of N,N-dimethylacetamide, and 2 ml of picoline were stirred and cooled to an inner temperature of 0° C. or lower. The diazonium salt was put into the mixture, and the system was allowed to react at the same temperature for 1 hour. A saturated aqueous solution of sodium chloride was added to the reaction mixture, and the precipitate thus formed was collected by filtration by suction. Recrystallization from acetonitrile gave 1.4 g (97%) of compound 4-13.

$\lambda_{max}$=592 nm (DMF solution) $\epsilon$=40000 m/z (FAB-MS, positive ion mode)=722

Example 19

Synthesis of Compound 4-14

A mixture of 0.25 g (1.8 mmol) of 5-amino-4-cyano-3-methylisothiazole, 1.2 ml of acetic acid, and 1.8 ml of propionic acid was stirred at an inner temperature of 0° C. or lower, and 0.6 g (1.98 mmol) of 45% nitrosylsulfuric acid was added thereto. The mixture was stirred at that temperature for 30 minutes to form a diazonium salt.

In a separate flask, 0.54 g (1.5 mmol) of 2,6-bis(2',4',6'-trimethylanilino)-3-cyano-4-methylpyridine, 2.4 g of sodium acetate, 13.5 ml of DMF, and 6 ml of ethyl acetate were stirred and cooled to an inner temperature of 0° C. or lower. The diazonium salt was put into the mixture. After the addition, the reaction mixture was further allowed to react at the same temperature for 2 hours. Thirty milliliters of a saturated aqueous solution of sodium chloride was added to the reaction mixture, and the precipitate thus formed was collected by suction filtration. The resulting crude crystals were purified by silica gel column chromatography (hexane-ethyl acetate) to yield 0.05 g (55%) of compound 4-14.

$\lambda_{max}$=529 nm (DMF solution) m/z (FAB-MS, negative ion mode)=509

Example 20

Preparation of Ink-jet Ink Composition

The following components were mixed, heated at 30 to 40° C. for 1 hour while stirring, and filtered under pressure through a microfilter with an average pore size of 0.8 μm and a diameter of 47 mm to prepare ink composition 4-A.

Formulation of Ink Composition 4-A:

| | |
|---|---|
| Compound 4-2 | 5 parts |
| Diethylene glycol | 9 parts |
| Tetraethylene glycol monobutyl ether | 9 parts |
| Glycerol | 7 parts |
| Diethanolamine | 1 part |
| Water | 70 parts |

Ink compositions 4-B to 4-D were prepared in the same manner as for ink composition 4-A, except for replacing compound 4-2 with the azo compound shown in Table 4-6 below. Comparative ink compositions 4-E to 4-H were also prepared in the same manner but using the following comparative dyes (4-a) to (4-d)

Comparative dye (4-a):

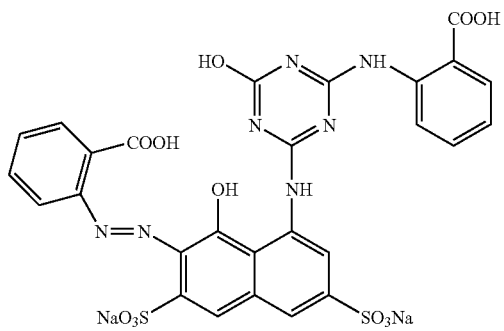

-continued

Comparative dye (4-b):

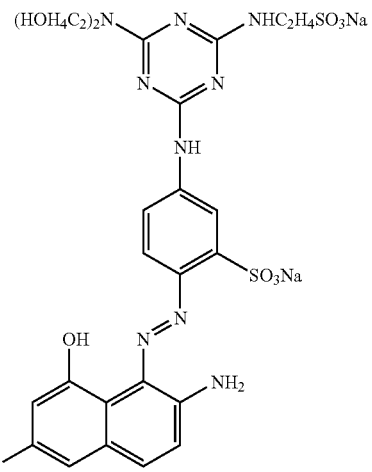

Comparative dye (4-c):

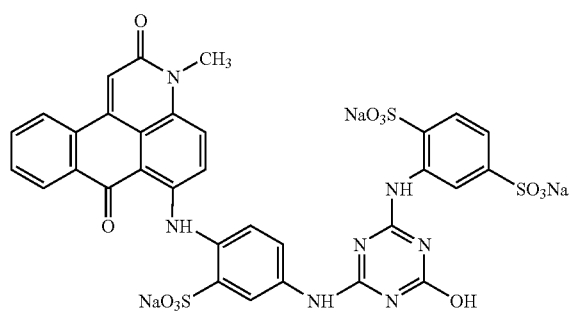

Comparative dye (4-d)(disclosed in EP1066341):

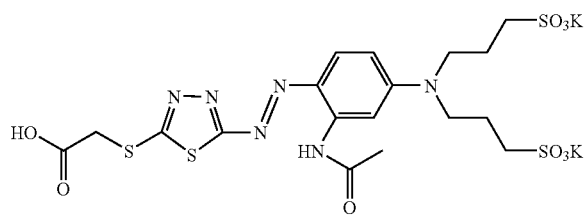

Image Recording and Evaluation

An image was recorded on photo glossy paper (Super Photo Grade, available from Fuji Photo Film Co., Ltd.) on an ink jet printer (PM-700C, available from Seiko Epson Corp.) by using each of ink compositions 4-A to 4-H. The resulting image was evaluated for hue, light fastness, and ozone resistance as follows. The results obtained are shown in Table 4-6.

1) Hue

The hue was observed with the naked eye and graded on an A-to-C scale. A means "excellent", B "good", and C "poor".

2) Light Fastness

The image density immediately after recording (initial density: $C_i$) was measured with a reflection densitometer X-Rite 310TR. After the image was exposed to xenon light (85,000 lux) for 7 days in a weather-o-meter (Atlas Ci65, from Atlas Electric Devices Co.), the image density ($C_f$) was again measured at three points whose initial densities were 1, 1.5, and 2.0. A dye retention (%) was calculated from equation:

Dye retention (%)=[($C_i$–$C_f$)/$C_i$]×100

An image having a dye retention of 80% or higher at every measuring point was graded A. An image having a dye retention lower than 80% at one or two out of three points was graded B. An image having a dye retention lower than 80% at every point was graded C.

3) Ozone Resistance

The image immediately after recording was left to stand in a chamber having an ozone gas concentration of 0.5 ppm for 24 hours. A dye retention after exposure to ozone was obtained in the same manner as for evaluation of light fastness. The ozone concentration in the chamber was set with an ozone gas monitor (OZG-EM-01, available from Applics Co., Ltd.). An image having a dye retention of 70% or higher at every measuring point was graded A. An image having a dye retention lower than 70% at one or two out of three points was graded B. An image having a dye retention lower than 70% at every point was graded C.

TABLE 4-6

| Ink | Dye | Hue | Light Fastness | Ozone Resistance | Remark |
| --- | --- | --- | --- | --- | --- |
| 4-A | 4-2 | A | A | A | Invention |
| 4-B | 4-3 | A | A | A | " |
| 4-C | 4-10 | A | A | A | " |
| 4-D | 4-18 | A | A | A | " |
| 4-E | 4-a | A–B | C | C | Comparison |
| 4-F | 4-b | B–C | B | C | Comparison |
| 4-G | 4-c | B | B | B | " |
| 4-H | 4-d | A–B | B | C | " |

As is seen from Table 4-6, the magenta images printed in ink compositions 4-A to 4-D are superior to those printed in ink compositions 4-E to 4-H in hue, light fastness, and ozone resistance.

Further, super fine glossy paper (MJA4S3P, available from Seiko Epson) was printed on the same ink jet printer (PM-700C) by using ink compositions 4-A to 4-D. The resulting images were evaluated for hue and light fastness in the same manner as in Example 20. The results obtained are equal to those shown in Table 4-6.

Example 21

Preparation of Emulsion Inks (Sample 4-101)

Azo compound 4-5 (oil-soluble dye) (5.63 g) and 7.04 g of sodium dioctylsulfosuccinate were dissolved in a mixture of 4.22 g of high-boiling organic solvent 4-S-2 (shown below), 5.63 g of high-boiling organic solvent 4-S-11 (shown below), and 50 ml of ethyl acetate at 70° C. To the solution was added 500 ml of deionized water while stirring with a magnetic stirrer to prepare an oil-in-water coarse dispersion, which was passed through Microfluidizer (available from Microfluidics Inc.) under a pressure of 600 bar five times. The solvent was removed from the resulting emulsion on a rotary evaporator until no smell of ethyl acetate was felt. The resulting fine emulsion of the hydrophobic dye was mixed with 140 g of diethylene glycol, 50 g of glycerol, 7 g of Surfynol 465 (available from Air Products & Chemicals, Inc.), and 900 ml of deionized water to prepare ink sample 4-101.

Preparation of Ink Samples 4-102 to 4-105

Ink samples 4-102 to 4-105 were prepared in the same manner as for ink sample 4-101, except for replacing compound 4-5 with the compound shown in Table 4-7 below. Comparative ink samples 4-106 to 4-107 were prepared in the same manner, except for using the following comparative dyes (4-e) and (4-f).

Comparative dye (4-e):

Comparative dye (4-f):

4-S-2:

4-S-11:

Image Recording and Evaluation

An image was recorded on photo glossy paper (Ink Jet Paper Photo Grade, available from Fuji Photo Film) on an ink jet printer (PM-700 from Seiko Epson) by using each of ink samples 4-101 to 4-107. The recorded images were evaluated for hue, paper independence, water resistance, light fastness, and ozone resistance according to the following methods. The results obtained are shown in Table 4-7.

1) Hue

A reflection spectrum of the image was measured in a region of 390 to 730 nm at a 10 nm wavelength interval, and $a^*$ and $b^*$ values were calculated based on the CIE 1976 $L^*a^*b^*$ color space system. A preferred magenta tone was defined as follows, and the hue of the image was graded on an A-to-C scale according to the following standard.

Preferred $a^*$ value: 76 or greater

Preferred $b^*$ value: −30 to 0

A: Both $a^*$ and $b^*$ values are within the respective preferred ranges.

B: One of $a^*$ and $b^*$ values is within its preferred range.

C: Both $a^*$ and $b^*$ values are out of the respective preferred ranges.

2) Paper Independence

The hue of the image formed on the photo glossy paper and that of an image separately formed on paper for plain paper copiers (PPCs) were compared. A small difference between the two, which indicates small paper dependence, was graded A (satisfactory), and a large difference was graded B (poor).

3) Water Resistance

The photo glossy paper having an image formed thereon was dried at room temperature for 1 hour, then soaked in water for 30 seconds, and dried spontaneously at room temperature. Feathering of the ink image was observed, and water resistance of the ink was graded A (no feathering), B (slight feathering) or C (considerable feathering).

4) Light Fastness

The image formed on the photo glossy paper was exposed to xenon light (85,000 lux) for 3 days in a weather-o-meter (Ci65 from Atlas). A dye retention on three points (initial reflection density: 1, 1.5 or 2.0) was obtained in the same manner as in Example 20. An image having a dye retention of 70% or higher at every measuring point was graded A. An image having a dye retention lower than 70% at one or two out of three points was graded B. An image having a dye retention lower than 70% at every point was graded C.

5) Ozone Resistance

The same test method and grading system as used in Example 20 (water-based ink) were followed.

TABLE 4-7

| Sample | Dye | Hue | Paper Independence | Water Resistance | Light Fastness | Ozone Resistance |
|---|---|---|---|---|---|---|
| 4-101 | 4-5 | A | A | A | A | A |
| 4-102 | 4-6 | A | A | A | A | A |
| 4-103 | 4-8 | A | A | A | A | A |
| 4-104 | 4-13 | A | A | A | A | A |
| 4-105 | 4-17 | A | A | A | A | A |
| 4-106 | 4-e | B | B | B | B | C |
| 4-107 | 4-f | C | C | B | B | C |

As is apparent from the results in Table 4-7, the ink-jet ink compositions according to the present invention are excellent in hue, paper independence, water resistance, light fastness, and ozone gas resistance.

Example 22

Ink jet printing was carried out on photo glossy paper GP-301 (available from Canon Inc.) with an ink jet printer BJ-F850 (from Canon Inc.) loaded with an ink cartridge filled with each of the ink compositions prepared in Example 21, and the printed images were evaluated in the same manner as in Example 20. The results of evaluation were equal to those obtained in Example 20.

The novel dye compound of the present invention exhibit excellent absorption characteristics for hue and color reproduction as one of three primaries. The image forming materials containing the compound of the invention have sufficient fastness against light, heat, humidity, and oxidizing gases in the environment.

Example 23

Preparation of Water-based Ink

The following components were mixed, heated at 30 to 40° C. for 1 hour while stirring, and filtered under pressure through a microfilter with an average pore size of 0.8 μm and a diameter of 47 mm to prepare ink composition 5-A.

Formulation of Ink Composition 5-A:

| Compound 5-137 (dye) | 4 parts |
| Diethylene glycol | 9 parts |
| Tetraethylene glycol monobutyl ether | 9 parts |
| Glycerol | 7 parts |
| Diethanolamine | 1 part |
| Water | 70 parts |

Ink compositions 5-B to 5-H were prepared in the same manner as for ink composition 5-A, except for replacing compound 5-137 with the azo compound shown in Table 5-6 below.

Image Recording and Evaluation

An image was recorded on photo glossy paper (Super Photo Grade, available from Fuji Photo Film Co., Ltd.) on an ink jet printer (PM-700C, available from Seiko Epson Corp.) by using each of ink compositions 5-A to 5-H. The resulting image was evaluated for hue, light fastness, ozone resistance, and water resistance as follows. The results obtained are shown in Table 5-6.

1) Hue

The hue was observed with the naked eye and graded on an A-to-C scale. A means "excellent", B "good", and C "poor".

2) Light Fastness

The image density immediately after recording (initial density: $C_i$) was measured with a reflection densitometer X-Rite 310TR. After the image was exposed to xenon light (85,000 lux) for 10 days in a weather-o-meter (Atlas Ci65, from Atlas Electric Devices Co.), the image density ($C_f$) was again measured at three points whose initial densities were 1, 1.5, and 2.0. A dye retention (%) was calculated from equation:

Dye retention (%)=$[(C_i-C_f)/C_i] \times 100$

An image having a dye retention of 80% or higher at every measuring point was graded A. An image having a dye retention lower than 80% at one or two out of three points was graded B. An image having a dye retention lower than 80% at every point was graded C.

3) Ozone Resistance

The image immediately after recording was left to stand in a chamber having an ozone gas concentration of 0.5 ppm for 7 days. A dye retention (%) after exposure to ozone was obtained in the same manner as for evaluation of light fastness. The measurement was made on three points whose initial density ($C_i$) was 1, 1.5 or 2.0. The ozone concentration in the chamber was set with an ozone gas monitor (OZG-EM-01, available from Applics Co., Ltd.). An image having a dye retention of 70% or higher at every measuring point was graded A. An image having a dye retention lower than 70% at one or two out of three points was graded B. An image having a dye retention lower than 70% at every point was graded C.

4) Water Resistance

The photo glossy paper having an image formed thereon was dried at room temperature for 1 hour, then soaked in water at 20° C. for 10 minutes and dried spontaneously. The image density was measured with a reflection densitometer X-Rite 310TR before and after the immersion treatment at three density points ($C_i$=1, 1.5 or 2.0). A dye retention after immersion was obtained in the same manner as for evaluation of light fastness. Measurement was made at 20 points for each $C_i$ to obtain an average for each $C_i$, and an average dye retention for the three initial densities was calculated. An image having an average dye retention of 80% or higher was graded A. An image having a dye retention of 70% or more and less than 80% was graded B. An image having a dye retention lower than 70% for every initial density was graded C.

The oxidation potential of the dye compounds tested was measured with DC Polarographic Analyzer P-100 using an N,N-dimethylformamide solution containing 0.1 mol·dm$^{-3}$ of tetrapropylammonium perchlorate as a supporting electrolyte and $1 \times 10^{-3}$ mol·dm$^{-3}$ of a dye compound and a graphite electrode as a working electrode. The results obtained are also shown in Table 5-6.

TABLE 5-6

| Ink | Dye | Hue | Light Fastness | Ozone Resistance | Oxidation Potential | Remark |
|---|---|---|---|---|---|---|
| 5-A | 5-137 | A | A | A–B | +1.44 | Invention |
| 5-B | 5-143 | A | A | A | +1.40 | " |
| 5-C | 5-145 | A | A | A | +1.36 | " |
| 5-D | 5-148 | A | A | A | +1.46 | " |
| 5-E | 5-107 | A | A | A–B | *1.25 | " |
| 5-F | 5-a | A | A | B | +1.33 | Comparison |
| 5-G | 5-b | A–B | C | C | +0.65 | " |
| 5-H | 5-c | B–C | B | C | +0.70 | " |

Comparative dye 5-a:

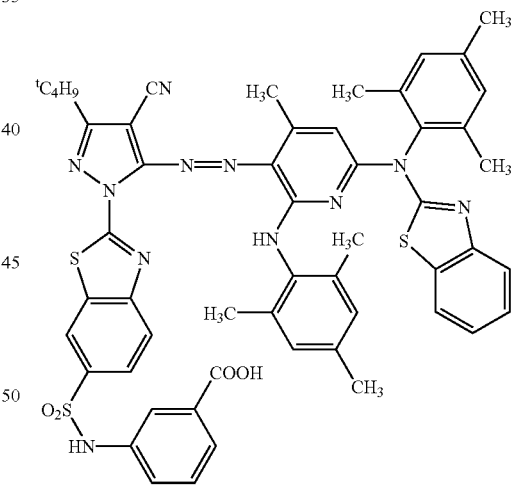

Comparative dye 5-b:

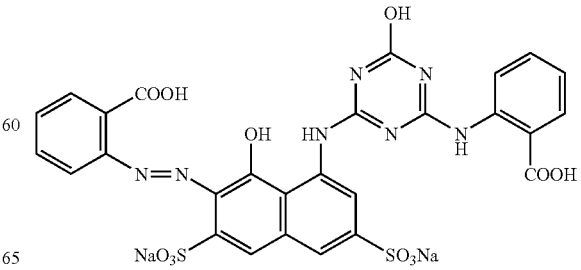

TABLE 5-6-continued

| Ink | Dye | Hue | Light Fastness | Ozone Resistance | Oxidation Potential | Remark |
|---|---|---|---|---|---|---|

Comparative dye 5-c:

[Chemical structure of comparative dye 5-c showing a triazine with N(C₂H₄OH)₂, HN, NHC₂H₄SO₃Na substituents connected via phenyl-azo to a naphthalene ring bearing OH, NH₂, and SO₃Na groups]

As shown in Table 5-6, the magenta images printed in ink compositions 5-A to 5-F are clearer and more excellent in light fastness and ozone resistance than those printed in ink compositions 5-G and 5-H. The images printed in ink compositions 5-A to 5-F are superior to the images printed with ink compositions 5-G and 5-H in light fastness and ozone resistance.

The images printed in ink compositions 5-A to 5-E according to the invention were superior to the image printed in ink composition 5-F in terms of ozone resistance, proving the preference of the specific azo compound of the invention which contains at least two substituents having a pKa value of −10 to 5. The image obtained with ink composition 5-E is slightly inferior in ozone resistance to the images obtained with ink compositions 5-A to 5-D, proving the preference of the azo compounds having at least one substituent having a pKa value of −10 to 5 on each side of the azo group. The comparison between the images obtained with ink compositions 5-B to 5-D and those obtained with ink compositions 5-A and 5-E in terms of ozone gas resistance reveals the preference of having three or more substituents whose pKa value is −10 to 5.

Comparing ink compositions 5-A to 5-F in terms of water resistance and ozone resistance, it is seen that images with higher water resistance exhibit higher ozone resistance, proving that ozone resistance is improved where the dye compound is firmly fixed to a desired position on the medium through a mordanting action.

Further, super fine glossy paper (MJA4S3P, available from Seiko Epson) was printed on the same ink jet printer (PM-700C) by using ink compositions 5-A to 5-H. Evaluation of the resulting images for hue, light fastness, ozone resistance, and water resistance gave the same results as in Table 5-6.

The present invention provides various coloring compositions, such as an ink-jet ink composition, which provide a color image or a coloring material excellent in hue, water resistance, and fastness by using a novel azo compound having excellent absorption characteristics for color reproduction as one of three primaries, excellent water resistance, and sufficient fastness against light, heat, humidity, and active gases in the environment. The present invention provides an ink-jet ink composition and an ink jet recording method capable of forming an image with a satisfactory hue, excellent water resistance, and high fastness to light and active gases in the environment, especially ozone gas. The present invention also provides a method of improving ozone resistance of a color image in ink jet recording.

Example 24

Preparation of Water-based Ink

The following components were mixed, heated at 30 to 40° C. for 1 hour while stirring, and filtered under pressure through a microfilter with an average pore size of 0.8 μm and a diameter of 47 mm to prepare ink composition 6-A.

Formulation of Ink Composition 6-A:

| | |
|---|---|
| Compound 6-(38) | 4 parts |
| Diethylene glycol | 9 parts |
| Tetraethylene glycol monobutyl ether | 9 parts |
| Glycerol | 7 parts |
| Diethanolamine | 1 part |
| Water | 70 parts |

Ink compositions 6-B to 6-F were prepared in the same manner as for ink composition 6-A, except for replacing compound 6-(38) with the azo compound shown in Table 6-1 below.

Image Recording and Evaluation

An image was recorded on photo glossy paper (Super Photo Grade, available from Fuji Photo Film Co., Ltd.) on an ink jet printer (PM-700C, available from Seiko Epson Corp.) by using each of ink compositions 6-A to 6-F. The resulting image was evaluated for hue, light fastness, and ozone resistance as follows. The results obtained are shown in Table 6-1.

1) Hue

The hue was observed with the naked eye and graded on an A-to-C scale. A means "excellent", B "good", and C "poor".

2) Light Fastness

The image density immediately after recording (initial density: $C_i$) was measured with a reflection densitometer X-Rite 310TR. After the image was exposed to xenon light (85,000 lux) for 7 days in a weather-o-meter (Atlas Ci65, from Atlas Electric Devices Co.), the image density ($C_f$) was again measured at three points whose initial densities were 1, 1.5, and 2.0. A dye retention (%) was calculated from equation:

$$\text{Dye retention (\%)} = [(C_i - C_f)/C_i] \times 100$$

An image having a dye retention of 80% or higher at every measuring point was graded A. An image having a dye retention lower than 80% at one or two out of three points was graded B. An image having a dye retention lower than 80% at every point was graded C.

3) Ozone Resistance

The image immediately after recording was left to stand in a chamber having an ozone gas concentration of 0.5 ppm for 24 hours. A dye retention after exposure to ozone was obtained in the same manner as for evaluation of light fastness on measuring points whose initial density was 1, 1.5 or 2.0. The ozone concentration in the chamber was set with an ozone gas monitor (OZG-EM-01, available from Applics Co., Ltd.). An image having a dye retention of 70% or higher at every measuring point was graded A. An image having a dye retention lower than 70% at one or two out of three points was graded B. An image having a dye retention lower than 70% at every point was graded C.

The oxidation potential, the maximum absorption wavelength, and the half-value width of the absorption spectrum of the dyes were measured as follows. The results obtained are also shown in Table 6-1.

4) Oxidation Potential ($E_{ox}$)

Oxidation potential measurement was made with Polarographic Analyzer P-100 using a DMF solution containing 0.1 mol·dm$^{-3}$ of tetrapropylammonium perchlorate as a supporting electrolyte and 1×10$^{-3}$ mol·dm$^{-3}$ of a dye compound and a graphite electrode as a working electrode and an SCE as a reference electrode.

5) Maximum Absorption Wavelength and Half-value Width

A solution of the dye compound in DMF at a concentration of about 5×10$^{-5}$ mol·dm$^{-3}$ was prepared. An absorption spectrum was measured in a wavelength range of 200 nm to 900 nm with a spectrophotometer UV-VIS Recording Spectrophotometer UV-260 (supplied by Shimadzu Corp.) by using quartz cells having an optical path length of 1 cm.

TABLE 6-1

| Ink | Dye | Hue | Light Fastness | Ozone Resistance | $E_{ox}$ (vs SCE) | $\lambda_{max}$ (nm) | Half-value Width (nm) | Remark |
|---|---|---|---|---|---|---|---|---|
| 6-A | 6-(38) | A | A | A | +1.36 | 557 | 73 | Invention |
| 6-B | 6-(20) | A | A | A | +1.15 | 538 | 86 | " |
| 6-C | 6-(11) | B | A | A | +1.12 | 541 | 97 | " |
| 6-D | 6-(39) | A | A | A | +1.37 | 560 | 76 | " |
| 6-E | 6-a | B | C | C | +0.65 | 549 | 86 | Comparison |
| 6-F | 6-b | B | B | C | +0.70 | 528 | 96 | " |

Comparative dye (6-a):

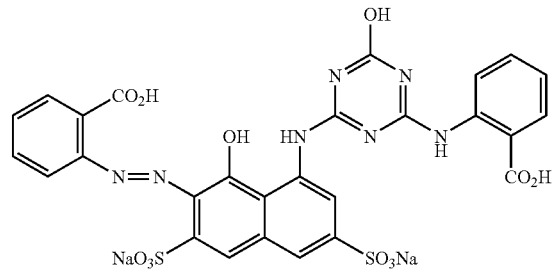

Comparative dye (6-b):

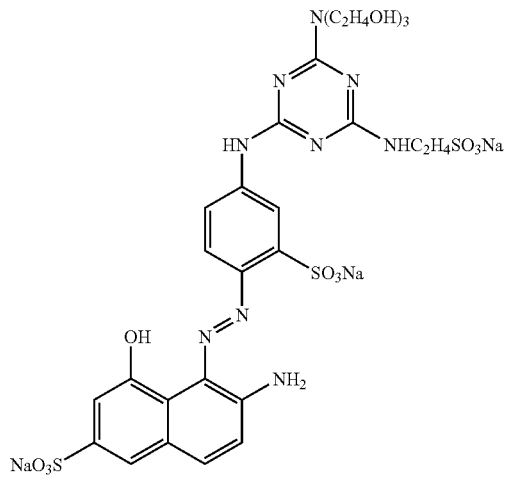

As is seen from Table 6-1, ink compositions 6-A to 6-D containing a compound whose oxidation potential is nobler than 1.0 V (vs. SCE) and whose maximum absorption wavelength is between 500 nm and 580 nm with a half-value width of 150 nm or smaller provide magenta images superior in hue, light fastness, and ozone resistance to the images printed in ink composition 6-E or 6-F.

Further, super fine glossy paper (MJA4S3P, available from Seiko Epson) was printed on the same ink jet printer (PM-700C) by using ink compositions 6-A to 6-D. Evaluation of the resulting images for hue, light fastness, and ozone resistance gave satisfactory results similar to those shown in Table 6-1.

Example 25

Preparation of Ink Sample 6-201

Azo compound 6-(33) (oil-soluble dye) (5.63 g) and 7.04 g of sodium dioctylsulfosuccinate were dissolved in a mixture of 4.22 g of high-boiling organic solvent 6-S-2 (shown below), 5.63 g of high-boiling organic solvent 6-S-11 (shown below), and 50 ml of ethyl acetate at 70° C. To the solution was added 500 ml of deionized water while stirring with a magnetic stirrer to prepare an oil-in-water coarse dispersion, which was passed through Microfluidizer (available from Microfluidics Inc.) under a pressure of 600 bar five times. The solvent was removed from the resulting emulsion on a rotary evaporator until no smell of ethyl acetate was felt. The resulting fine emulsion of the hydrophobic dye was mixed with 140 g of diethylene glycol, 50 g of glycerol, 7 g of Surfynol 465 (available from Air Products & Chemicals, Inc.), and 900 ml of deionized water to prepare ink sample 6-101.

6-S-2:

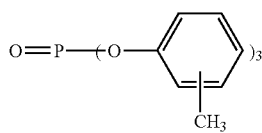

6-S-11:

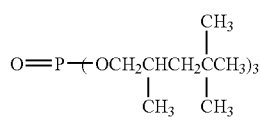

Preparation of Ink Samples 6-202 to 6-208

Ink samples 6-202 to 6-208 were prepared in the same manner as for ink sample 6-201, except for replacing the oil-soluble compound 6-(33) with the oil-soluble compound shown in Table 6-2 below.

Image Recording and Evaluation

An image was recorded on photo glossy paper (Ink Jet Paper Photo Grade, available from Fuji Photo Film) on an ink jet printer (PM-700 from Seiko Epson) by using each of ink samples 6-201 to 6-208. The recorded images were evaluated for hue, paper independence, water resistance, light fastness, and ozone resistance according to the following methods. The results obtained are shown in Table 6-2.

1) Hue

A reflection spectrum of the image was measured in a region of 390 to 730 nm at a 10 nm wavelength interval, and a* and b* values were calculated based on the CIE 1976 L*a*b* color space system. A preferred magenta tone was defined as follows, and the hue of the image was graded on an A-to-C scale according to the following standard.

Preferred a* value: 76 or greater
Preferred b* value: −30 to 0

A: Both a* and b* values are within the respective preferred ranges.
B: One of a* and b* values is within its preferred range.
C: Both a* and b* values are out of the respective preferred ranges.

2) Paper Independence

The hue of the image formed on the photo glossy paper and that of an image separately formed on paper for plain paper copiers (PPCs) were compared. A small difference between the two, which indicates small paper dependence, was graded A (satisfactory), and a large difference was graded B (poor).

3) Water Resistance

The photo glossy paper having an image formed thereon was dried at room temperature for 1 hour, then soaked in water for 30 seconds, and dried spontaneously at room temperature. Feathering of the ink image was observed, and water resistance of the ink was graded A (no feathering), B (slight feathering) or C (considerable feathering).

4) Light Fastness

The image formed on the photo glossy paper was exposed to xenon light (85,000 lux) for 3 days in a weather-o-meter (Ci65 from Atlas). A dye retention was obtained in the same manner as in Example 24. An image having a dye retention of 70% or higher at every measuring point was graded A. An image having a dye retention lower than 70% at one or two out of three points was graded B. An image having a dye retention lower than 70% at every point was graded C.

4) Ozone Resistance

The same test method and grading system as used in Example 24 were followed.

The oxidation potential and the $\lambda_{max}$ and the half-value width of absorption spectrum of the dye compounds used were measured in the same manner as in Example 24. The results are also shown in Table 6-2.

TABLE 6-2

| Ink | Dye | Hue | Paper Independence | Water Resistance | Light Fastness | Ozone Resistance | $E_{ox}$ (vs. SCE) | $\lambda_{max}$ (nm) | Half-value Width (nm) |
|---|---|---|---|---|---|---|---|---|---|
| 6-201 | 6-(33) | A | A | A | A | A | +1.47 | 565 | 81 |
| 6-202 | 6-(34) | A | A | A | A | A | +1.38 | 558 | 77 |
| 6-203 | 6-(35) | A | A | A | A | A | +1.42 | 562 | 81 |
| 6-204 | 6-(1) | A | A | A | A | A | +1.37 | 544 | 88 |
| 6-205 | 6-(15) | A | A | A | A | A | +1.36 | 556 | 75 |
| 6-206 | 6-(23) | B | A | B | B | A | +1.15 | 547 | 99 |
| 6-207 | 6-a | B | B | B | B | C | +0.65 | 549 | 86 |
| 6-208 | 6-b | B | B | B | B | C | +0.70 | 528 | 96 |

As is apparent from the results in Table 6-2, samples 6-201 to 6-206 containing the compound whose oxidation potential is nobler than 1.0 V (vs. SCE) and whose maximum absorption wavelength is between 500 nm and 580 nm with a half-value width of 150 nm or smaller provide magenta images superior in hue, paper independence, water resistance, light fastness, and ozone resistance to the images printed in samples 6-207 or 6-208.

Example 26

Ink jet printing was carried out on photo glossy paper GP-301 (available from Canon Inc.) using an ink jet printer BJ-F850 (from Canon Inc.) loaded with an ink cartridge filled with each of samples prepared in Example 25, and the printed images were evaluated in the same manner as in Example 25. The results of evaluation of the images were equal to those obtained in Example 25.

The present invention establishes a method of providing a color image or a coloring material excellent in hue and fastness to weather, particularly ozone gas, by using a coloring composition, such as an ink composition or an ink-jet ink composition, which contains a compound having an oxidation potential nobler than 1.0 V vs. SCE and showing a maximum absorption at a wavelength between 500 nm and 580 nm with a half-value width of 150 nm or narrower.

The entire disclosure of each and every foreign patent application from which the benefit of foreign priority has been claimed in the present application is incorporated herein by reference, as if fully set forth.

What is claimed is:

1. A coloring composition for image formation comprising an azo dye having an aromatic nitrogen-containing 6-membered heterocyclic ring as a coupling component, wherein the azo dye is represented by formula (2):

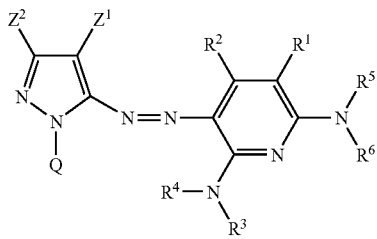

wherein $Z^1$ represents an electron-attracting group having a Hammett's substituent constant σp value of 0.20 or greater; $Z^2$ represents a hydrogen atom, an aliphatic group, an aromatic group or a heterocyclic group; $R^5$ and $R^6$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group of a sulfamoyl group, provided that $R^5$ and $R^6$ do not represent a hydrogen atom simultaneously, wherein each group may have a substituent; and $R^1$ and $R^2$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group or a heterocyclic group, an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, an alkylsulfonyl group, an arylsulfonyl group, an alkylsulfinyl group, an arylsulfinyl group, a sulfamoyl group, a sulfo group or a heterocyclic thio group, wherein each group may have a substituent; or $R^5$ may be connected to $R^1$ or $R^6$ to form a 5- or 6-membered ring; $R^3$ and $R^4$ each independently represent a hydrogen atom, an aliphatic group, an aromatic group, a heterocyclic group, an acyl group, an alkoxycarbonyl group, an aryloxycarbonyl group, a carbamoyl group, a sulfonyl group or a sulfamoyl group; and Q represents a hydrogen atom, an aliphatic group, an aromatic group or a heterocyclic group; wherein each group as represented by $Z^1$, $Z^2$, $R^1$, $R^2$, $R^3$, $R^4$, $R^5$, $R^6$, and Q may have a substituent.

2. A coloring composition for image formation comprising an azo dye represented by formula (AZ-1):

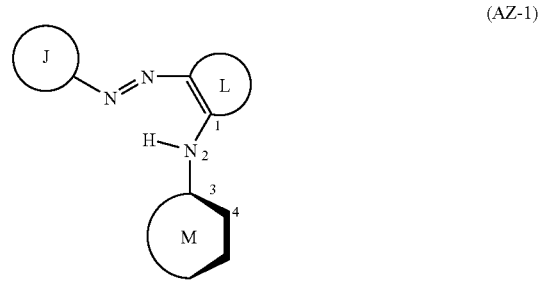

wherein ring J, ring L, and ring M each independently represent a 5- or 6-membered aromatic ring; 1, 2, 3, and 4 are numbers specifying four atoms; and the interfacial angle 1-2-3-4 defined by the numbered four atoms ranges between 45° and 1350° in the energically most stable steric structure determined by quantum chemistry calculation by the DFT/B3LYP method with the basis set 6-31G* or a higher basis set.

3. The coloring composition for image formation according to claim 2, wherein the azo dye is represented by formula (AZ-2):

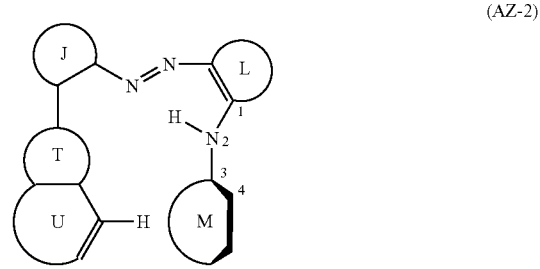

wherein ring J, ring L, ring M, ring T, and ring U each independently represent a 5- or 6-membered aromatic ring; 1, 2, 3, and 4 are numbers specifying four atoms; and the interfacial angle 1-2-3-4 defined by the numbered four atoms ranges between 45° and 1350° in the energically most stable steric structure determined by quantum chemistry calculation by the DFT/B3LYP method with the basis set 6-31G* or a higher basis set.

4. The coloring composition for image formation according to claim 3, wherein ring U is a substituted or unsubstituted benzene ring; ring T is a thiazole ring, an imidazole ring or an oxazole ring; ring U and ring T are condensed with each other; ring J is a substituted or unsubstituted pyrazole ring, a substituted or unsubstituted imidazole ring, a substituted or unsubstituted triazole ring, a substituted or unsubstituted benzene ring or a substituted or unsubstituted pyrimidone ring; ring L is a substituted or unsubstituted benzene ring, a substituted or unsubstituted pyridine ring or a substituted or unsubstituted pyrazole ring; and ring M is a substituted or unsubstituted aromatic ring or a substituted or unsubstituted nitrogen-containing 6-membered heterocyclic ring.

5. The coloring composition for image formation according to claim 2, wherein the interfacial angle 1-2-3-4 ranges between 60° and 120°.

6. A coloring composition for image formation comprising an azo dye having an aromatic nitrogen-containing 6-membered heterocyclic ring as a coupling component, wherein the azo dye is represented by formula (4):

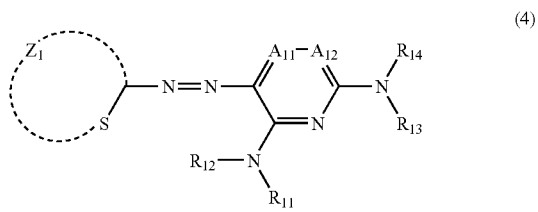

(4)

wherein $Z_1$ represents an atomic group necessary to form a hetero ring together with the carbon atom and the sulfur atom; $A_{11}$ and $A_{12}$ each independently represent a substituted or unsubstituted carbon atom or a nitrogen atom provided that $A_{11}$ and $A_{12}$ do not represent a nitrogen atom simultaneously; and $R_{11}$, $R_{12}$, $R_{13}$, and $R_{14}$ each independently represent a hydrogen atom, an alkyl group, a cycloalkyl group, an aralkyl group, an alkenyl group, an aryl group, a heterocyclic group, a sulfonyl group, an acyl group, a carboxyl group or a carbamoyl group, wherein each group may have a substituent, provided that at least one of $R_{11}$ and $R_{12}$ represents a substituted or unsubstituted aryl group or a substituted or unsubstituted heterocyclic group, and at least one of $R_{13}$ and $R_{14}$ represents a substituted or unsubstituted aryl group or a substituted or unsubstituted heterocyclic group.

7. The coloring composition for image formation according to claim 6, wherein the azo dye is represented by formula (5):

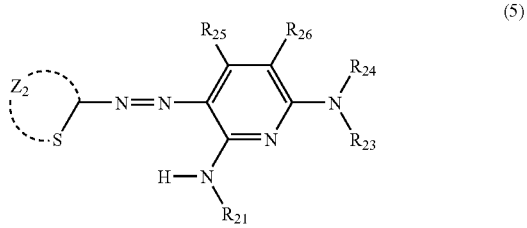

(5)

wherein $Z_2$ represents an atomic group necessary to form a hetero ring together with the carbon atom and the sulfur atom; $R_{21}$ represents a substituted or unsubstituted aryl group or a substituted or unsubstituted heterocyclic group; $R_{23}$ and $R_{24}$ each independently represent a hydrogen atom, an alkyl group, a cycloalkyl group, an aralkyl group, an alkenyl group, an aryl group, a heterocyclic group, a sulfonyl group, an acyl group, a carboxyl group or a carbamoyl group, wherein each group may have a substituent; and $R_{25}$ and $R_{26}$ each independently represent a hydrogen atom or a monovalent substituent.

8. The coloring composition for image formation according to claim 7, wherein the azo dye is represented by formula (6):

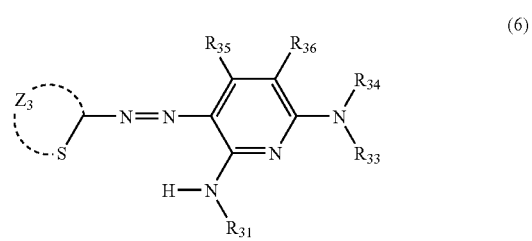

(6)

wherein $Z_3$ represents an atomic group necessary to form a hetero ring together with the carbon atom and the sulfur atom; $R_{31}$ represents a substituted or unsubstituted aryl group or a substituted or unsubstituted heterocyclic group; $R_{33}$ represents an alkyl group, a cycloalkyl group, an aralkyl group, an alkenyl group, an aryl group, a heterocyclic group, a sulfonyl group, an acyl group, a carboxyl group or a carbamoyl group; and $R_{35}$ and $R_{36}$ each independently represent a hydrogen atom or a monovalent substituent.

9. An ink-jet ink composition comprising the coloring composition according to claim 1.

10. An ink jet recording method comprising ejecting the ink-jet ink composition according to claim 9 on an image-receiving medium comprising a substrate and an ink-receptive layer comprising inorganic white pigment particles to form an image.

11. An ink-jet ink composition comprising the coloring composition according to claim 2.

12. The coloring composition according to claim 2, wherein the interfacial angle 1-2-3-4 defined by the numbered four atoms is 60° to 120°.

13. The coloring composition according to claim 2, wherein the interfacial angle 1-2-3-4 defined by the numbered four atoms is about 90°.

* * * * *